US012643065B2

(12) United States Patent
Graham et al.

(10) Patent No.: US 12,643,065 B2
(45) Date of Patent: Jun. 2, 2026

(54) FILTER SYSTEMS WITH FILTER BAG ASSEMBLIES INCLUDING FILTER BAGS WITH RADIAL SEAL GASKETS

(71) Applicant: Donaldson Company, Inc., Bloomington, MN (US)

(72) Inventors: Stephan A. Graham, Minneapolis, MN (US); Mathijs Verstraete, Tienen (BE); David V. Gutman, Brussels (BE); Massimo Movia, Tervuren (BE); Bart Catoor, Kessel-lo (BE); Gert Proost, Kessel-lo (BE); Gabriel J. Safarian, Deephaven, MN (US); Steven A. Johnson, Williams, MN (US)

(73) Assignee: Donaldson Company, Inc., Bloomington, MN (US)

(*) Notice: Subject to any disclaimer, the term of this patent is extended or adjusted under 35 U.S.C. 154(b) by 438 days.

(21) Appl. No.: 18/085,308

(22) Filed: Dec. 20, 2022

(65) Prior Publication Data

US 2023/0191303 A1      Jun. 22, 2023

Related U.S. Application Data

(60) Provisional application No. 63/292,221, filed on Dec. 21, 2021.

(51) Int. Cl.
 *B01D 46/00*      (2022.01)
 *B01D 46/04*      (2006.01)
  (Continued)

(52) U.S. Cl.
 CPC ......... *B01D 46/04* (2013.01); *B01D 46/0006* (2013.01); *B01D 46/4227* (2013.01); *B01D 46/71* (2022.01); *B01D 2271/027* (2013.01)

(58) Field of Classification Search
 CPC ............... B01D 46/04; B01D 46/0006; B01D 46/4227; B01D 46/71; B01D 2271/027;
  (Continued)

(56) References Cited

U.S. PATENT DOCUMENTS

| | | |
|---|---|---|
| 2,853,154 A | 9/1958 | Rivers |
| 3,803,814 A | 4/1974 | Parsons |

(Continued)

FOREIGN PATENT DOCUMENTS

| | | |
|---|---|---|
| BE | 671580 | 10/1958 |
| CN | 103089714 | 5/2013 |

(Continued)

OTHER PUBLICATIONS

International Application No. PCT/US2022/053540, filed Dec. 20, 2022. PCT International Search Report and Written Opinion mailed Mar. 31, 2023, 10 pages.

(Continued)

*Primary Examiner* — T. Bennett McKenzie
(74) *Attorney, Agent, or Firm* — Mueting Raasch Group

(57)      ABSTRACT

Filter systems with filter bag assemblies including filter bags with gaskets configured to form radial seals, as well as corresponding methods of assembling and using the same, are described herein. The filter systems, filter bag assemblies, and filter bags with gaskets may be used in filter systems to remove particulate matter from air or other gases. Methods of using the filter systems and methods of assembling the filter bags on filter service cages in the filter bag assemblies are also described.

24 Claims, 42 Drawing Sheets

(51) Int. Cl.
  B01D 46/42 (2006.01)
  B01D 46/71 (2022.01)
(58) Field of Classification Search
  CPC .... B01D 46/06; B01D 46/02; B01D 46/0005;
  B01D 46/023
  USPC ...................................................... 55/341.1
  See application file for complete search history.

(56) References Cited

U.S. PATENT DOCUMENTS

| | | | |
|---|---|---|---|
| 3,942,962 A | 3/1976 | Duyckinck | |
| 4,072,484 A | 2/1978 | Carre et al. | |
| 4,080,185 A | 3/1978 | Richter et al. | |
| 4,123,239 A | 10/1978 | Andersson et al. | |
| 4,218,227 A | 8/1980 | Frey | |
| 4,276,069 A * | 6/1981 | Miller .................... B01D 46/04 |
| | | | 55/502 |
| 4,298,360 A | 11/1981 | Poll | |
| 4,306,896 A | 12/1981 | O'Dell | |
| 4,395,269 A | 7/1983 | Schuler | |
| 4,424,070 A | 1/1984 | Robinson | |
| 4,436,536 A | 3/1984 | Robinson | |
| 4,443,237 A | 4/1984 | Ulvestad | |
| 4,445,915 A | 5/1984 | Robinson | |
| 4,539,025 A | 9/1985 | Ciliberti et al. | |
| 4,578,092 A | 3/1986 | Klimczak | |
| 4,613,438 A | 9/1986 | Degraffenreid | |
| 4,632,681 A | 12/1986 | Brunner | |
| 4,661,131 A | 4/1987 | Howeth | |
| 4,954,255 A | 9/1990 | Muller et al. | |
| 5,207,812 A | 5/1993 | Tronto et al. | |
| 5,211,846 A | 5/1993 | Kott et al. | |
| 5,222,488 A | 6/1993 | Forsgren | |
| 5,409,515 A | 4/1995 | Yamamoto et al. | |
| 5,484,529 A | 1/1996 | Malugade et al. | |
| 5,562,746 A | 10/1996 | Raether | |
| 5,730,766 A | 3/1998 | Clements | |
| 6,090,173 A | 7/2000 | Johnson et al. | |
| 6,179,888 B1 | 1/2001 | Mangiaforte | |
| 6,179,890 B1 | 1/2001 | Ramos et al. | |
| 6,183,530 B1 | 2/2001 | Herding et al. | |
| 6,203,591 B1 | 3/2001 | Clements et al. | |
| 6,331,197 B1 | 12/2001 | Herding et al. | |
| 6,902,592 B2 | 6/2005 | Green et al. | |
| 7,182,799 B2 | 2/2007 | Dries | |
| 7,396,376 B2 | 7/2008 | Schrage et al. | |
| 7,641,708 B2 | 1/2010 | Kosmider et al. | |
| 7,901,476 B2 | 3/2011 | Kao | |
| 8,029,585 B2 | 10/2011 | Sundvik et al. | |
| 8,075,648 B2 | 12/2011 | Raether | |
| 8,409,316 B2 | 4/2013 | Nelson et al. | |
| 8,636,820 B2 | 1/2014 | Reichter et al. | |
| 8,709,119 B2 | 4/2014 | Reichter et al. | |
| 9,623,355 B2 | 4/2017 | Caesar et al. | |
| 9,707,503 B2 | 7/2017 | Gieseke et al. | |
| 10,105,628 B2 | 10/2018 | Arrazola De Oñate | |
| 10,124,285 B2 | 11/2018 | Baseotto et al. | |
| 10,137,396 B2 | 11/2018 | Raether et al. | |
| 10,421,034 B2 | 9/2019 | Reichter et al. | |
| 11,529,576 B2 | 12/2022 | Herding et al. | |
| 2006/0112667 A1 | 6/2006 | Sporre et al. | |
| 2007/0218833 A1 | 9/2007 | Andersson | |
| 2009/0183473 A1 | 7/2009 | Hui | |
| 2011/0258976 A1* | 10/2011 | Krueger ................ B01D 46/06 |
| | | | 55/374 |
| 2012/0073434 A1 | 3/2012 | Doehla | |
| 2014/0260138 A1 | 9/2014 | Edwards et al. | |
| 2015/0128540 A1 | 5/2015 | Eyers et al. | |
| 2015/0182899 A1 | 7/2015 | Bansal et al. | |
| 2015/0314225 A1 | 11/2015 | Parsons et al. | |

| | | | |
|---|---|---|---|
| 2016/0016103 A1 | 1/2016 | Raether | |
| 2019/0308126 A1 | 10/2019 | Fritzsching et al. | |
| 2021/0077934 A1 | 3/2021 | Johnson et al. | |
| 2022/0297041 A1 | 9/2022 | Gutman et al. | |
| 2022/0297046 A1 | 9/2022 | Collin et al. | |

FOREIGN PATENT DOCUMENTS

| | | |
|---|---|---|
| CN | 104588662 A | 5/2015 |
| CN | 204952492 U | 1/2016 |
| CN | 105749638 | 7/2016 |
| CN | 206404468 | 8/2017 |
| CN | 107321078 | 11/2017 |
| CN | 107349711 | 11/2017 |
| DE | 202020105243 | 12/2020 |
| EP | 0756513 B1 | 3/2001 |
| EP | 3 150 269 | 4/2017 |
| EP | 3 680 002 | 7/2020 |
| FR | 2 561 535 | 9/1985 |
| FR | 2 561 536 | 9/1985 |
| GB | 1113154 | 5/1968 |
| NL | 1013824 | 6/2001 |
| WO | 2013/038757 | 3/2013 |
| WO | 2016/141097 | 9/2016 |
| WO | 2021/006927 | 1/2021 |
| WO | 2021/050817 | 3/2021 |
| WO | 2021/074139 | 4/2021 |
| WO | 2021/074143 | 4/2021 |
| WO | 2022/063470 | 3/2022 |
| WO | 2022/197631 | 9/2022 |
| WO | 2022/197632 | 9/2022 |
| WO | 2023/122106 | 6/2023 |

OTHER PUBLICATIONS

Donaldson® Torit® Installation and Operation Manual, "Dalamatic® Cased: DLMC Jan. 2, 2015, Jan. 3, 2015, Jan. 4, 2015, Jan. 5, 2015, Jan. 7, 2015, Feb. 2, 2015, Feb. 3, 2015, Feb. 4, 2015, Feb. 5, 2015, Feb. 6, 2015, Feb. 8, 2015, Mar. 3, 2015, Mar. 5, 2015, Mar. 6, 2015, Mar. 7, 2015, Mar. 8, 2015, Apr. 5, 2015 and Apr. 8, 2015—Collectors Built After Jul. 2006", Revision 5, Feb. 2023, originally published 2006, Donaldson Company, Inc., Minneapolis, Minnesota, 40 pages.

Donaldson@ Torit® Installation and Operation Manual, "Dalamatic® Insertable: DLMV 4/7, 7/7, 8/7, 14/7, 21/7, 6/10, 10/10, 12/10, 20/10, 30/10, 9/15, 15/15, 18/15, 30/15, 45/15, 60/15", Revision 7, Mar. 2016, originally published 2002, Donaldson Company, Inc., Minneapolis, Minnesota, 36 pages.

Donaldson® Torit® Product Information Brochure, "Dalamatic® Dust Collectors", 2011-2018, Donaldson Company, Inc., Minneapolis, Minnesota, 12 pages.

Donaldson® Torit® Product Information, "Dalamatic®: Reliable Performance for the Most Challenging Applications", Donaldson Company, Inc., Minneapolis, Minnesota. Believed available as early as Feb. 26, 2019. Obtained from the internet Jun. 18, 2021, 14 pages. Available online at https://www.donaldson.com/en-us/industrial-dust-fume-mist/equipment/dust-collectors/baghouse/dalamatic/.

International Application No. PCT/US2022/020237 filed Mar. 14, 2022, PCT International Search Report and Written Opinion mailed May 6, 2022, 10 pages.

International Patent Application No. PCT/US2020/050315, filed Sep. 11, 2020; International Preliminary Report on Patentability issued Mar. 15, 2022, 12 pages.

International Patent Application No. PCT/US2020/050315, filed Sep. 11, 2020; International Search Report and Written Opinion, mailed Feb. 4, 2021, 18 pages.

International Patent Application No. PCT/US2020/050315, filed Sep. 11, 2020; Invitation to Pay Additional Fees and Partial International Search Report, mailed Nov. 20, 2020; 11 pages.

* cited by examiner

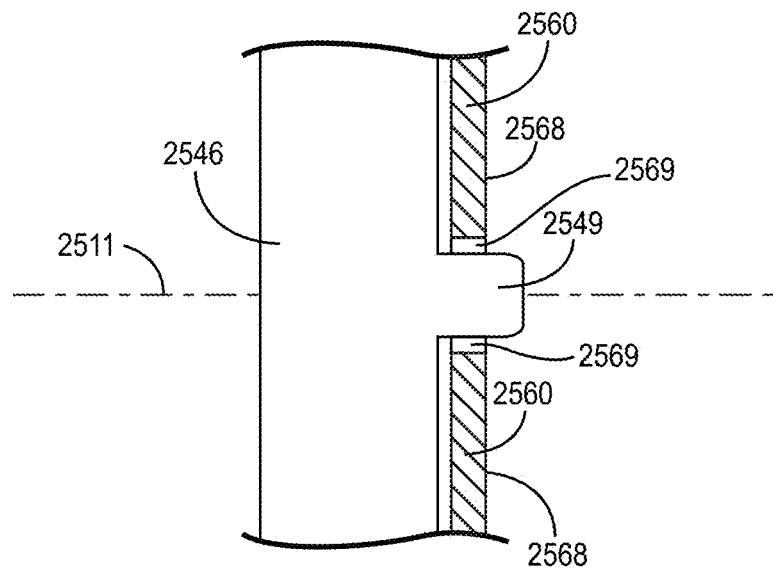
FIG. 21D
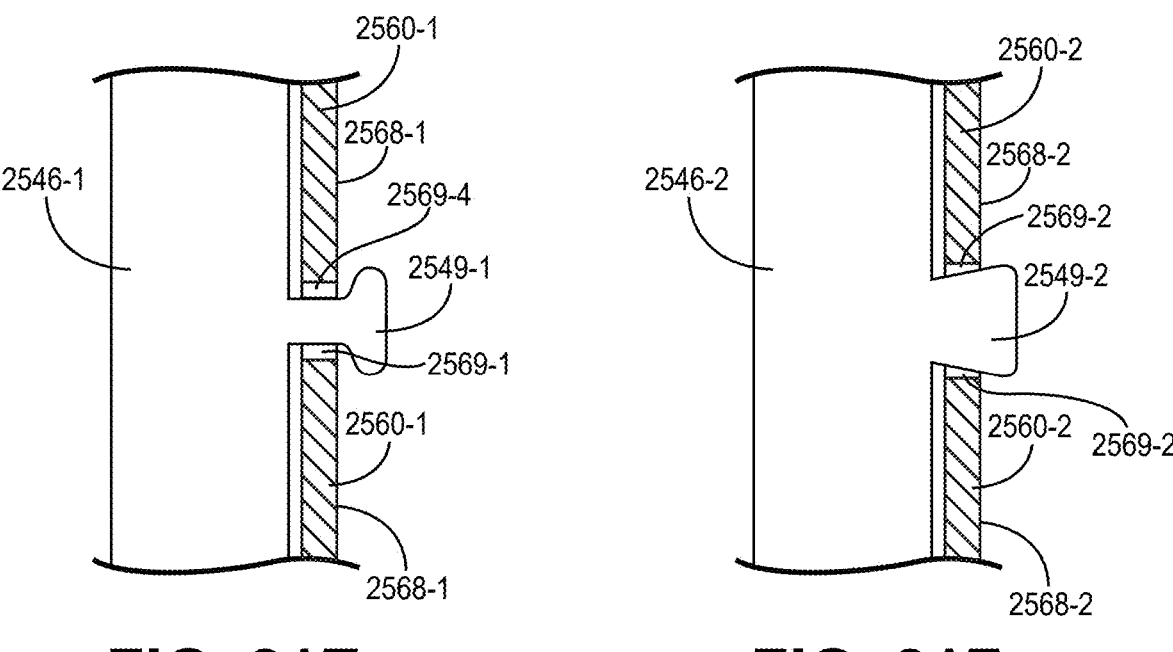
FIG. 21E          FIG. 21F

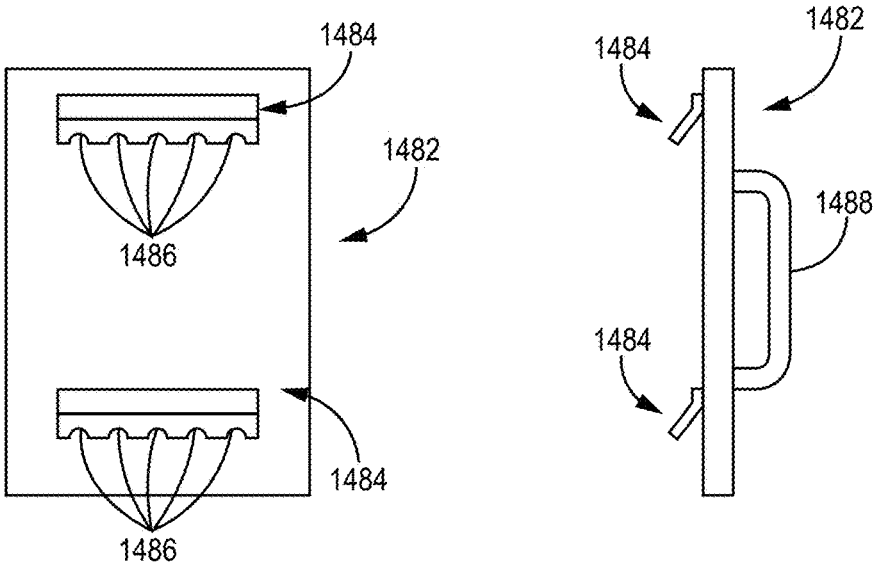
FIG. 38A    FIG. 38B
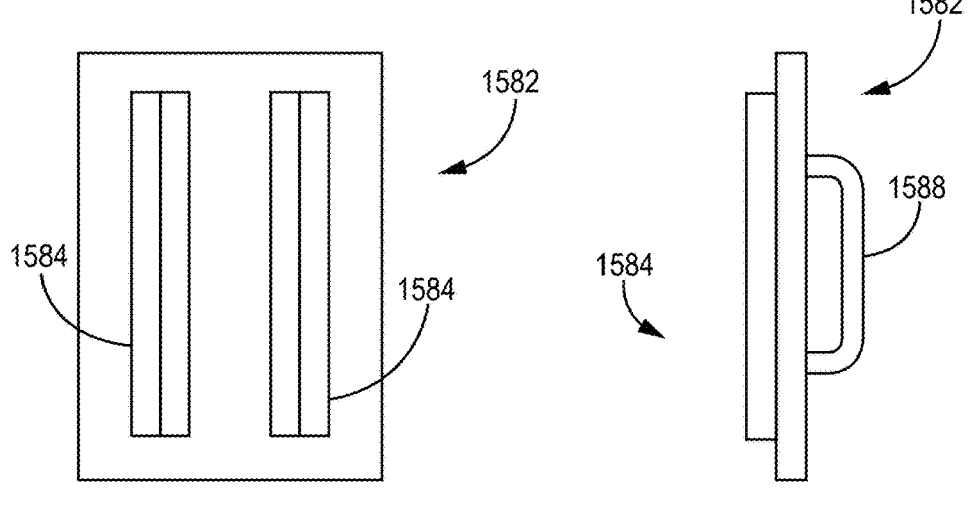
FIG. 39A    FIG. 39C
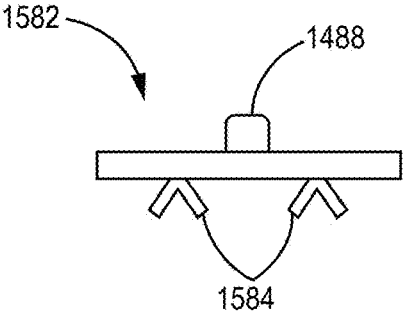
FIG. 39B

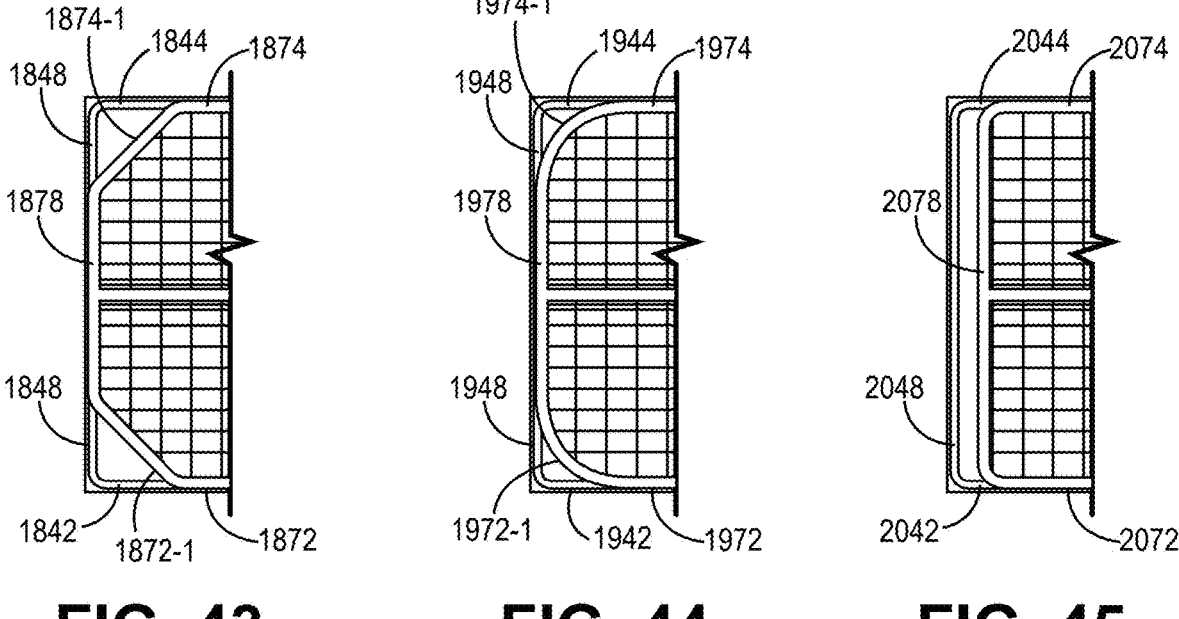
FIG. 43    FIG. 44    FIG. 45

FILTER SYSTEMS WITH FILTER BAG ASSEMBLIES INCLUDING FILTER BAGS WITH RADIAL SEAL GASKETS

RELATED APPLICATION

The present application claims the benefit of U.S. Provisional Application Ser. No. 63/292,221 filed 21 Dec. 2021, entitled FILTER SYSTEMS WITH FILTER BAG ASSEMBLIES INCLUDING FILTER BAGS WITH POCKET GASKETS which is incorporated herein by reference in its entirety.

Filter systems with filter bag assemblies including filter bags with gaskets configured to form radial seals, as well as corresponding methods of assembling and using the same, are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Some systems for cleaning an air or other gas streams laden with particulate matter include filter bags (sometimes referred to as socks) located in a housing. The filter bags are typically constructed of filter media, for example, fabric, pleated paper, etc. The gas stream contaminated with particulate matter is typically passed through the housing so that the particulate matter is captured and retained by one or more filter bags.

Air filter systems typically include a clean air chamber and a dirty air chamber. The two chambers are separated by a structure that is commonly referred to as a tubesheet. The tubesheet has a number of openings so that air can pass between the clean and dirty air chambers. The filter bags are positioned over the openings so that particulate-laden air (dirty air) introduced into the dirty air chamber must pass through a filter bag to move into the clean air chamber. The particulate matter in the dirty air collects on the filter bags as the air moves through the filter bags.

From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter bags capture particulate matter, flow through the system is inhibited and periodic cleaning of the filter bags can be performed to increase air flow through the system. Cleaning can be accomplished by periodically pulsing a brief jet of pressurized air into the interior of the filter bag to reverse the air flow through the filter bag, causing the collected particulate matter to be driven off of the filter bag as described in, for example, U.S. Pat. No. 3,942,962 (Duyckinck), U.S. Pat. No. 4,218,227 (Frey), U.S. Pat. No. 6,090,173 (Johnson et al.), U.S. Pat. Nos. 4,395,269, 6,902,592 (Green et al.), U.S. Pat. No. 7,641,708 (Kosmider et al.), and US Patent Application Publication US 2006/0112667 A1.

SUMMARY

Filter systems with filter bag assemblies including filter bags with gaskets configured to form radial seals, as well as corresponding methods of assembling and using the same, are described herein. The filter systems, filter bag assemblies, and filter bags may be used in filter systems to remove particulate matter from air or other gases. Methods of using the filter systems and methods of assembling the filter bags on filter service cages in the filter bag assemblies are also described.

The filter bag assemblies include service frames having support rings supporting gaskets of filter bags mounted on the service frames. The service frames include extension struts supporting a distal end strut located distal from the support ring. The support rings hold the bag openings of the filter bags open during placement and removal of the filter bag assemblies from dirty air chambers of the filter systems. As a result, placement and removal of filter bags in the filter systems is simplified.

In one or more embodiments, the gaskets of the filter bag assemblies form radial seals with receivers surrounding apertures on the tubesheets separating the housings of the air filter systems into clean air and dirty air chambers. The gaskets on the filter bags engage with the receivers to form the radial seals between sealing surfaces on the receivers and gaskets such that air passing through the apertures in the tubesheets must pass through the filter bags when entering or leaving the dirty air chamber through the apertures.

In one or more embodiments described herein, the support rings assist in forming radial seals between the gaskets and the receivers through compression of the gaskets between the support rings and the receivers.

In one or more embodiments, the gaskets are inserted into receivers configured to receive the gaskets to form some embodiments of the radial seals described herein.

In one or more embodiments described herein, the support rings assist in forming radial seals between the gaskets and the receivers by resisting expansion of the gaskets by the receivers as the gaskets are inserted over receivers configured to receive the gaskets to form some embodiments of the radial seals described herein. In those embodiments in which radial seals are formed by inserting gaskets into receivers, the support rings may resist compression of the gaskets to form some embodiments of the radial seals as described herein.

In one or more embodiments of the air filter systems described herein, the housings include access panels located across the dirty air chambers from the tubesheets and the filter bag assemblies are sized such that closure of access ports in the access panels (through which the filter bag assemblies are passed to place them in and remove them from the dirty air chambers) prevents disengagement of the gaskets from the sealing surfaces of the receivers. In one or more embodiments, the access covers used to close the access ports act on the distal end struts of the service cages of the filter bag assemblies to prevent disengagement of the gaskets from the sealing surfaces of the receivers during, for example, pulse cleaning events during which high pressure air/gas is delivered into the interior volumes of the filter bags through the apertures in the tubesheets. Although preventing unwanted disengagement (e.g., during pulse cleaning) the filter bag assemblies still allow for easy removal of the gaskets on the filter bags from the receivers during replacement of the filter bag assemblies.

In one or more embodiments, placement of the access covers on the access panels to close the access ports may advance the gasket towards the tubesheet to assist in formation of the radial seals between the sealing surfaces on the receivers and the gaskets.

In one or more embodiments of the air filter systems described herein, yokes are attached to the tubesheets proximate the apertures, with the yokes extending into the dirty air chambers. In one or more embodiments, the yokes may assist in placement of the gaskets on or in the receivers. In one or more embodiments, the yokes may help support the filter bag assemblies during removal of the filter bag assemblies from the dirty air chambers.

In one or more embodiments, the yokes may include intermediate support structures configured to prevent unwanted collapse of the filter bags during filtering of particulate matter from dirty air delivered into the dirty air chambers. That intermediate support is stationary and fixed within the dirty air chamber and, as a result, the filter bag assemblies have a reduced weight as compared to air filter systems in which such intermediate support structures must be removed from the dirty air chambers with the filter bags during replacement of the filter bags.

The filter bag assemblies and filter bags described herein may be particularly useful in filter systems designed for use in industrial air filter applications in which particulate matter must be removed from relatively large volumes of dirty air. As such, the filter bags and filter bag assemblies must be sized to handle those air volumes and the particulate matter associated with the volumes. Generally, the filter bags described herein may have a bag length measured from the bag opening to the closed end of the bag that is 0.3 meters or more, 0.5 meters or more, 1 meter or more, 1.5 meters or more or even 2 meters or more. The associated bag height (measured transverse to the length of the bag) may be 0.2 meters or more, 0.3. meters or more, 0.4 meters or more, or 0.5 meters or more.

Filter systems that include one or more of the various features and components described herein may offer one or more advantages such as, for example, improved energy efficiency, reduced noise generation, etc. by, in one or more embodiments, reduced pressure drops within the filter systems both during primary flow operation and pulse cleaning of the filter elements (where primary flow operation occurs when the filter system is removing particulate matter from a dirty air stream), reducing frictional losses in the filter systems (both during primary flow operation and pulse cleaning of the filter bags, improving particulate loading characteristics (thus potentially requiring fewer cleaning pulses), etc.

These advantages may, in one or more embodiments be synergistic, i.e., the energy efficiency, reduced noise, etc. may be improved by using two or more of the features and/or components together in the same filter systems.

In a first aspect, one or more embodiments of an air filter system as described herein include: a tubesheet separating a housing into a dirty air chamber and a clean air chamber, wherein the tubesheet comprises an aperture placing the dirty air chamber in fluid communication with the clean air chamber, and wherein the housing comprises an access panel located directly across the dirty air chamber from the tubesheet; a filter bag assembly configured for installation in and removal from the dirty air chamber through an access port in the access panel. In one or more embodiments, the filter bag assembly comprises a service frame comprising a support ring and a distal end strut attached to the support ring by an extension strut extending between the distal end strut and the support ring, the support ring comprising a leading edge facing away from the distal end strut, a filter bag comprising a bag opening and a closed end such that the filter bag comprises flexible filter sheet material defining an interior volume of the filter bag, the filter bag defining a filter bag axis extending through the bag opening and the closed end, and a pocket gasket extending around the bag opening, the pocket gasket comprising a pocket, wherein the leading edge of the support ring is positioned in the pocket and proximate the tubesheet and wherein the extension strut extends away from the tubesheet towards the access panel when the filter bag assembly is installed in the dirty air chamber. In one or more embodiments, the air filter system further includes a receiver surrounding the aperture, wherein the pocket gasket of the filter bag assembly engages the receiver to form a radial seal between a sealing surface on the receiver and the pocket gasket such that air passing through the aperture in the tubesheet must pass through the filter bag when entering or leaving the dirty air chamber through the aperture.

In one or more embodiments of the air filter systems described herein, the pocket gasket is compressed between the support ring and the sealing surface of the receiver.

In one or more embodiments of the air filter systems described herein, the leading edge of the support ring and the pocket of the pocket gasket are located within the receiver such that the radial seal is formed within the receiver and an exterior surface of the support ring. In one or more embodiments, the pocket gasket comprises a seal member, and wherein the seal member is deformed by the receiver when the leading edge of the support ring and the pocket of the pocket gasket are located within the receiver.

In one or more embodiments of the air filter systems described herein, the pocket gasket comprises a forward edge distal from the closed end of the filter bag along the filter bag axis, and wherein the receiver is located within the pocket gasket such that the radial seal is formed within the pocket gasket and outside of the receiver at a location between the forward edge of the pocket gasket and the closed end of the filter bag. In one or more embodiments, the receiver is located within the pocket gasket such that the radial seal is formed within the pocket gasket on an external surface of the receiver facing the pocket gasket. In one or more embodiments, the pocket gasket comprises a seal member, and wherein the seal member is deformed by the receiver when the receiver is located within the pocket gasket and the radial seal is formed within the pocket gasket on the external surface of the receiver facing the pocket gasket.

In one or more embodiments of the air filter systems described herein, the service frame comprises a filter bag assembly length measured along the filter bag axis between the leading edge of the support ring and the distal end strut that is great enough to prevent disengagement of the pocket gasket from the sealing surface of the receiver when the access port is closed.

In one or more embodiments of the air filter systems described herein, the radial seal formed between the sealing surface on the receiver and the support ring is located between the leading edge of the support ring and a trailing edge of the support ring, wherein the trailing edge of the support ring is located between the leading edge of the support ring and the distal end strut.

In one or more embodiments of the air filter systems described herein, the support ring, the distal end strut, and the extension strut of the service frame are located in the interior volume of the filter bag. In one or more embodiments, the extension strut comprises a first extension strut, and wherein the service frame comprises a second extension strut extending between the distal end strut and the support ring, wherein the support ring, the first extension strut, the second extension strut, and the distal end strut define a generally rectangular service frame shape.

In one or more embodiments of the air filter systems described herein, the support ring, the distal end strut, and the extension strut of the service frame are located outside of the interior volume of the filter bag. In one or more embodiments, the extension strut comprises a first extension strut, and wherein the service frame comprises a second extension strut extending between the distal end strut and the support ring, wherein the support ring, the first extension strut, the second extension strut, and the distal end strut define a generally rectangular service frame shape.

In one or more embodiments of the air filter systems described herein, the system comprises a yoke attached to the tubesheet, the yoke extending into the dirty air chamber from a dirty air chamber side of the tubesheet, wherein a junction between the yoke and the tubesheet is located between the aperture and the sealing surface of the receiver, and wherein, when the filter bag assembly is installed in the dirty air chamber, the yoke is located in the interior volume of the filter bag.

In one or more embodiments of the air filter systems described herein, the system comprises a yoke attached to the tubesheet, the yoke extending into the dirty air chamber from a dirty air chamber side of the tubesheet, wherein a junction between the yoke and the tubesheet is located between the aperture and the sealing surface of the receiver, and wherein, when the filter bag assembly is installed in the dirty air chamber, the yoke is located in the interior volume of the filter bag, and wherein the yoke comprises a strut channel extending away from the tubesheet along an edge of the yoke, and wherein the extension strut of the service frame is at least partially received in the strut channel. In one or more embodiments, the extension strut of the service frame is located in the interior volume of the filter bag.

In one or more embodiments of the air filter systems described herein, the service frame and the yoke define a handle gap between the service frame and the yoke proximate the closed end of the tubular body, wherein the handle gap is located between the closed end of the tubular body and the yoke, the handle gap configured to facilitate manual grasping of the service frame and the filter bag for removal of the filter bag assembly from the dirty air chamber.

In one or more embodiments of the air filter systems described herein, the leading edge of the support ring is shaped such that a distance between the leading edge of the support ring and the tubesheet changes when moving around a perimeter of the support ring.

In one or more embodiments of the air filter systems described herein, the pocket gasket is constructed of a resilient elastomeric material.

In one or more embodiments of the air filter systems described herein, the pocket gasket comprises a forward edge located distal from the closed end of the filter bag along the filter bag axis and a rear edge located between the forward edge and the closed end of the filter bag, wherein the pocket gasket is attached to the flexible filter sheet material of the filter bag at a seam located between the pocket and the rear edge of the pocket gasket.

In one or more embodiments of the air filter systems described herein, the pocket gasket comprises a forward edge located distal from the closed end of the filter bag along the filter bag axis, wherein the pocket gasket is attached to the flexible filter sheet material of the filter bag at a seam located between the pocket and the forward edge of the pocket gasket.

In one or more embodiments of the air filter systems described herein, the system comprises an access port cover configured to close the access port when the filter bag assembly is installed in the dirty air chamber and the pocket gasket of the filter bag engages the receiver to form a radial seal between a sealing surface on the receiver and the pocket gasket, and wherein a cross-chamber distance across the dirty air chamber from the access port cover to the receiver is configured to prevent disengagement of the pocket gasket from the sealing surface of the receiver when the access port is closed by the access port cover. In one or more embodiments, the access port cover is configured to restrict movement of the distal end strut in directions transverse to the filter bag axis when the access port is closed by the access port cover.

In one or more embodiments of the air filter systems described herein, the aperture in the tubesheet comprises a first aperture of a plurality of apertures with each aperture of the plurality of apertures placing the dirty air chamber in fluid communication with the clean air chamber; the filter bag assembly comprises a first filter bag assembly of a plurality of filter bag assemblies with each filter bag assembly of the plurality of filter bag assemblies configured for installation in and removal from the dirty air chamber through an access port in the access panel; the receiver comprises a first receiver of a plurality of receivers with each receiver extending into the dirty air chamber around one aperture of the plurality of apertures, wherein the pocket gasket of the first filter bag assembly engages the first receiver to form a radial seal between a sealing surface on the first receiver and the pocket gasket such that air passing through the first aperture must pass through the filter bag of the first filter bag assembly when entering or leaving the dirty air chamber through the first aperture; a second aperture of the plurality of apertures is located within a second receiver of the plurality of receivers and a pocket gasket of a second filter bag assembly of the plurality of filter bag assemblies engages the second receiver; the filter bag axis extending through the bag opening and the closed end of the filter bag of the first filter bag assembly is a first filter bag axis that extends through a center of the bag opening and a center of the closed end of the filter bag of the first filter bag assembly; the filter bag of the second filter bag assembly defines a second filter bag axis extending through a center of the bag opening and a center of the closed end of the filter bag of the second filter bag assembly; the filter bag of the first filter bag assembly comprises a width measured along a width direction that is transverse to both the first filter bag axis and the second filter bag axis; the first filter bag assembly and the second filter bag assembly are adjacent each other when moving along the width direction; and a distance between the first filter bag axis and the second filter bag axis along the width direction is 3 or more times the width of the first filter bag.

In one or more embodiments of the air filter systems described herein in which a distance between the first filter bag axis and the second filter bag axis along the width direction is 3 or more times the width of the first filter bag, each filter bag assembly of the plurality of filter bag assemblies extends across the dirty air chamber from the receiver to the access panel.

In one or more embodiments of the air filter systems described herein in which a distance between the first filter bag axis and the second filter bag axis along the width direction is 3 or more times the width of the first filter bag, the plurality of filter bag assemblies comprises three or more filter bag assemblies, and wherein an inter-assembly distance between each pair of adjacent filter bag assemblies of the plurality of filter bag assemblies is the same as or greater than the distance between the first filter bag axis and the second filter bag axis.

In one or more embodiments of the air filter systems described herein in which a distance between the first filter bag axis and the second filter bag axis along the width direction is 3 or more times the width of the first filter bag, the filter bag of each filter bag assembly of the plurality of filter bag assemblies comprises an envelope style filter bag.

In one or more embodiments of the air filter systems described herein, the leading edge of the support ring comprises a plurality of retention tabs extending away from the closed end of the filter bag, and wherein the pocket gasket comprises a plurality of tab apertures configured to receive the retention tabs, and wherein, optionally, the tab apertures extend through the gasket from the pocket through a forward edge of the pocket gasket such that the plurality of retention tabs are exposed at the forward edge of the pocket gasket.

In one or more embodiments of the air filter systems described herein, the filter bag comprises an envelope-style filter bag.

In one or more embodiments of the air filter systems described herein, the filter bag comprises a handle attached to the closed end of the tubular body, wherein the closed end is located between the bag opening and the handle when moving along the filter bag axis.

In a second aspect, one or more embodiments of a filter bag as described herein include: a tubular body extending from a bag opening to a closed end, the tubular body defined by flexible filter sheet material defining an interior volume of the filter bag between the bag opening and the closed end, the tubular body defining a filter bag axis extending through the bag opening and the closed end; and a gasket attached to the tubular body, the gasket extending around and attached to a perimeter of the bag opening, the gasket comprising: an external surface facing away from the filter bag axis, the external surface extending around a perimeter of the gasket, an internal surface facing the filter bag axis, the internal surface extending around the perimeter of the gasket, a forward edge located distal from the closed end of the tubular body and a trailing edge located between the forward edge and the closed end of the tubular body, and a pocket formed in the gasket between the external surface and the internal surface, the pocket comprising a pocket opening and a forward end, wherein the forward end is located between the pocket opening and the forward edge of the gasket, the pocket configured to receive a support ring extending around the perimeter of the bag opening.

In one or more embodiments of a filter bag as described herein, the pocket opening opens into the interior volume of the filter bag.

In one or more embodiments of a filter bag as described herein, the pocket opening faces the closed end of the tubular body.

In one or more embodiments of a filter bag as described herein, the pocket opening is located closer to the forward edge of the gasket than the trailing edge of the gasket.

In one or more embodiments of a filter bag as described herein, the pocket comprises a pocket depth measured along the bag axis between the forward end of the pocket and a reference plane oriented transverse to the bag axis, wherein the pocket depth varies when moving around the perimeter of the gasket.

In one or more embodiments of a filter bag as described herein, the gasket comprises a gasket depth measured along the bag axis between the forward edge and a reference plane oriented transverse to the bag axis, and wherein the gasket depth varies when moving around the perimeter of the gasket.

In one or more embodiments of a filter bag as described herein, the gasket comprises a gasket-pocket depth measured along the bag axis between the forward end of the pocket and a reference plane, wherein the gasket-pocket depth varies when moving around the perimeter of the gasket.

In one or more embodiments of a filter bag as described herein, the gasket comprises one or more seal members protruding from the gasket, the one or more seal members located between the forward edge and the trailing edge of the gasket.

In one or more embodiments of a filter bag as described herein, the one or more seal members are located between the pocket opening and the trailing edge of the gasket.

In one or more embodiments of a filter bag as described herein, the one or more seal members are located between the pocket opening and the forward edge of the gasket. In one or more embodiments, the one or more seal members are located between the forward end of the pocket and the forward edge of the gasket.

In one or more embodiments of a filter bag as described herein, the one or more seal members protrude from the external surface of the gasket.

In one or more embodiments of a filter bag as described herein, the one or more seal members protrude from the internal surface of the gasket.

In one or more embodiments of a filter bag as described herein, the one or more seal members comprise one or more materials selected from: foamed elastomer, loose felt, pile/fuzzy gasket material, and solid elastomer.

In one or more embodiments of a filter bag as described herein, each seal member of the one or more seal members extends continuously around the perimeter of the gasket.

In one or more embodiments of a filter bag as described herein, the filter bag comprises a handle attached to the closed end of the tubular body, wherein the closed end is located between the bag opening and the handle when moving along the filter bag axis, and, optionally, wherein the closed end of the tubular body is defined by a seal formed between opposing layers of the flexible filter sheet material, wherein, optionally, the seal comprises stitching. In one or more embodiments, the handle comprises a handle aperture formed in the flexible filter sheet material.

In one or more embodiments of a filter bag as described herein, the gasket comprises a plurality of tab apertures extending through the gasket from the forward end of the pocket through the forward edge of the gasket.

Use of any of the filter systems, filter bag assemblies, and filter bags with pocket gaskets described herein to remove particulate matter from dirty air (or any other gas) is also described herein.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the air filter systems, filter bag assemblies, filter bags with pocket gaskets, and methods described herein. Rather, a more complete understanding of the invention will become apparent and appreciated by reference to the following Description of Illustrative Embodiments and claims in view of the accompanying figures of the drawing.

BRIEF DESCRIPTIONS OF THE VIEWS OF THE DRAWING

10

Figure 13:
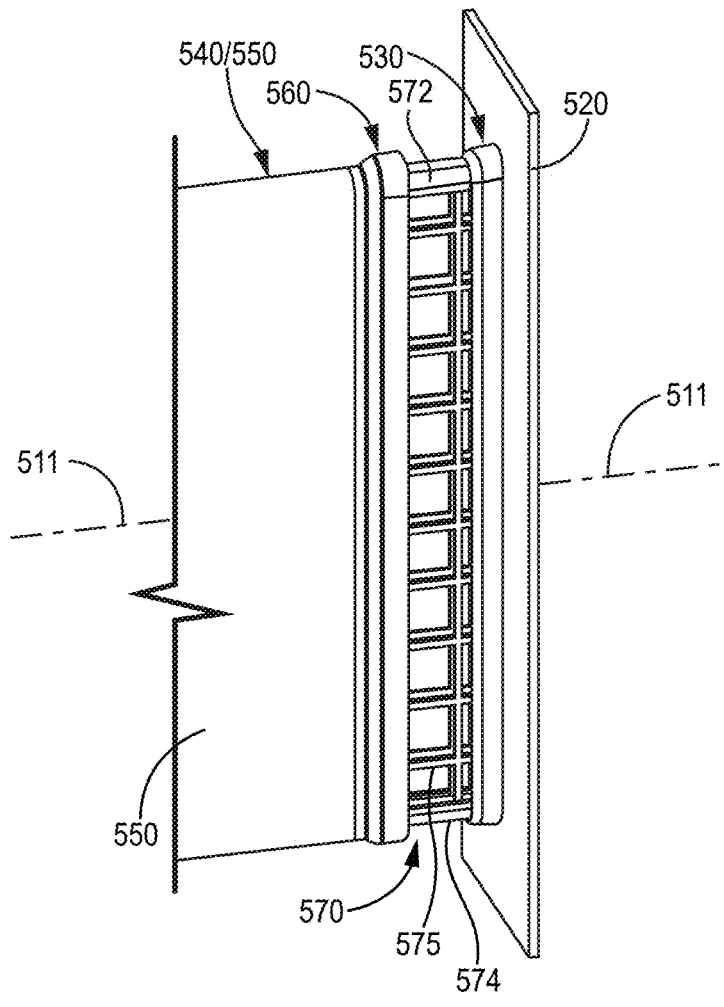
FIG. 13 is an enlarged perspective view of the filter bag assembly partially mounted on a yoke assembly of one illustrative embodiment of an air filter system including a tubesheet and a receiver as described herein.
Figure 14:
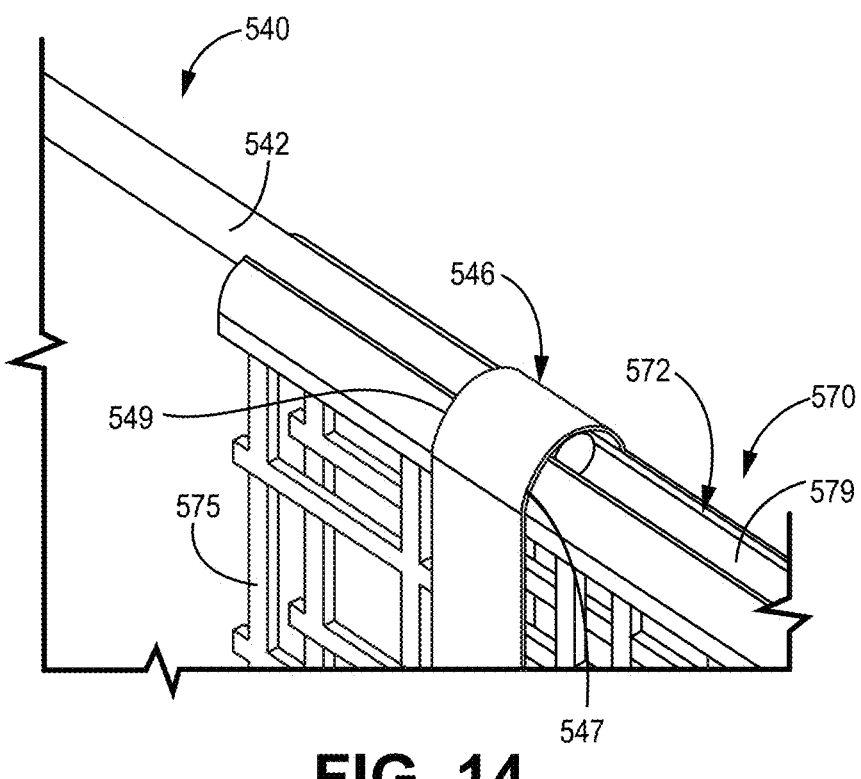

FIG. 14 is an enlarged perspective view of one illustrative embodiment of a service frame used in the illustrative embodiment of a filter bag assembly as depicted in FIG. 13 with the filter bag removed from the service frame and the service frame partially mounted on the yoke assembly depicted in FIG. 13.

Figure 15:
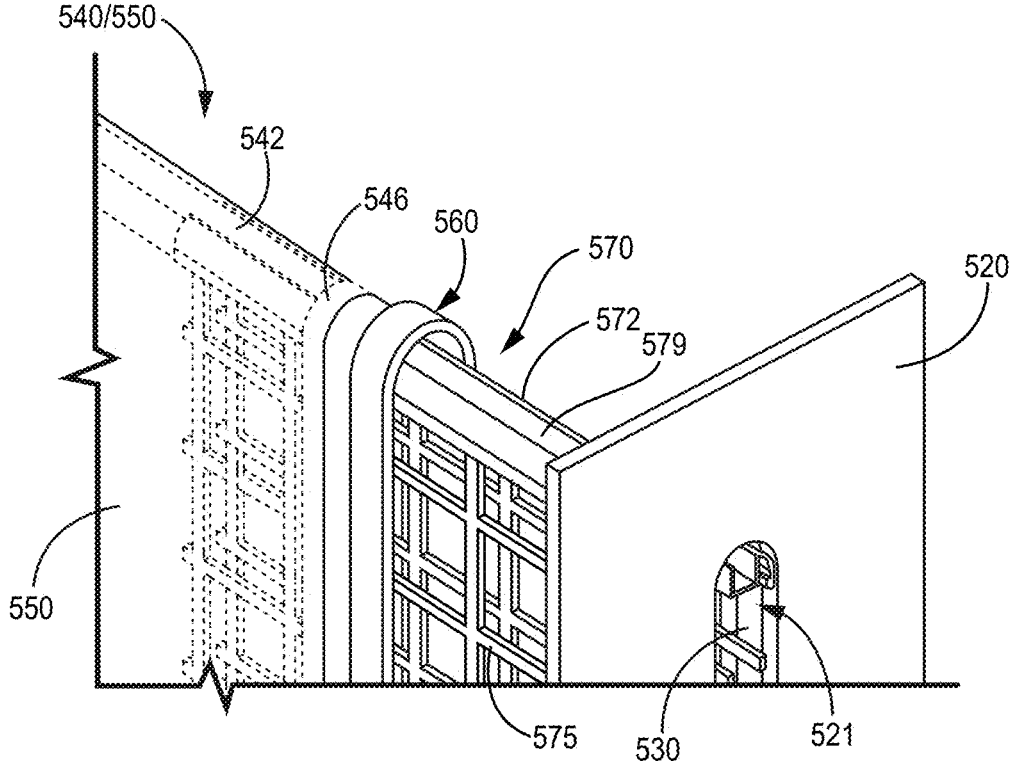

FIG. 15 is an alternative perspective view of the filter bag assembly, yoke assembly, tubesheet, and receiver depicted in FIG. 13.

Figure 16:
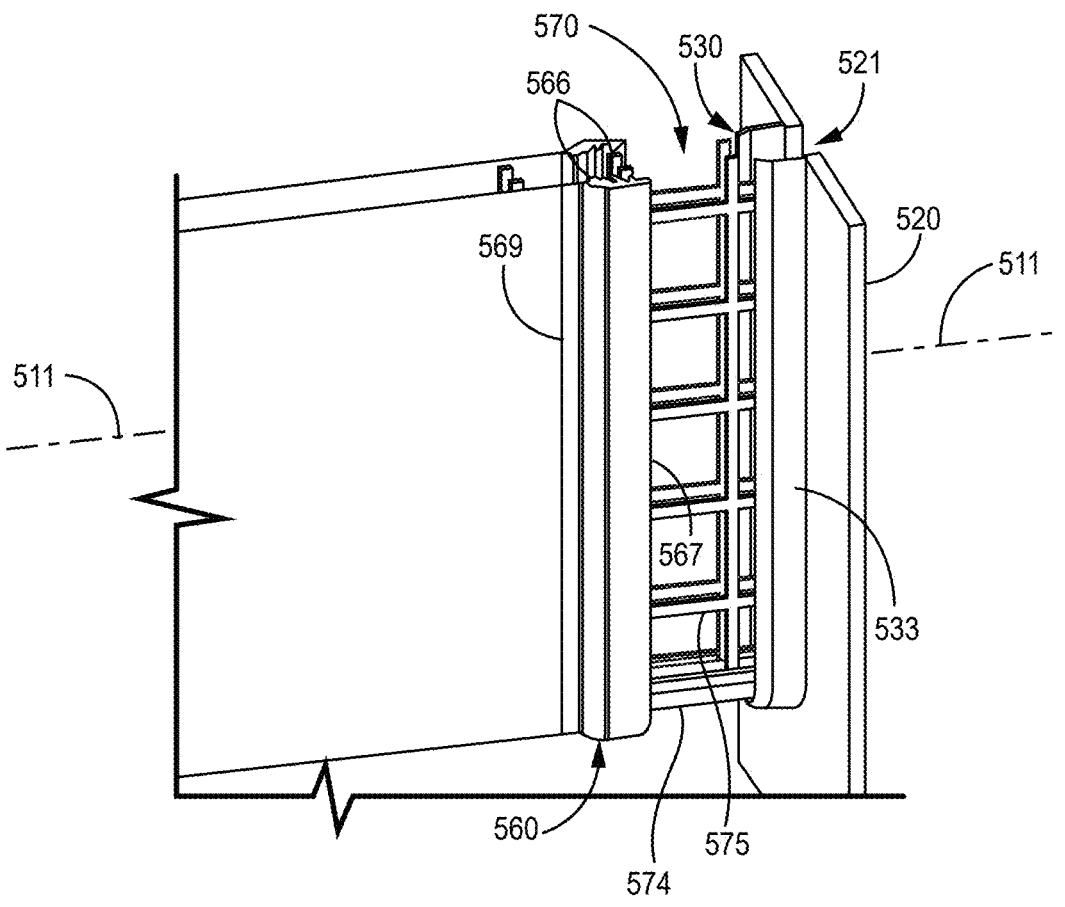

FIG. 16 is a cross-sectional view of the perspective view of the filter bag assembly, yoke assembly, tubesheet, and receiver as depicted in FIG. 13.

Figure 17:
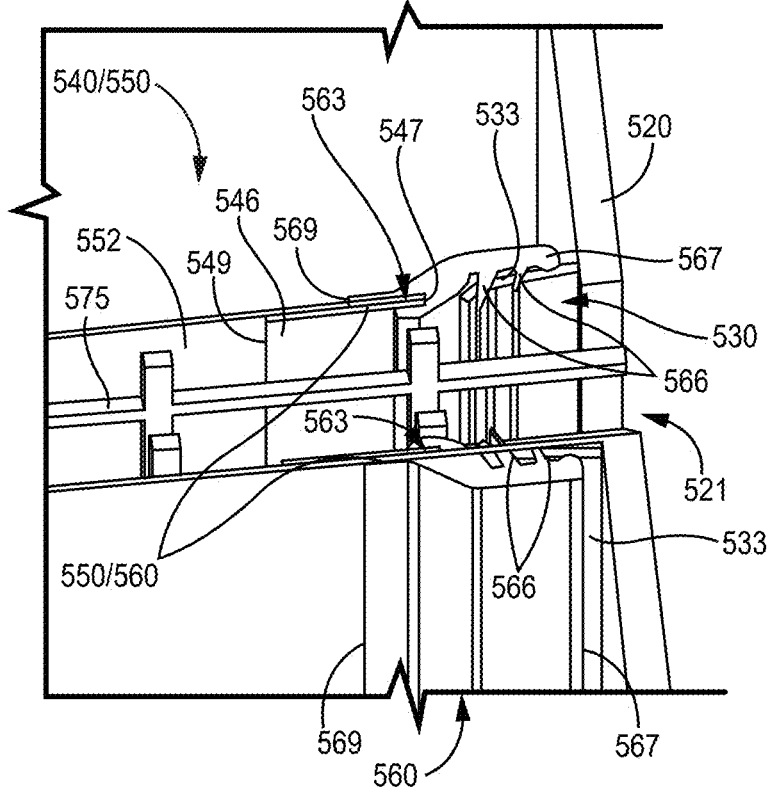

FIG. 17 is an enlarged view of the components depicted in FIG. 16 after engagement of the pocket gasket of the filter bag with the receiver on the tubesheet.

Figure 18:
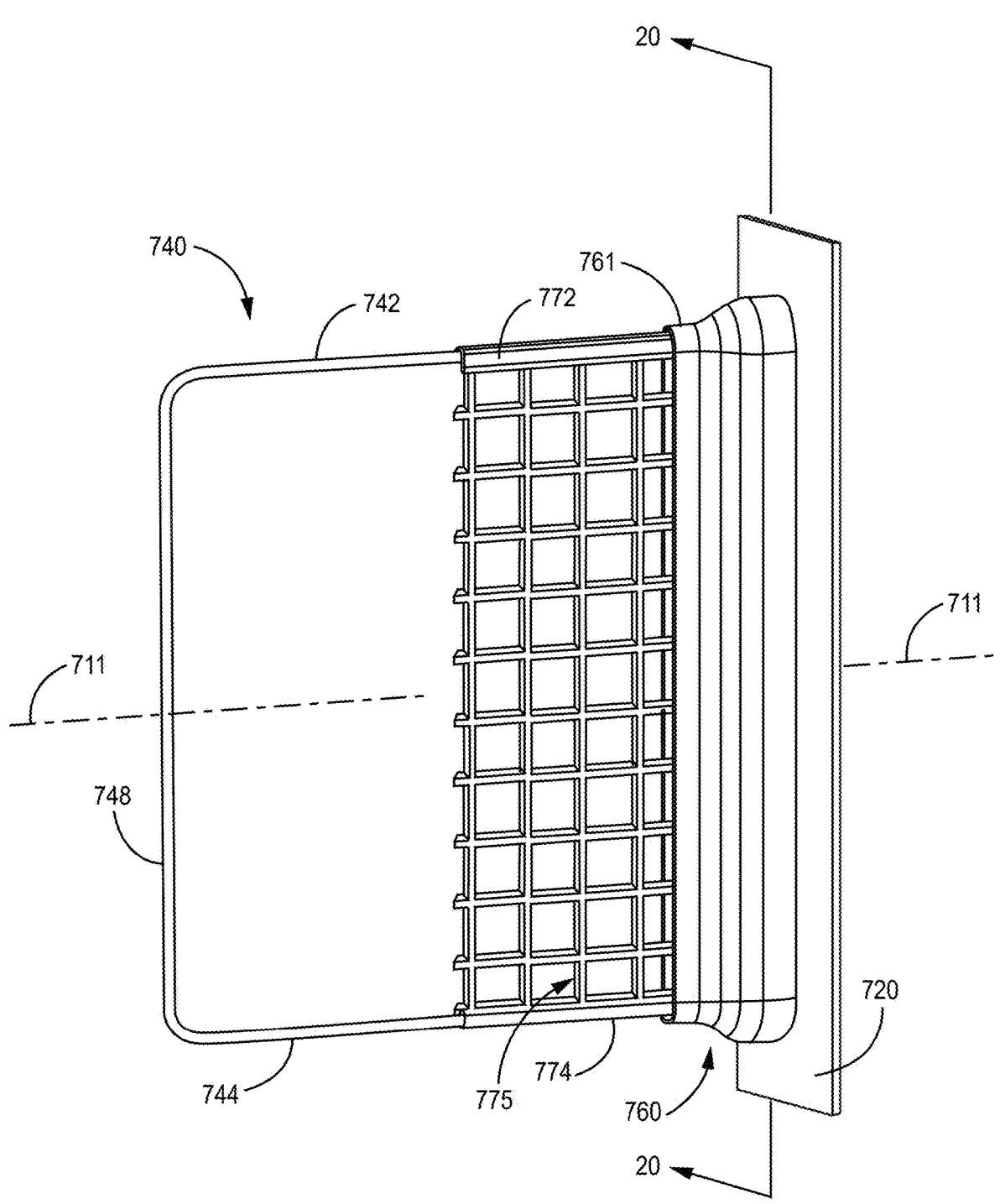

FIG. 18 is a perspective view of another illustrative embodiment of a filter bag assembly partially mounted on a yoke assembly of another illustrative embodiment of an air filter system including a tubesheet and a receiver as described herein (with the filter material of the filter bag removed to expose the components that would be located in the filter bag).

Figure 19:
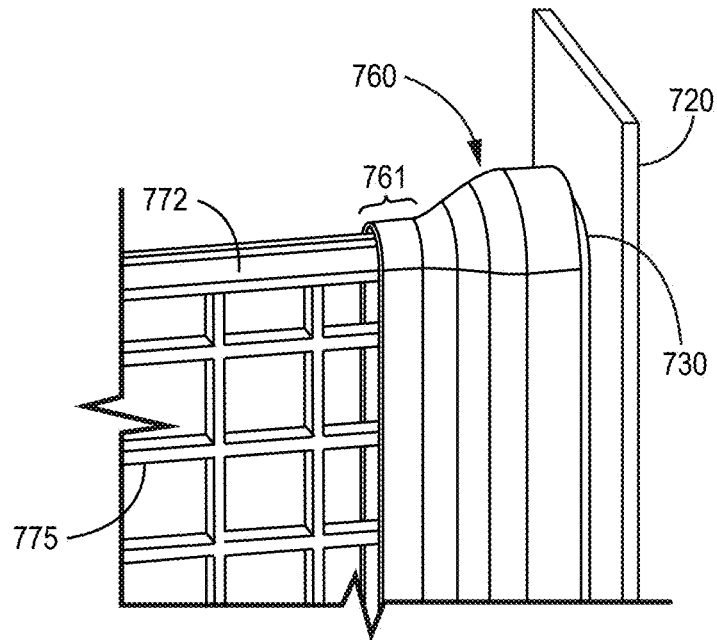

FIG. 19 is an enlarged view of an upper portion of the filter bag assembly depicted in FIG. 18.

Figure 20A:
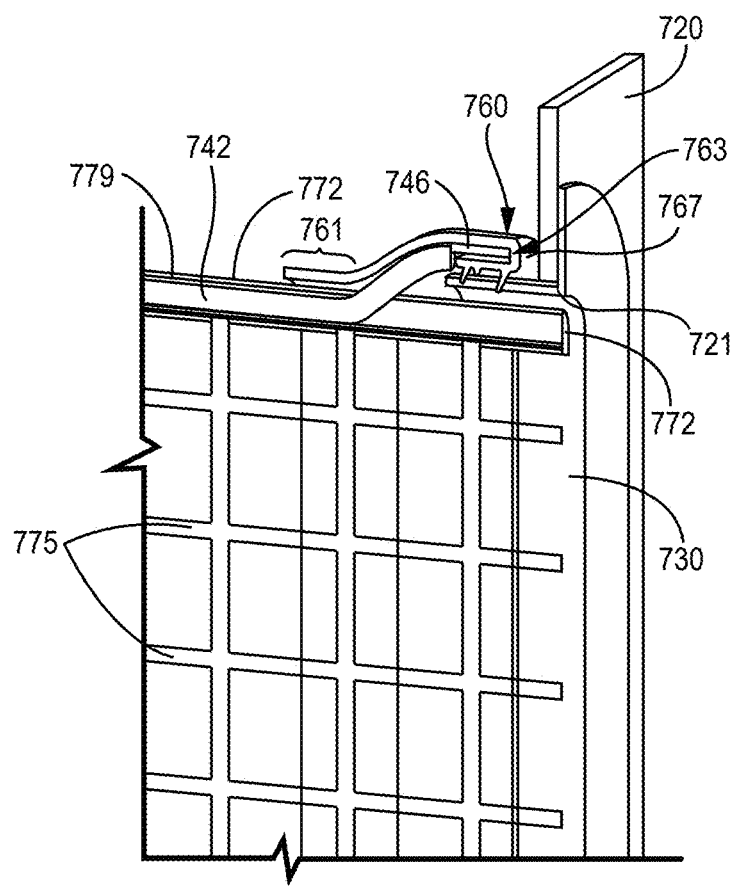

FIG. 20A is an enlarged cross-sectional view of an upper portion of the filter bag assembly depicted in FIG. 18 taken along line 20-20 in FIG. 18.

Figure 20B:
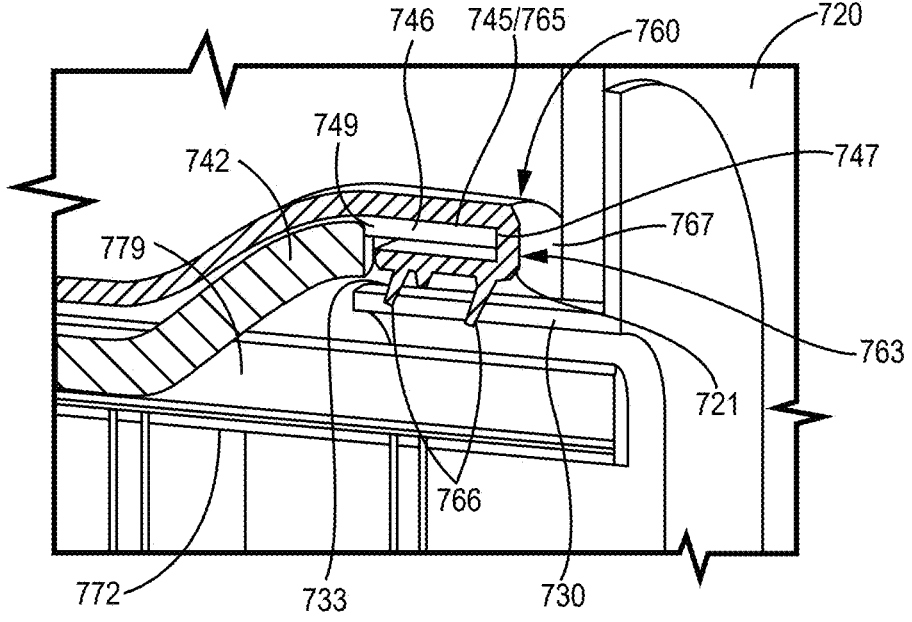

FIG. 20B is an enlarged view of the junction between the pocket gasket and the receiver of the filter bag assembly of FIG. 20A.

Figure 21C:
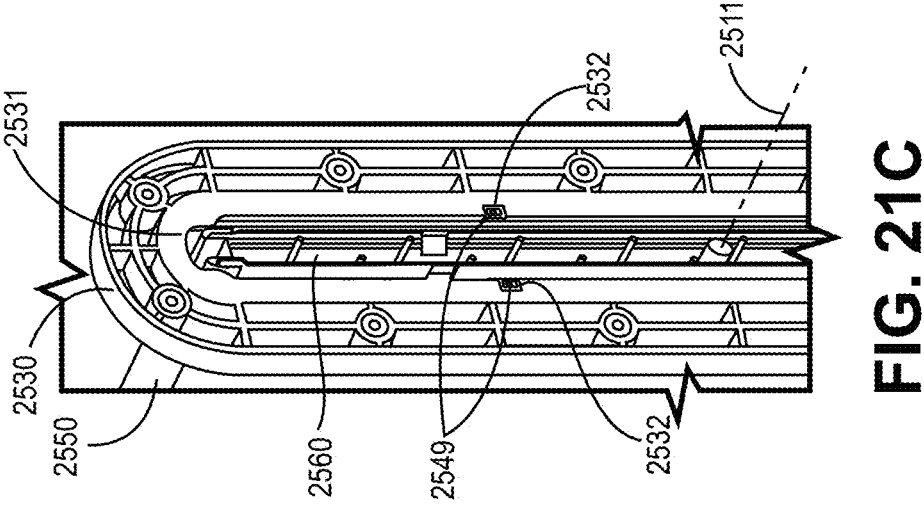
Figure 21B:
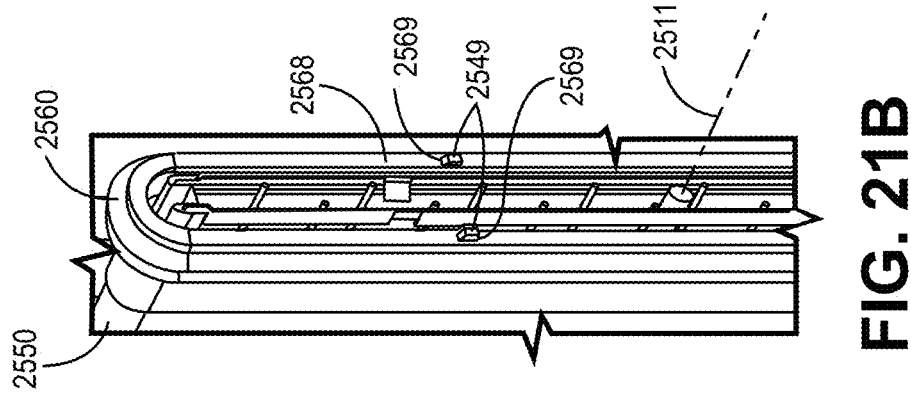
Figure 21A:
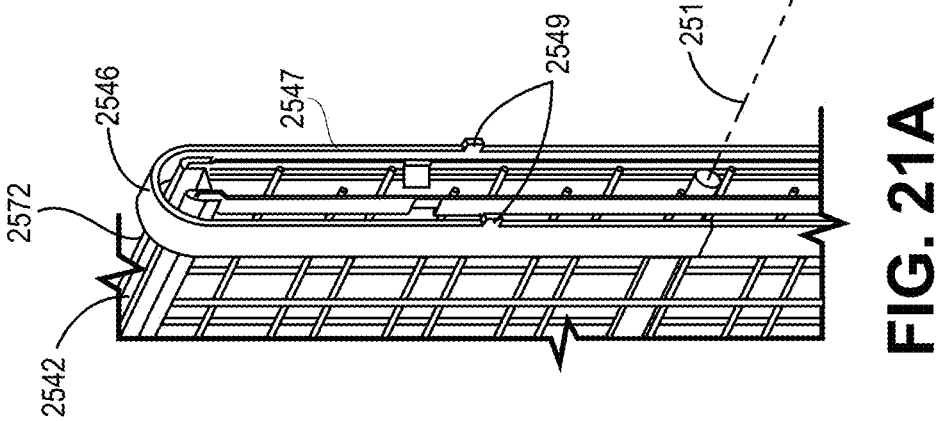

FIG. 21A is a perspective view of another illustrative embodiment of a service frame including a support ring as described herein, wherein the support ring includes retention tabs configured to retain a gasket on the service frame during installation.

FIG. 21B is a perspective view of the service frame of FIG. 21A after installation of a pocket gasket of a filter bag on the support ring.

FIG. 21C is a perspective view of the pocket gasket and service frame installed in a receiver as described herein, wherein the view of FIG. 21C is taken from the tubesheet side of the receiver with the tubesheet removed to expose features on the receiver and filter bag assembly.

FIG. 21D is a side view of one of the retention tabs on the support ring of FIGS. 21A-21C, with the gasket depicted in cross-section.

FIGS. 21E-21F depict illustrative embodiments of two alternative retention tavs on support rings.

Figure 22:
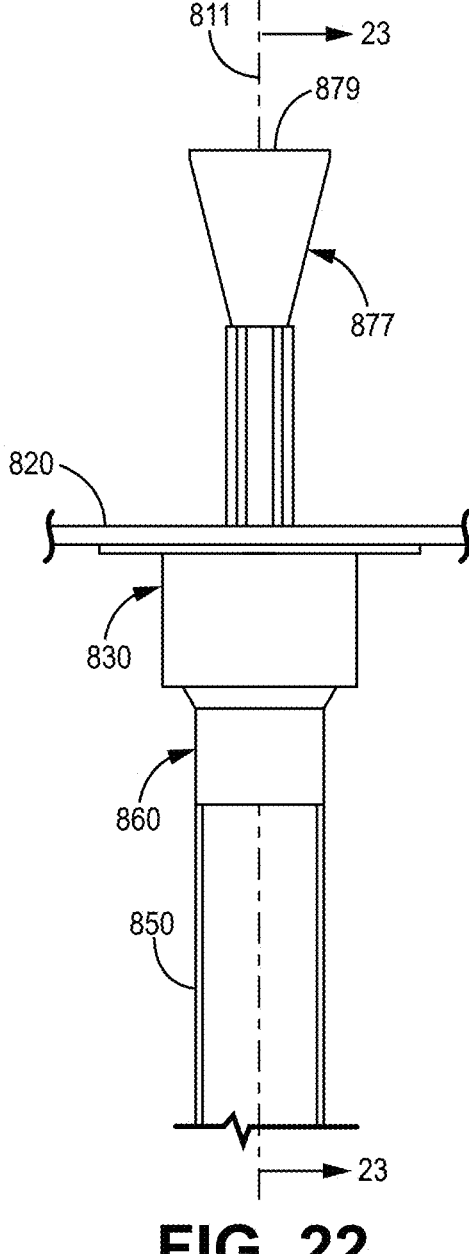

FIG. 22 is a top view of a portion of another illustrative embodiment of a filter bag assembly mounted on a yoke assembly of another illustrative embodiment of an air filter system including a tubesheet and a receiver as described herein.

Figure 23:
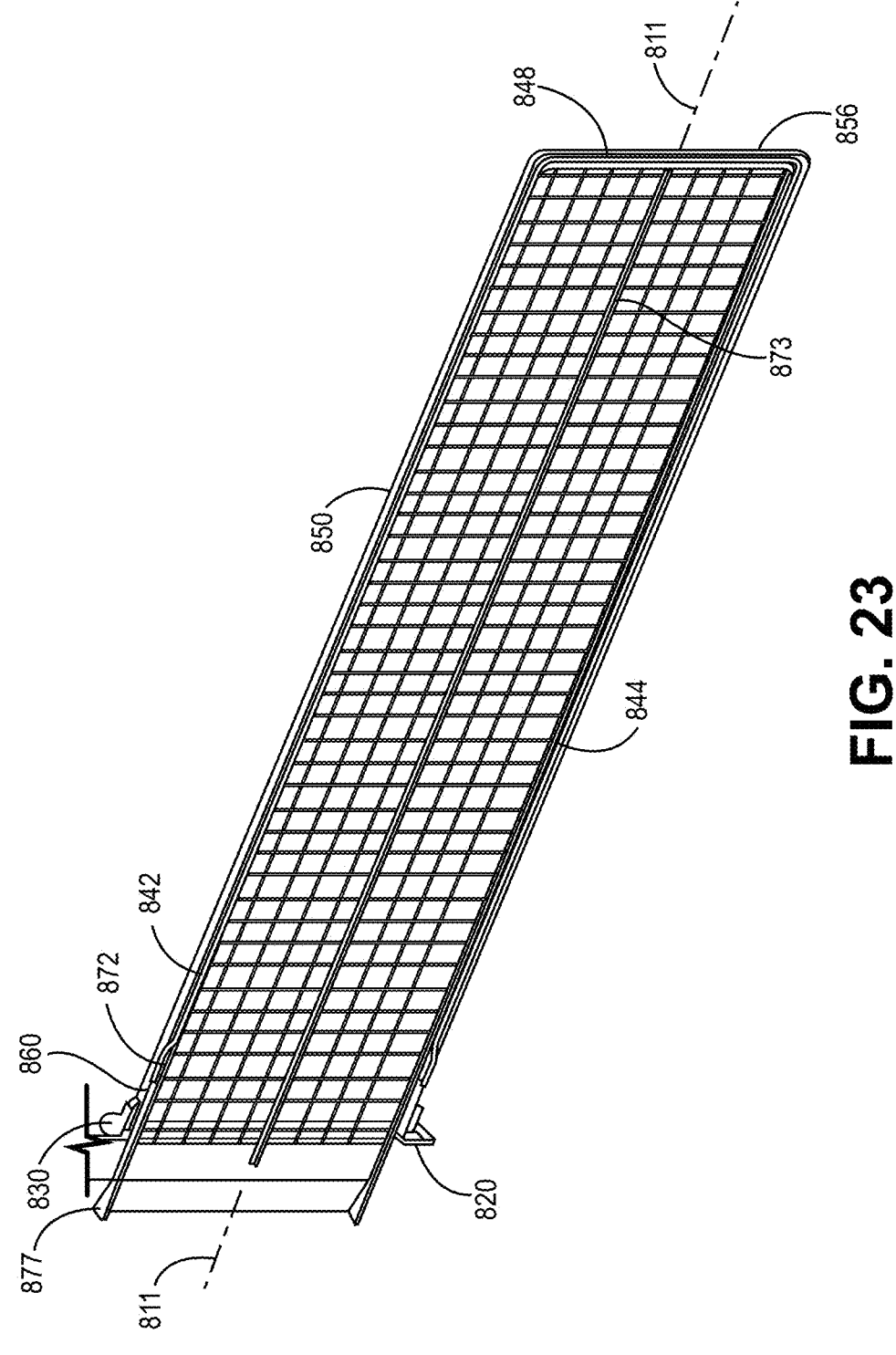

FIG. 23 is a cross-sectional view of the entire filter bag assembly of FIG. 22 taken along line 23-23 in FIG. 22.

Figure 24:
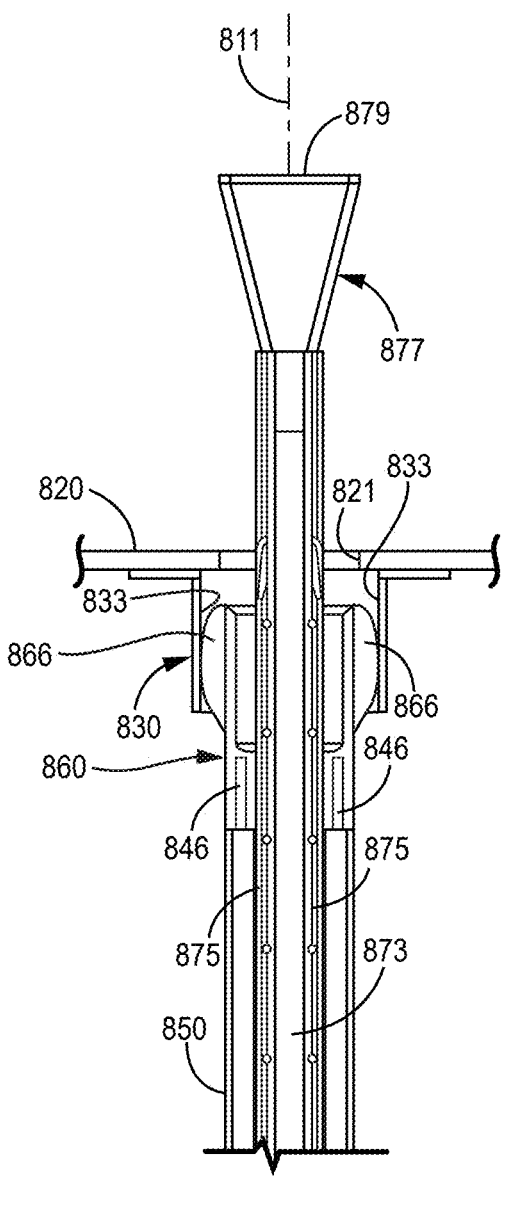

FIG. 24 is a cross-sectional view of the filter bag assembly as depicted in FIG. 22 taken at a location between the upper yoke member 872 and intermediate yoke member 873 depicted in FIG. 23.

Figure 25:
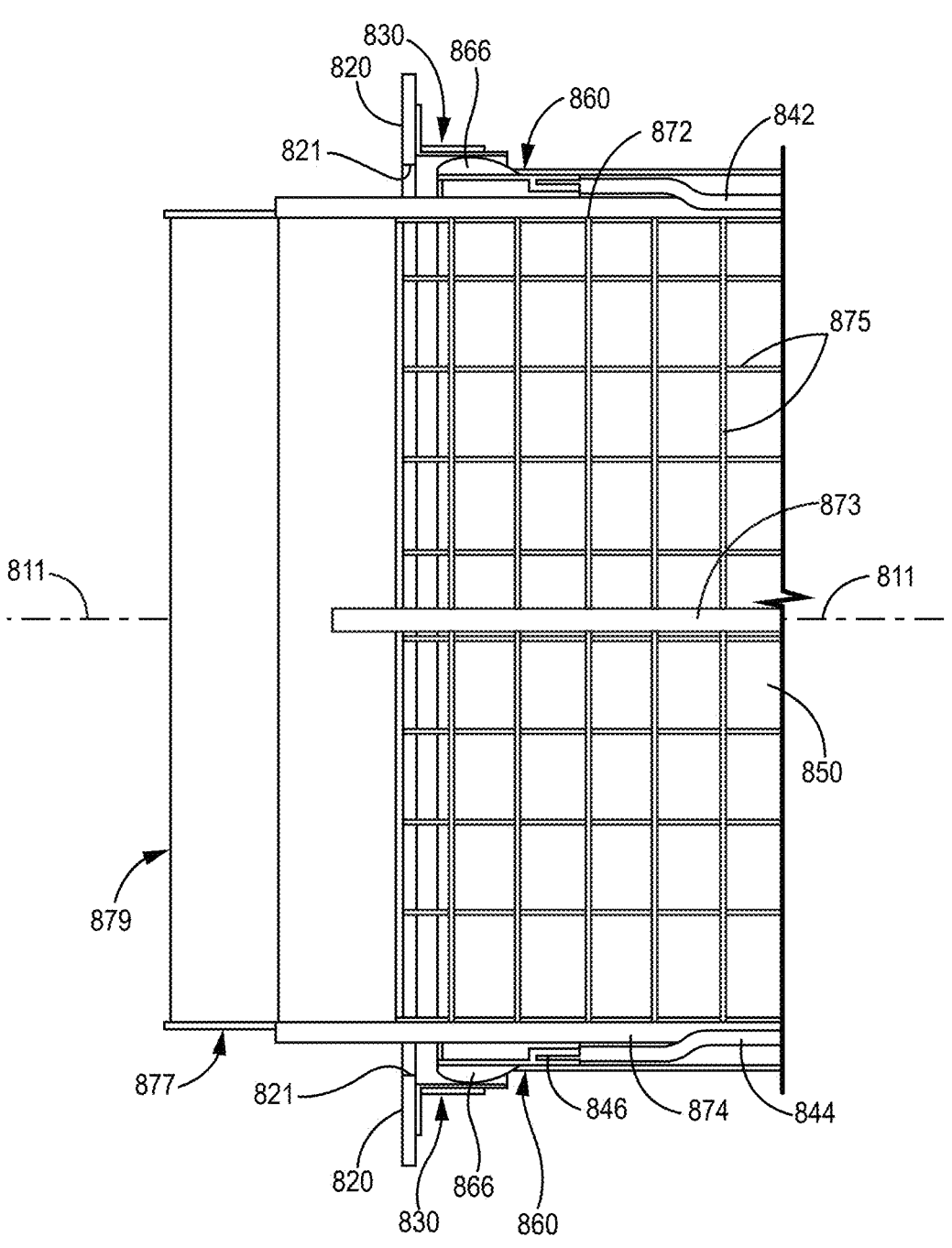

FIG. 25 is an enlarged cross-sectional view of the components of the filter bag assembly of FIGS. 22-24 taken along line 23-23 in FIG. 22 proximate the tubesheet 820.

Figure 26:
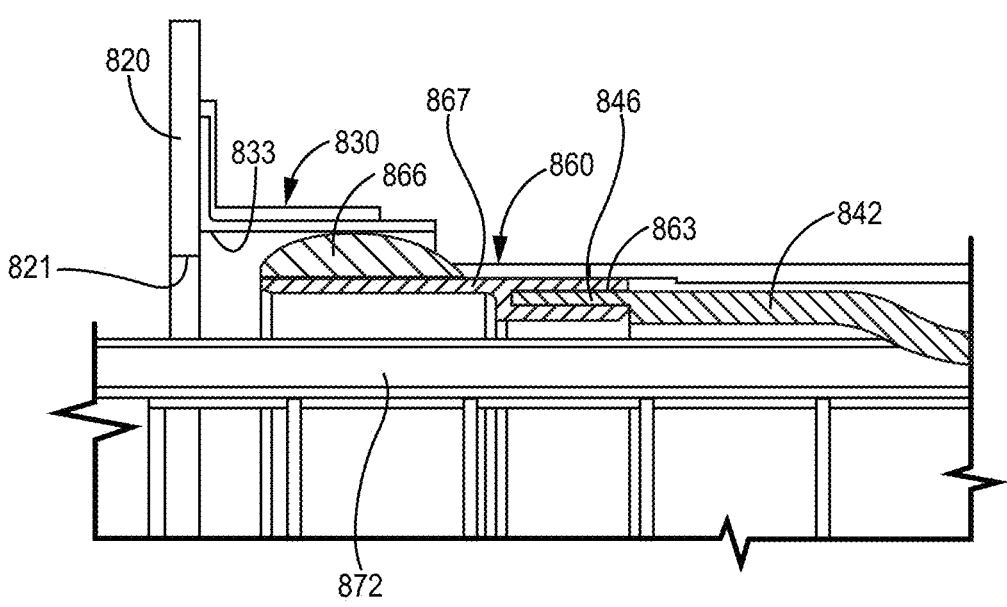

FIG. 26 is an enlarged cross-sectional view of the arrangement of the receiver 830 and pocket gasket 860 and related components of the filter bag assembly of FIGS. 22-25.

Figure 27:
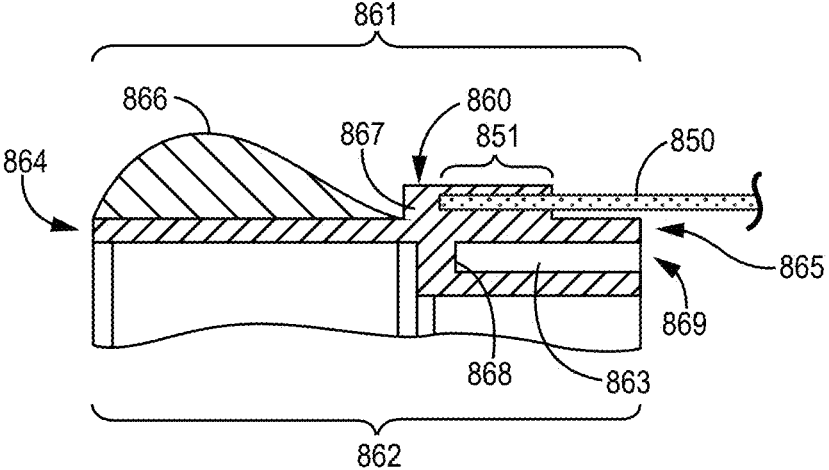

FIG. 27 is an enlarged cross-sectional view of the pocket gasket 860 and filter bag 850 isolated from the other components depicted in FIG. 26.

Figure 28:
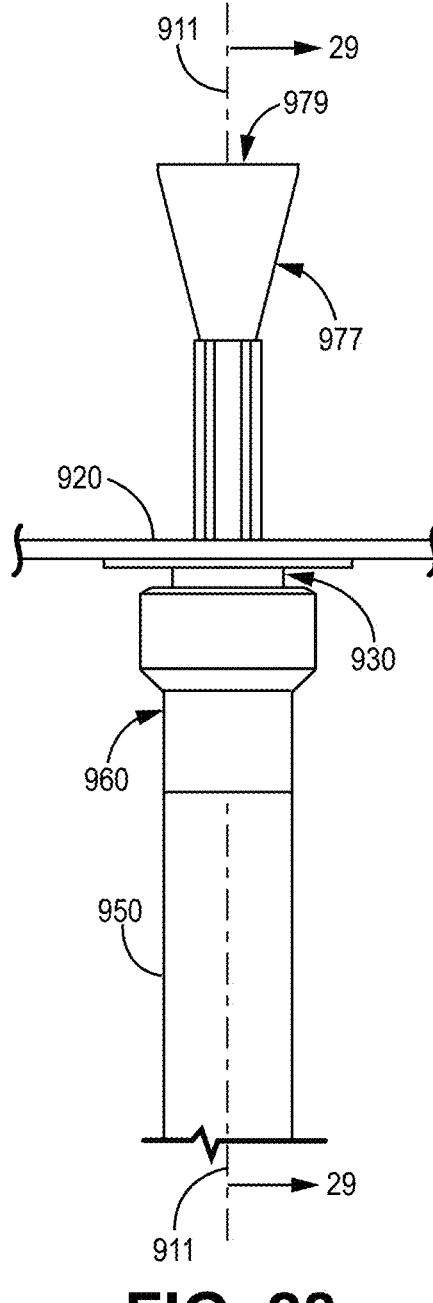

FIG. 28 is a top view of a portion of another illustrative embodiment of a filter bag assembly mounted on a yoke assembly of another illustrative embodiment of an air filter system including a tubesheet and a receiver as described herein.

Figure 29:
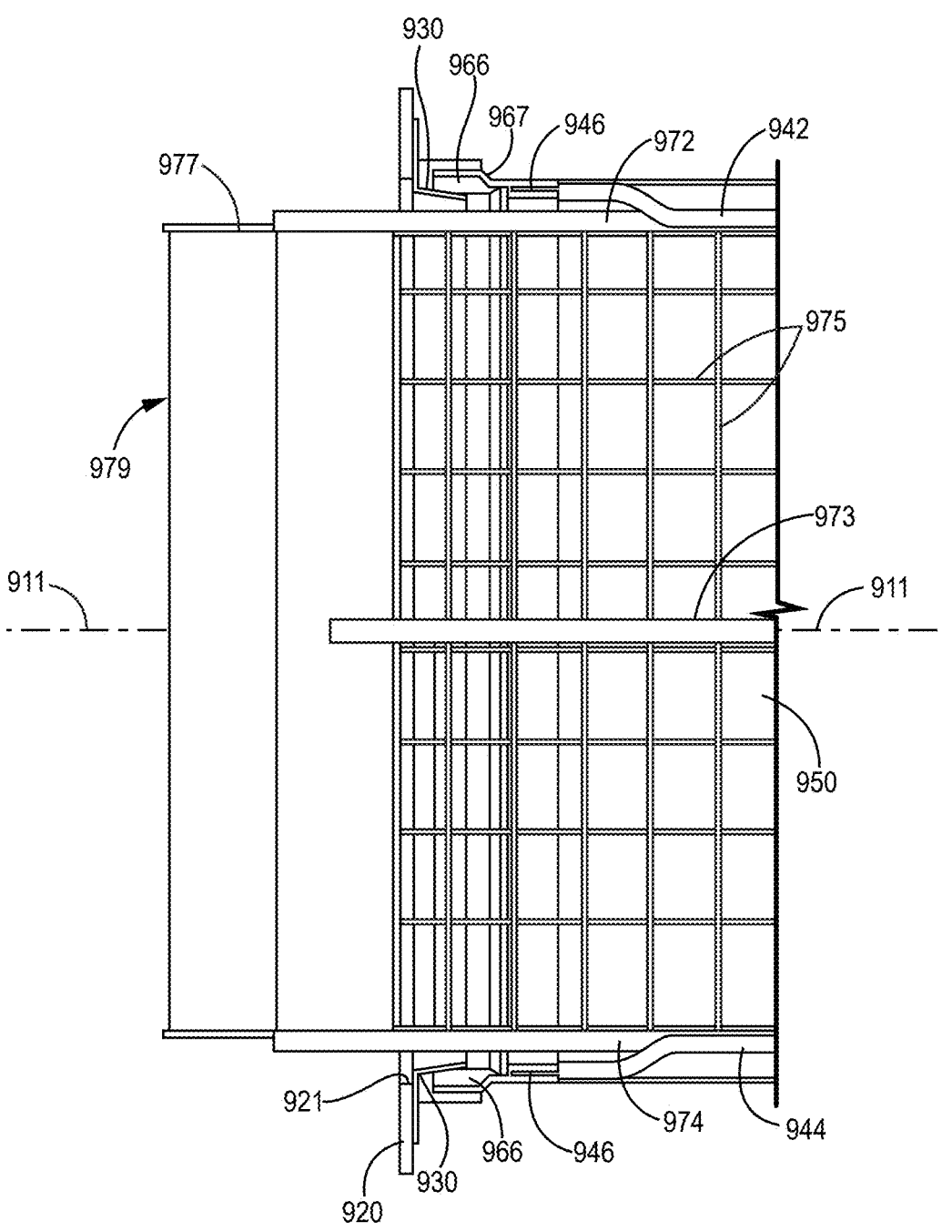

FIG. 29 is an enlarged cross-sectional view of the components of the filter bag assembly of FIG. 28 taken along line 29-29 in FIG. 28.

Figure 30:
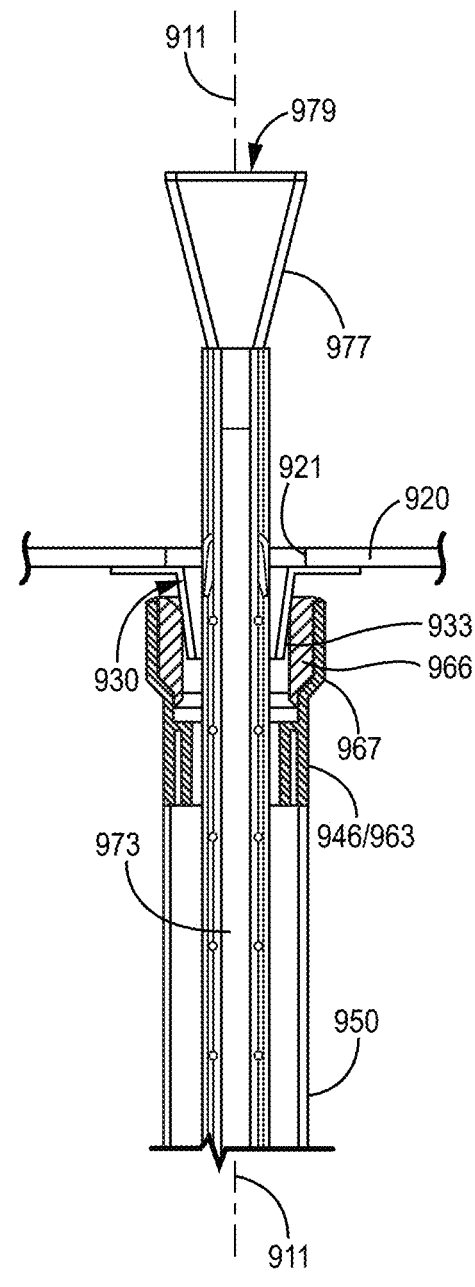

FIG. 30 is a cross-sectional view of the filter bag assembly as depicted in FIG. 28 taken at a location between upper yoke member 972 and intermediate yoke member 973 depicted in FIG. 29.

Figure 31:
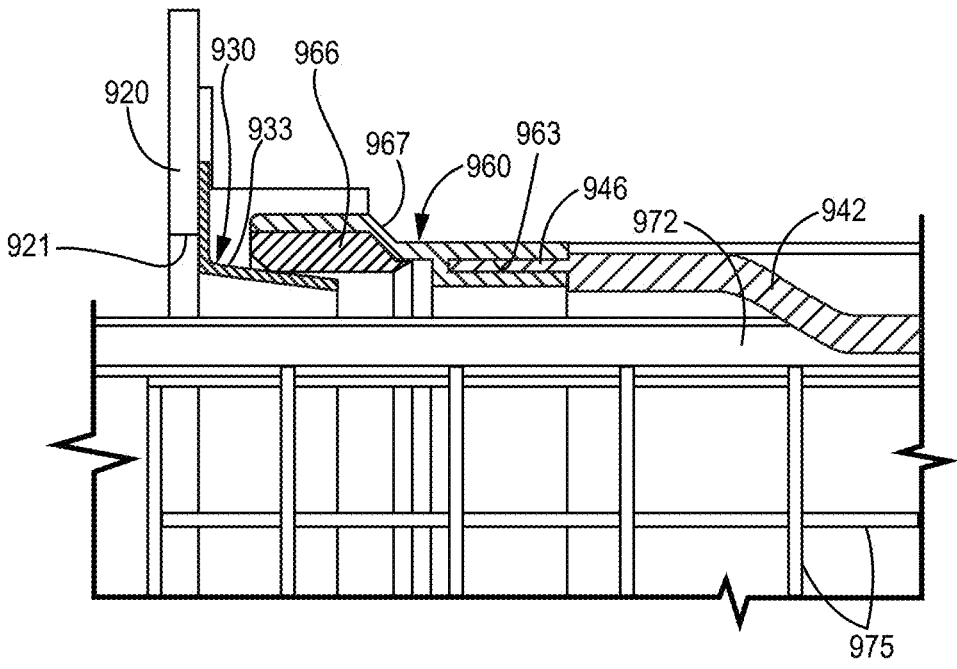

FIG. 31 is an enlarged cross-sectional view of the arrangement of the receiver 930 and pocket gasket 960 and related components of the filter bag assembly of FIGS. 28-30.

Figure 1:
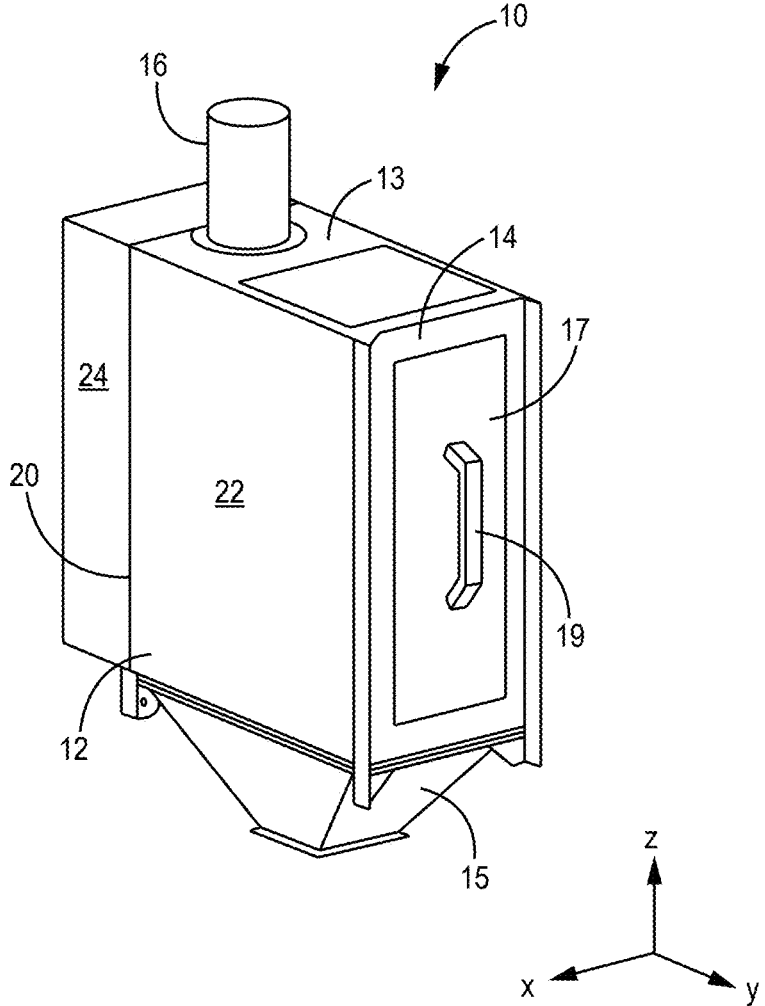
FIG. 1 is a perspective view of one illustrative embodiment of an air filter system as described herein.
Figures 1, 32:
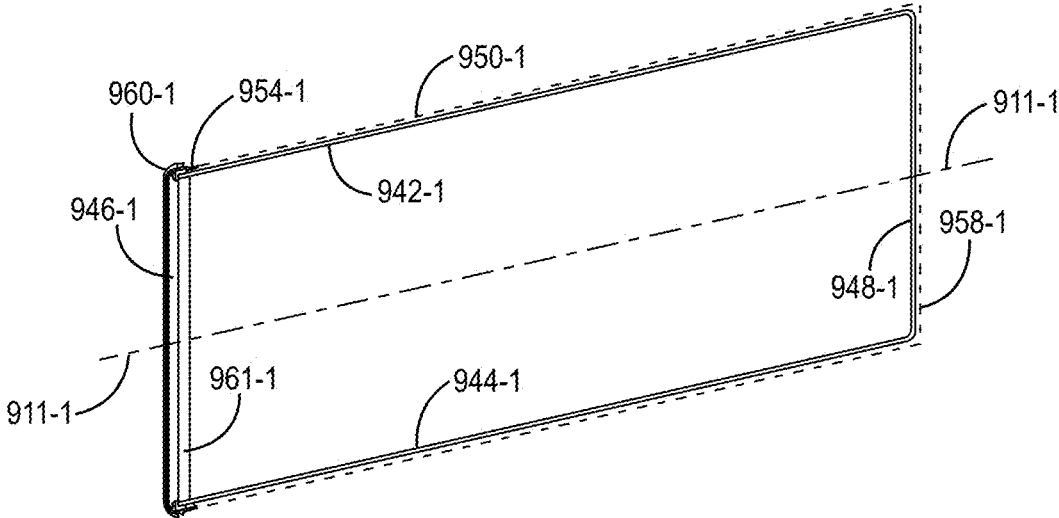

FIG. 32-1 is a perspective view of another illustrative embodiment of a gasket assembly and a service frame of a filter bag assembly with the filter bag depicted in broken lines to expose the service frame, with the gasket assembly depicted in cross-section along a plane defined by the service frame.

Figures 2, 32:
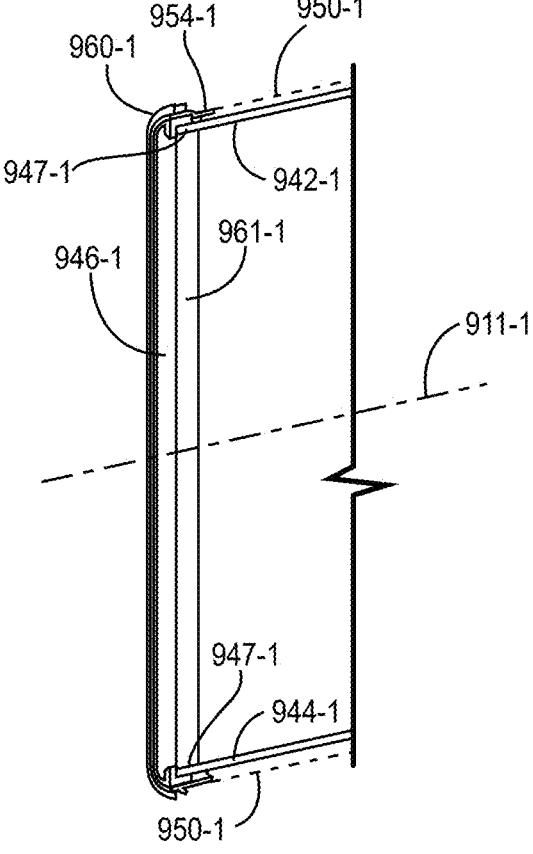
Figures 3, 32:
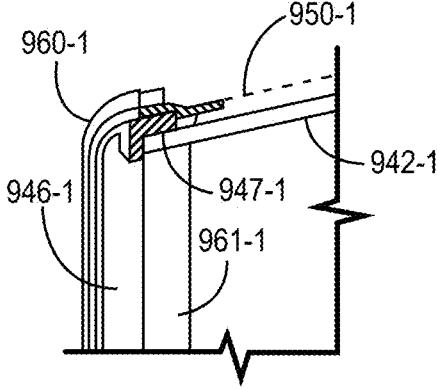
Figures 4, 32:
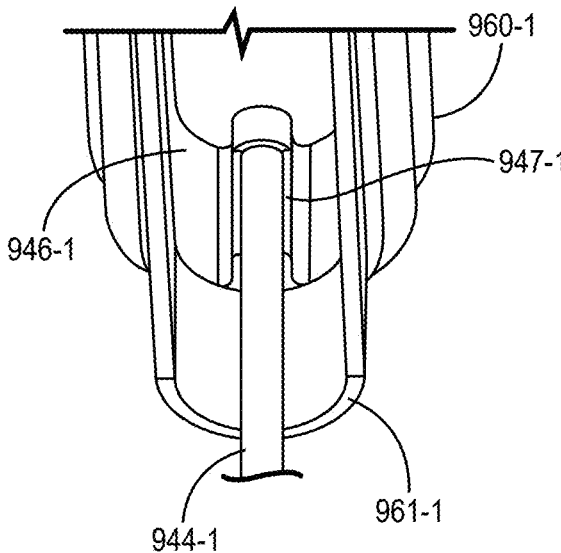
Figures 5, 32:
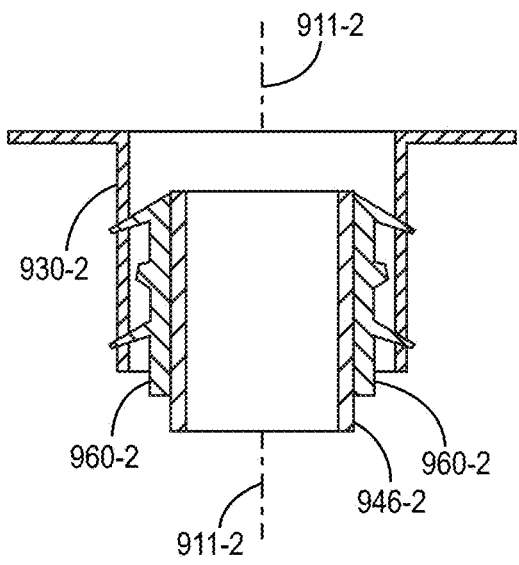
Figures 6, 32:
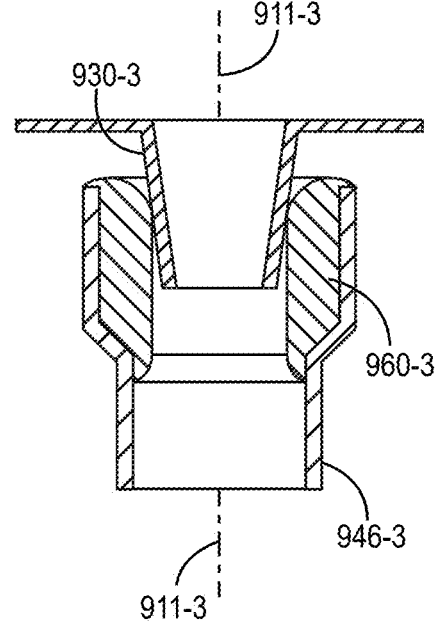

FIG. 32-2 is an enlarged view of the gasket assembly of FIG. 32-1.

Figure 3:
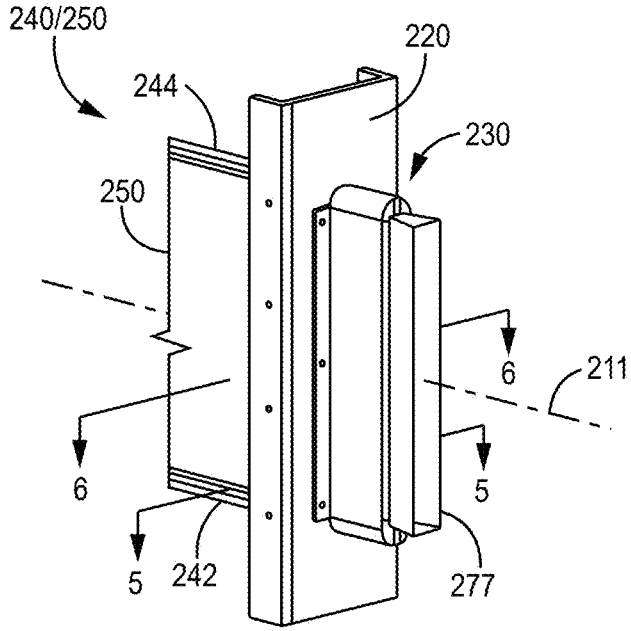
FIG. 3 is a perspective view of one illustrative embodiment of a filter bag assembly engaged within a receiver on a tubesheet of one illustrative embodiment of an air filter system as described herein.

FIG. 32-3 is an enlarged view of the junction between one extension strut of the service frame and the gasket assembly of FIGS. 32-1 and 32-2.

Figure 4:
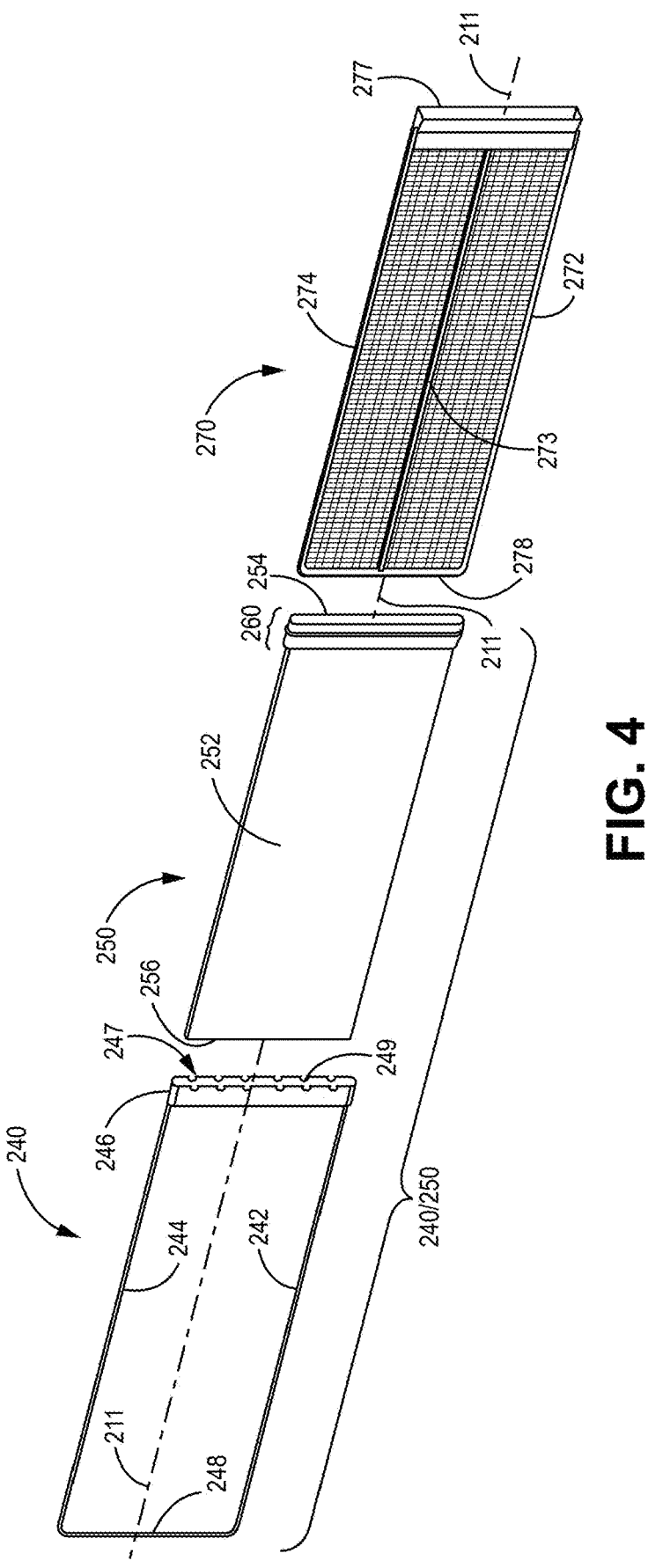
FIG. 4 is an exploded perspective view of one illustrative embodiment of a filter bag assembly as described herein along with a yoke assembly that may be used in conjunction with one or more embodiments of a filter bag assembly as described herein.

FIG. 32-4 is an enlarged view of the upper end of the gasket assembly of FIG. 32-1.

Figure 5:
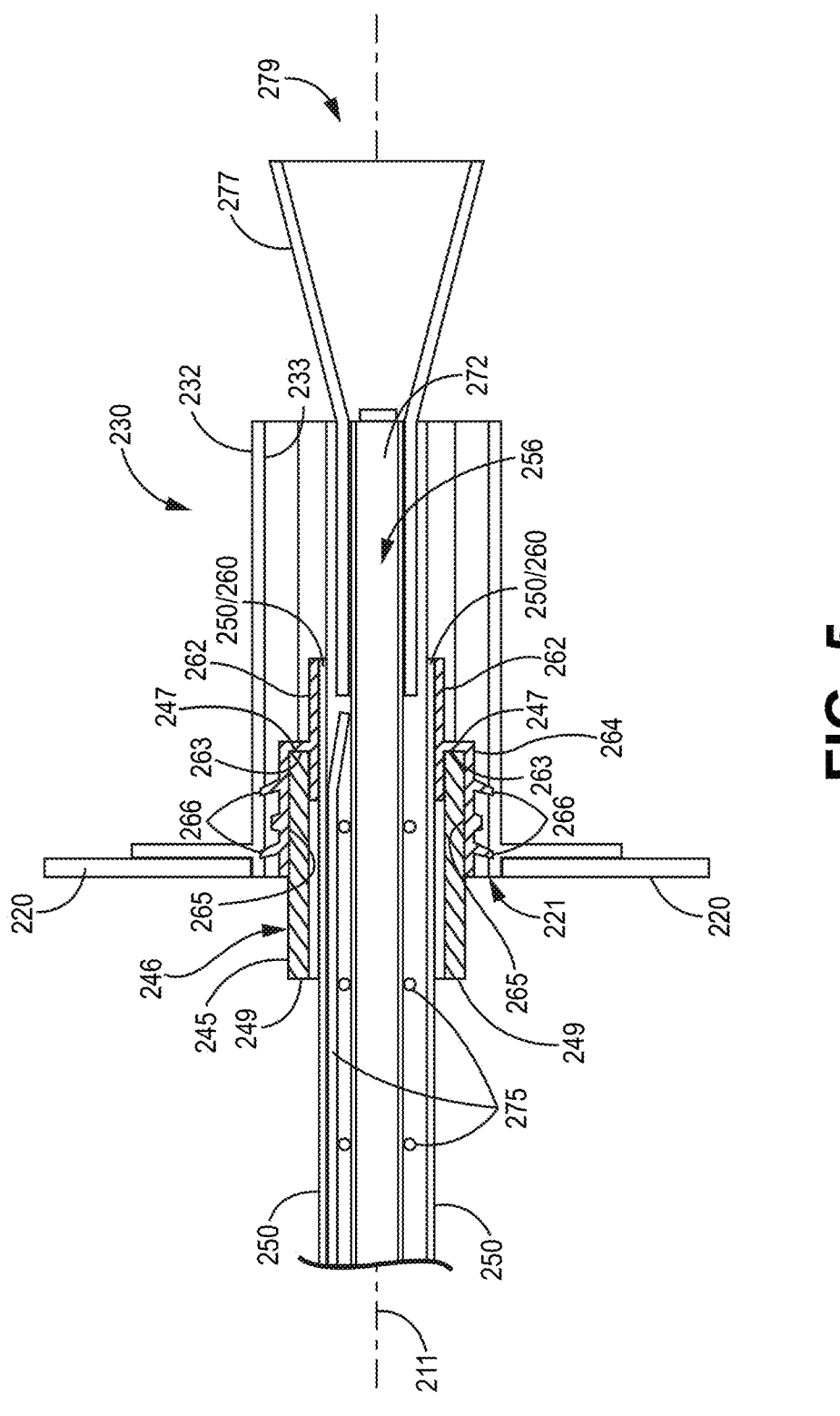
FIG. 5 is an enlarged cross-sectional view of the filter bag assembly, receiver, and tubesheet of FIG. 3 taken along line 5-5 in FIG. 3.

FIG. 32-5 is a cross-sectional view of another illustrative embodiment of a gasket assembly of a filter bag positioned in a receiver as described herein.

Figure 6:
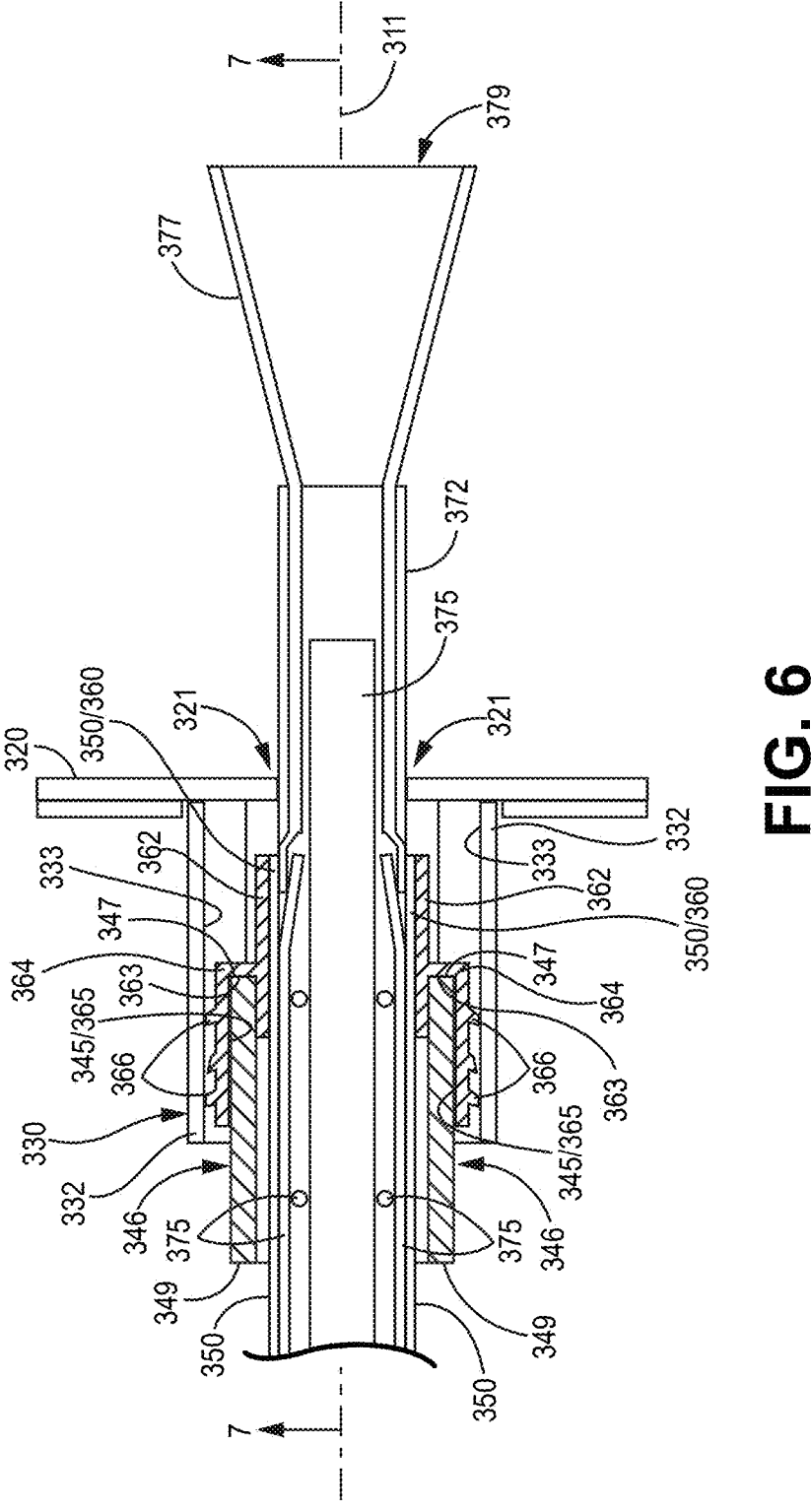
FIG. 6 is an enlarged cross-sectional view of another illustrative embodiment of a filter bag assembly engaged within a receiver on a tubesheet of another illustrative embodiment of an air filter system as described herein.

FIG. 32-6 is a cross-sectional view of another illustrative embodiment of a gasket assembly of a filter bag positioned on a receiver as described herein.

Figure 33:
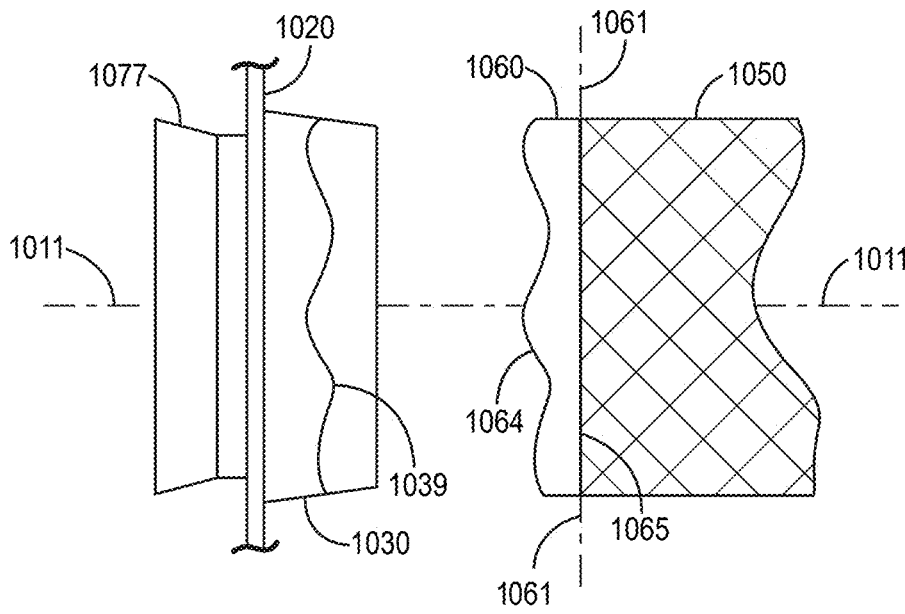

FIG. 33 is a diagram of another alternative embodiment of a filter system including a receiver and filter bag with gasket as described herein.

Figure 34:
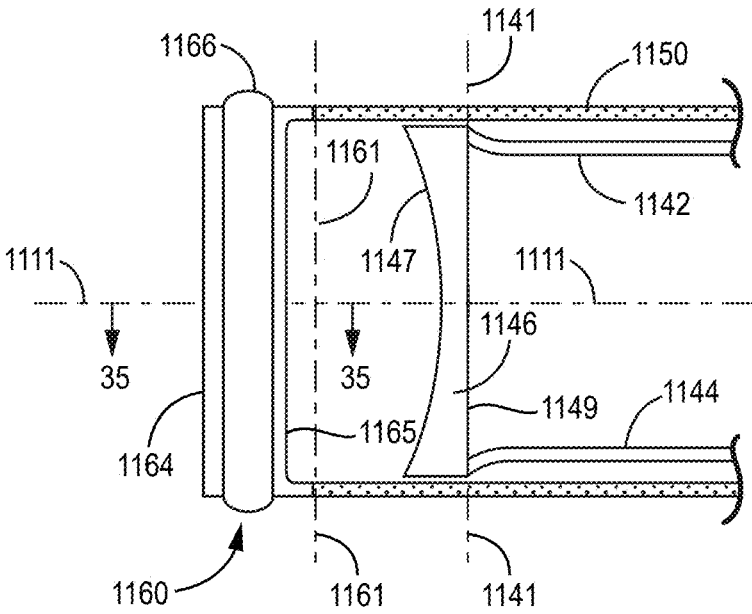

FIG. 34 is a diagram of another alternative embodiment of a filter bag with gasket and service frame as described herein.

Figure 35:
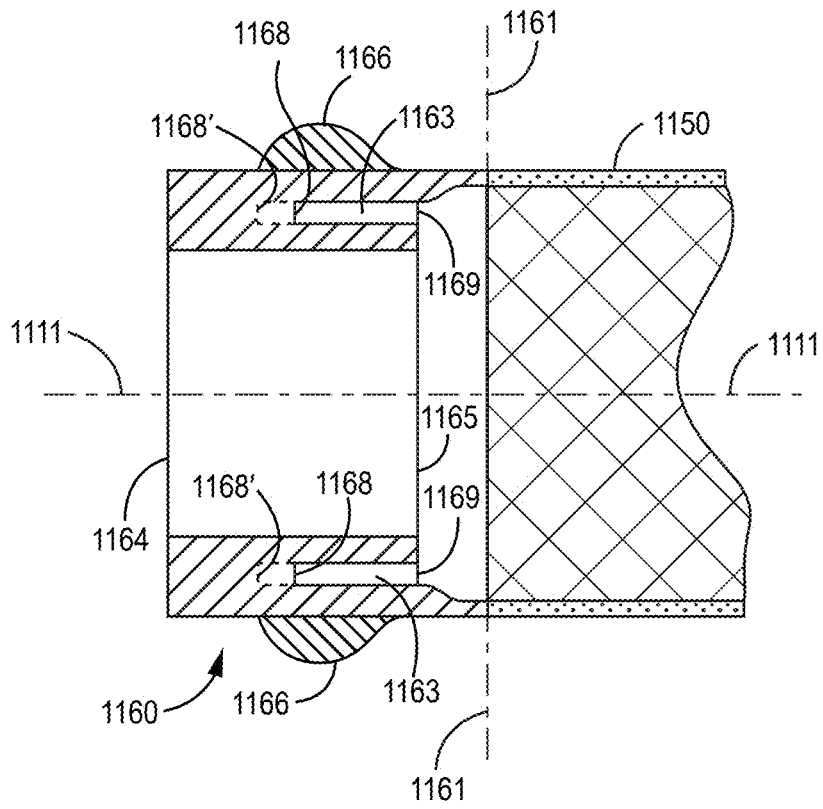

FIG. 35 is a cross-sectional view of the filter bag and gasket of FIG. 34 taken along line 35-35 in FIG. 34.

Figure 36:
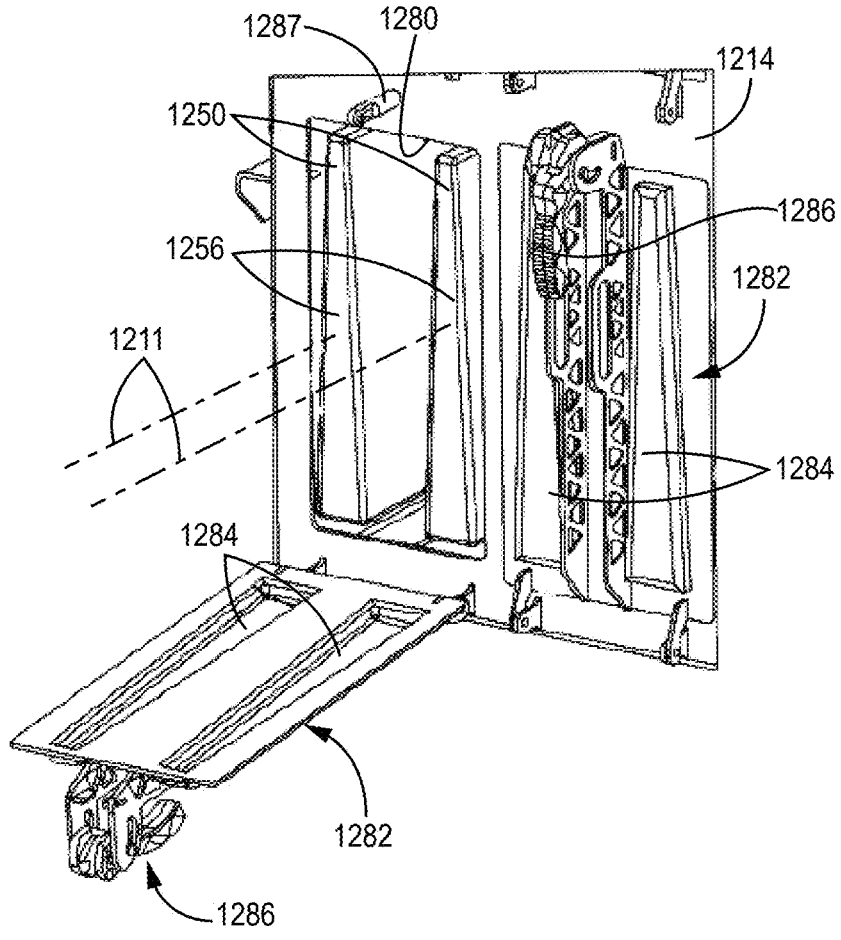

FIG. 36 is a perspective view of one illustrative embodiment of access ports and access port covers that may be used in one or more embodiments of the air filter systems described herein.

Figure 37:
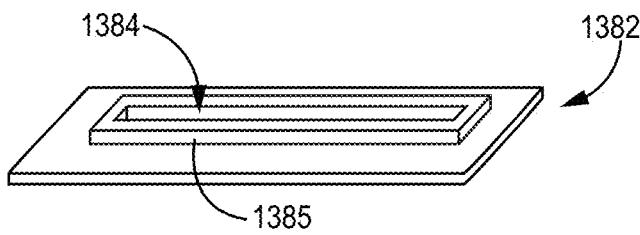

FIG. 37 is a perspective view of one alternative access port cover that may be used in one or more embodiments of the air filter systems described herein.

FIGS. 38A-38B depict another alternative access port cover that may be used in one or more embodiments of the air filter systems described herein.

FIGS. 39A-39C depict another alternative access port cover that may be used in one or more embodiments of the air filter systems described herein.

Figure 40A:
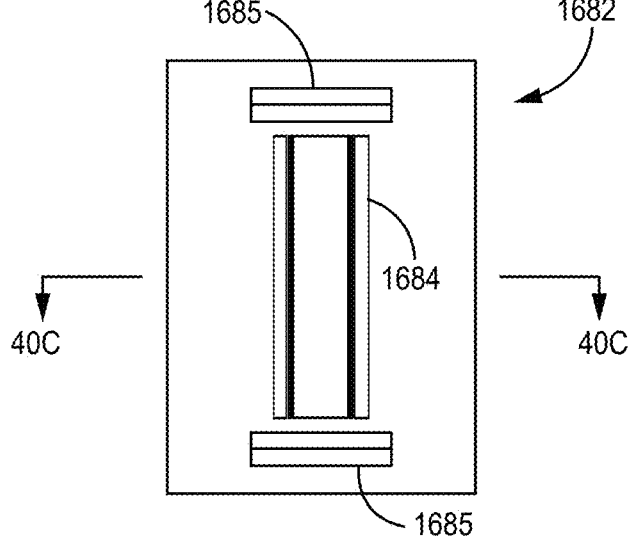
Figure 40B:
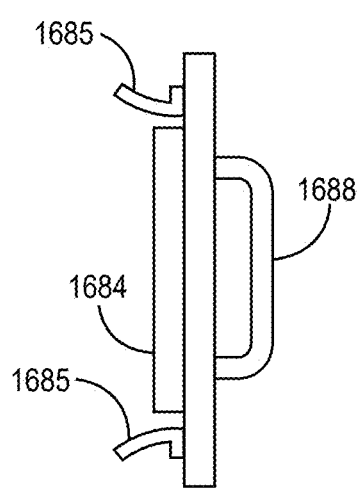
Figure 40C:
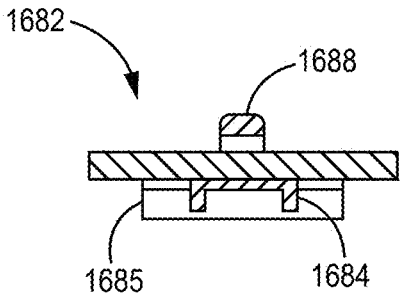

FIGS. 40A-40C depict another alternative access port cover that may be used in one or more embodiments of the air filter systems described herein.

Figure 41:
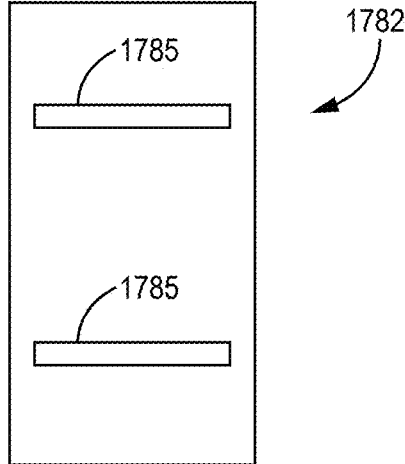

FIG. 41 depicts another alternative embodiment of an access port cover that may be used in one or more embodiments of the air filter systems described herein.

Figure 42:
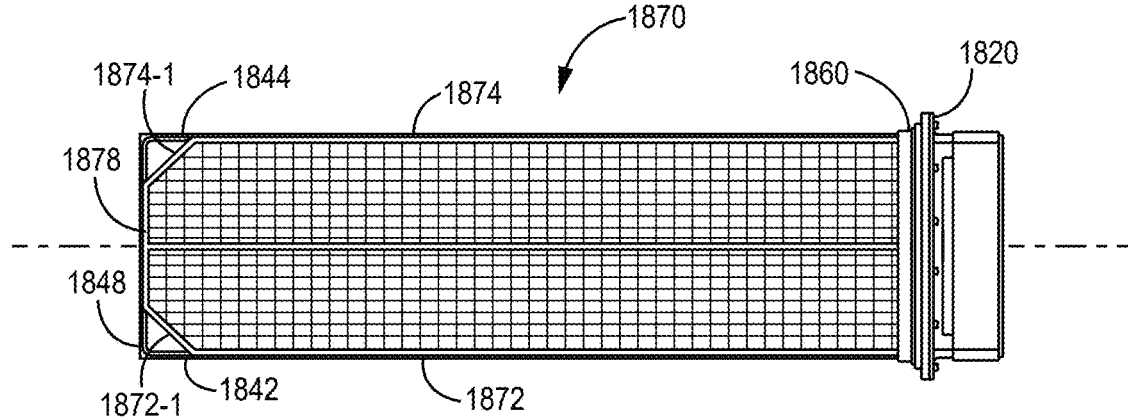

FIG. 42 is a side view of another illustrative embodiment of a filter bag assembly including a service frame mounted on a yoke such that a handle gap is provided between the service frame and the yoke.

FIG. 43 is an enlarged view of the closed end of the filter bag and distal ends of the service frame and yoke of FIG. 42.

FIGS. 44-45 depict two alternative illustrative embodiments of handle gaps defined between service frames and yokes.

FIGS. 46-49 depict illustrative embodiments of handles provided at the closed ends of one or more embodiments of filter bags as described herein.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be used and structural changes may be made without departing from the scope of the present invention.

FIG. 1 depicts one illustrative embodiment of an air filter system 10. The air filter system 10 depicted in FIG. 1 is generally in the shape of a box and includes a pair of opposite side wall panels 12 (only one of which is depicted in FIG. 1), an upper wall panel 13 and an access panel 14. Also depicted in the air filter system 10 of FIG. 1 is the edge of a tubesheet 20 separating the housing of the air filter system 10 into a dirty air chamber 22 and a clean-air chamber 24.

The air filter system 10 also includes a dirty air inlet 16 for receiving dirty or contaminated air (i.e., air with particulate matter entrained therein) into the dirty air chamber 22. Although not shown, the air filter system 10 also includes a clean-air outlet to remove clean or filtered air from the clean-air chamber 24 of the air filter system 10. A hopper 15 is located below the dirty air chamber 22 to collect particulate matter separated from the dirty air stream as described herein. The hopper 15 may include sloped walls to facilitate collection of the particulate matter and may, in one or more embodiments, include a driven auger or other mechanism for removing the collected particulate matter.

The depicted air filter system 10 also includes an access panel cover 17 having a handle 19, with the access panel cover 17 closing an opening in the access panel 14 through which filter bag assemblies as described herein can be removed from and/or placed into the dirty air chamber 22 of the air filter system 10.

Figure 2A:
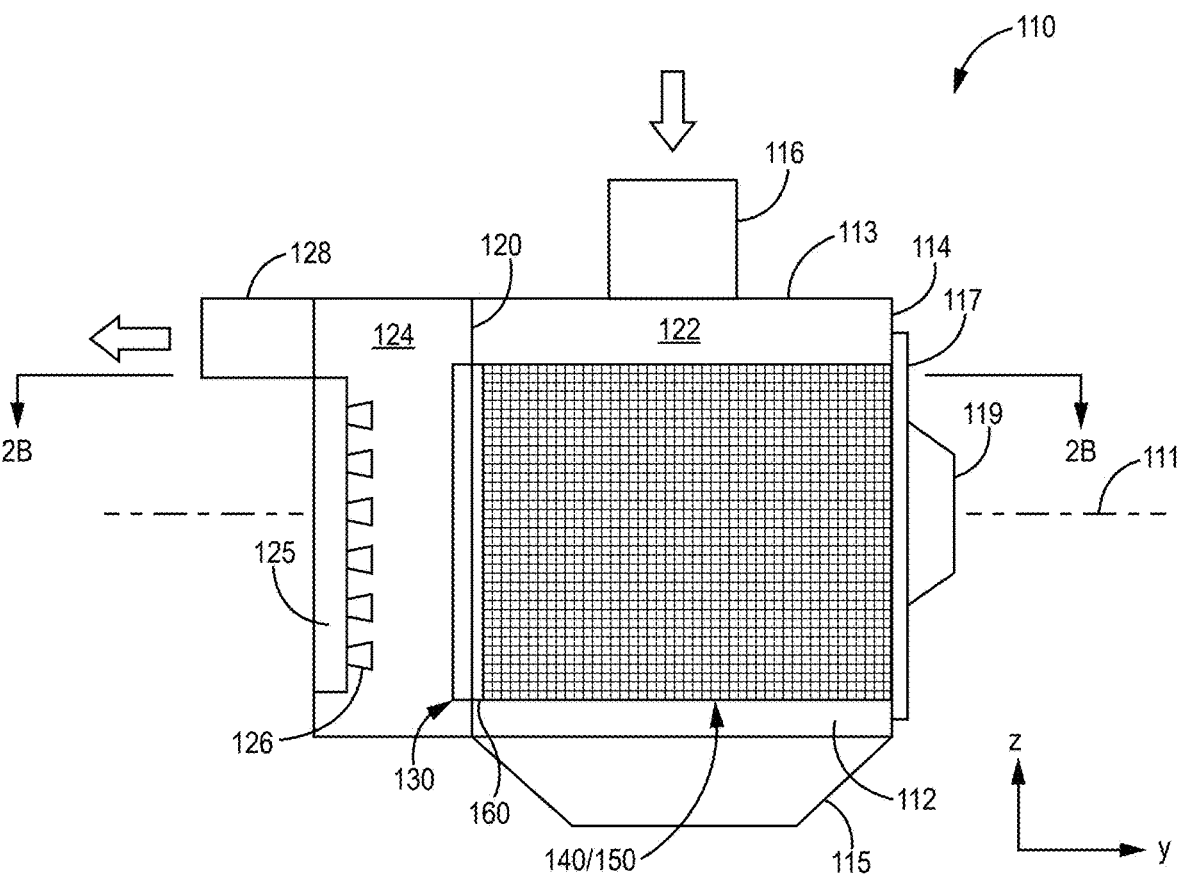
FIG. 2A depicts the components in another illustrative embodiment of an air filter system as described herein.

FIG. 2A depicts components that may be found in one or more embodiments of an air filter system as described herein. Similar to air filter system 10 depicted in FIG. 1, the depicted embodiment of air filter system 110 includes an upper wall panel 113 and an access panel 114 along with a tubesheet 120 separating a dirty air chamber 122 from a clean-air chamber within the air filter system 110. Also included are a hopper 115 located below the dirty air chamber 122 and an access panel cover 117 having a handle 119, the access panel cover 117 closing an opening in the access panel 114 through which a filter bag assembly 140/150 can be removed from and/or placed into the dirty air chamber 122.

Also depicted in FIG. 2A are a receiver 130 and a pocket gasket 160 on the filter bag 150 of the filter bag assembly 140/150. As described herein, the pocket gasket 160 forms a seal with the receiver 130 such that air passing through an aperture in the tubesheet 120 must pass through the filter bag 150 of the filter bag assembly 140/150 when entering into or leaving the dirty air chamber 122 through the aperture in the tubesheet 120.

Other features depicted in FIG. 2A include components for a pulse cleaning apparatus including a manifold 125 and nozzles 126 configured to direct pulses of air or another pressurized gas through the receiver and into the interior volume of the filter bag 150 of the filter bag assembly 140/150. Details regarding such a pulse cleaning system and its operation are well-known and will not be described further herein. The components of the pulse cleaning apparatus are located within the clean-air chamber. Another feature depicted in FIG. 2 in connection with air filter system 110 are a dirty air inlet 116 configured to receive dirty or contaminated air into the dirty air chamber 122 and a clean-air outlet 128 configured to remove clean or filtered air from the clean-air chamber 124.

Although not specifically depicted in FIG. 2A, the filter bag 150 of the filter bag assembly 140/150 includes a bag opening proximate the pocket seal 160 and a closed end proximate the access panel 114. The filter bag 150 is typically manufactured of a flexible filter sheet material that defines an interior volume of the filter bag 150. The filter bag 150 further defines a filter bag axis 111 extending through the bag opening (located proximate the pocket gasket 160) and the closed end of the filter bag 150 (located proximate the access panel 114).

Figure 2B:
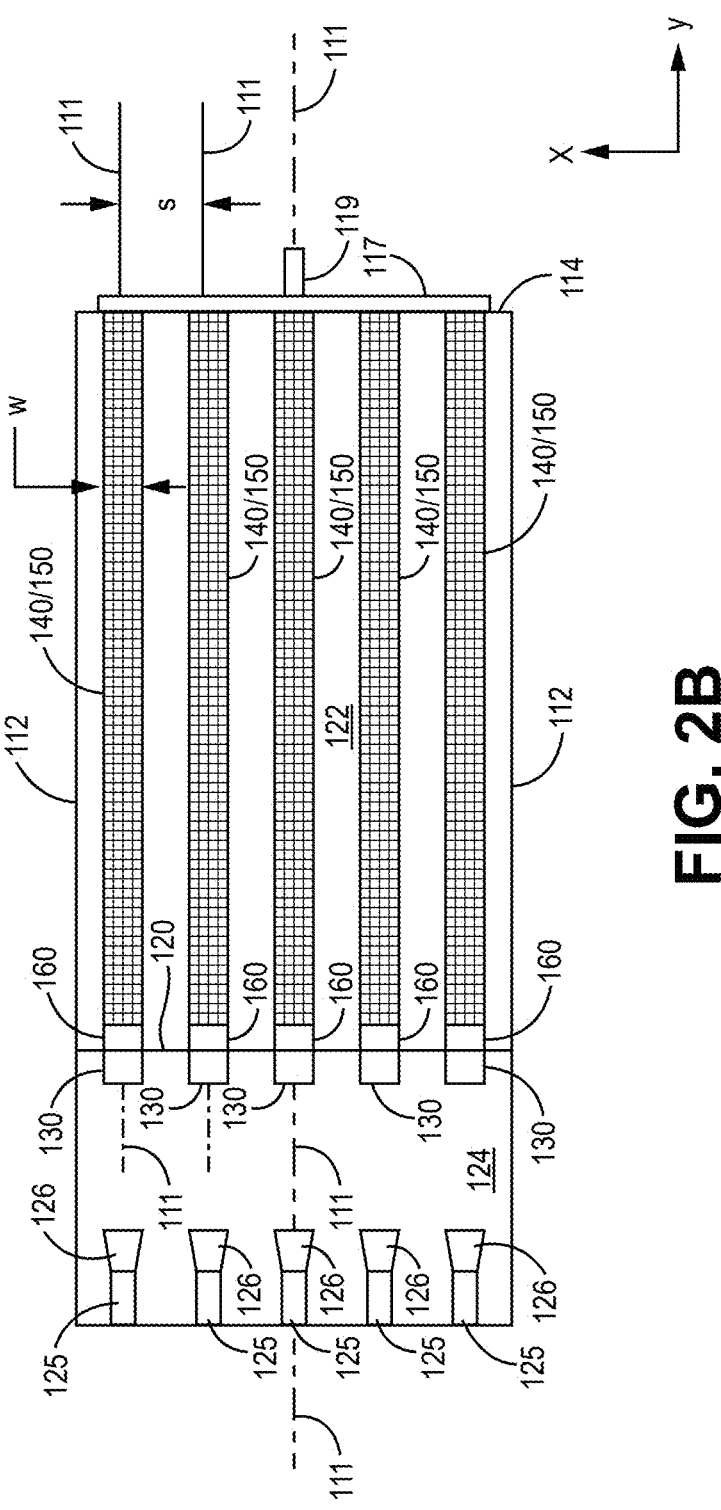
FIG. 2B depicts the components of the air filter system of FIG. 2A taken along line 2B-2B in FIG. 2A.

FIG. 2B is a view of the air filter system 110 of FIG. 2A with the top panel 113 removed to expose the components inside the housing. The depicted components include a set of receivers 130 and pocket gaskets 160 on the filter bags 150 of the filter bag assemblies 140/150. As described herein, the pocket gaskets 160 form a seal with the receivers 130 such that air passing through the apertures in the tubesheet 120 must pass through the filter bags 150 of the filter bag assemblies 140/150 when entering into or leaving the dirty air chamber 122 through the apertures in the tubesheet 120. Also depicted in FIG. 28 are components for the pulse cleaning apparatus including a set of manifolds 125 and nozzles 126 configured to direct pulses of air or another pressurized gas through the receivers 130 and into the interior volumes of the filter bags 150 of the filter bag assemblies 140/150.

As described and/or depicted herein in connection with the filter bags used in one or more embodiments of the air filter systems described herein, the filter bags may be in the form of an envelope style filter bag having two major sides connection along a pair of edges that extend from the bag opening to the closed end of the filter bag. The distance between the two major sides of the filter bags may, in one or more embodiments, be generally uniform.

The distance between the two sides may also be relatively small as compared to the height of the filter bags as measured between the edges as well as being relatively small as compared to the length of the filter bag as measured from the bag opening to the closed end of the bag. In one or more embodiments, the height of the filter bag may be 10 or more, 15 or more, or even 20 or more times the distance between the two major sides of the filter bag.

The distance between the two sides may also be relatively small as compared to the length of the filter bag as measured from the bag opening to the closed end of the bag. In one or more embodiments, the length of the filter bag may be 20 or more, 25 or more, or even 30 or more times the distance between the two major sides of the filter bag.

The view of the air filter system as depicted in FIG. 2B illustrates the spacing between the filter bag assemblies 140/150 when moving across the dirty air chamber 122 in the direction of the X axis of the Cartesian coordinate system as depicted in FIGS. 2A-2B (and also found in FIG. 1). Although the depicted embodiment includes a set of five filter bag assemblies 140/150, one or more embodiments of the air filter systems described herein may have as few as two, three, or four filter bag assemblies or six or more filter bag assemblies.

Among the feature depicted in connection with the uppermost pair of filter bag assemblies are filter bag axes 111 extending through the centers of the apertures located in the receivers 130 to which the filter bag assemblies 140/150 are attached. The filter bag axes 111 extend through the filter bags 150 to the center of closed ends of the filter bags located at the access panel 114/access panel cover 117.

The uppermost filter bag 150 has a width W measured along a width direction that extends along the X axis and is also transverse to both of the filter bag axes 111 extending through the uppermost pair of filter bag assemblies 140/150. In many embodiments, the width W will correspond to the distance between the two major sides of an envelope style filter bag.

The uppermost pair of filter bag assemblies 140/150 may be described as being adjacent each other when moving along the width direction. In one or more embodiments, the distance S between the filter bag axes 111 of the adjacent filter bag assemblies 140/150 as measured along the width direction (as defined herein) may be 3 or more times the width W of the first filter bag assembly 140/150. In one or more embodiments, the distance S may be 4 or more, 5 or more, or even 6 or more times the width W of the first filter bag assembly 140/150.

In those embodiments including three or more filter bag assemblies 140/150, the inter-assembly spacing between each pair of adjacent filter bag assemblies of the plurality of filter bag assemblies is the same as or greater than the distance S between uppermost pair of filter bag assemblies 140/150.

As compared to known filter bag systems, the spacing between the filter bag assemblies is increased even though doing so can reduce the surface area of the filter material making up the filter bags 150. To at least partially offset that reduction in filter material surface area, the filter bag assemblies 140/150 extend across the dirty air chamber from the receivers 130 to the access panel 114/access panel cover 117.

Increased spacing between the adjacent pairs of filter bag assemblies provides a number of advantages as compared to similar conventional air filter systems in which filter bags are located closer to each other. The advantages include, e.g., changes in flow characteristics such as reducing the interstitial velocities between the filters and potentially creating a more uniform flow field across the complete cross sectional zone in the dirty air chamber. The advantages also include, e.g., changes in the operational characteristics such as improved ability to allow dusts with stringy characteristics to fall down into the collection hopper without bridging or nesting between the filter bags, improved ability to allow dusts with fluffy (e.g., low density) characteristics to fall down into the collection hopper without remaining suspended within the dirty air chamber between adjacent filter bags, and improved ability to resist abrasion that can be caused by high velocity zones between filter bags that are spaced closer together.

One illustrative embodiment of a filter bag assembly 240/250 engaged with a receiver 230 on a tubesheet 220 of an air filter system is depicted in a perspective view in FIG. 3. Although only a portion of the filter bag assembly 240/250 is depicted in FIG. 3, the filter bag axis 211 defined by the filter bag 250 of the filter bag assembly 240/250 is also depicted in FIG. 3. A pair of extension struts 242 and 244 of the service frame on which filter bag 250 is mounted are also depicted in FIG. 3.

FIG. 4 depicts the filter bag assembly 240/250 in an exploded view along with a yoke assembly 270 on which the filter bag assembly 240/250 is located when the filter bag assembly 240/250 is engaged with the receiver 230 as depicted in FIG. 3. Filter bag assembly 240/250 includes a service frame 240 and a filter bag 250. As described herein, the filter bag assembly 240/250 is configured for installation in and removal from the dirty air chamber of an air filter system through an access port in an access panel of the air filter system.

The depicted illustrative embodiment of filter bag 250 includes a bag opening 254 and a closed end 256, with the filter bag 250 being constructed of a flexible filter sheet material in the body 252 that defines an interior volume of the filter bag 250. As described herein, the filter bag 250 extends along a filter bag axis 211 that extends through the bag opening 254 and the closed end 256 of the filter bag 250.

Filter bag 250 also includes a pocket gasket 260 extending around the bag opening 254. The pocket gasket 260 includes, as described herein, a pocket configured to receive the support ring 246 of the service frame 240 when the filter bag 250 is mounted on the service frame 242 form a filter bag assembly 240/250 as described herein. The pocket gasket 260 is preferably attached to the flexible filter sheet material of the body 252 in a manner that prevents the passage of air into or out of the interior volume defined by the filter bag 250 through the junction between the pocket gasket 260 and the flexible filter sheet material of the body 252. Suitable attachment techniques may include, but are not limited to, one or more of sewing, adhesives, tapes, thermal welding, chemical welding, etc.

The depicted illustrative embodiment of service frame 240 includes a support ring 246 and a distal end it strut 248, with a pair of extension struts 242 and 244 extending from the support ring 246 to the distal end it strut 248. In the depicted illustrative embodiment, the extension struts 242 and 244 along with distal end strut 248 define a generally rectangular service frame shape that is complementary with the shape of the filter bag 250. It should be understood, however, that the service frames used in one or more embodiments of air filter systems as described herein may take a variety of other shapes, although it may be preferred that the shape of the service frame be complementary to the shape of the filter bag to be used with the service frame.

The extension struts 242 and 244 along with distal end strut 248 may be constructed of any suitable material rigid enough to maintain its shape when a filter bag 250 is mounted thereon. In one or more embodiments, the struts 242, 244, 248 may be constructed of solid or hollow metal rods/tubes although any other suitable material and or shape may be substituted for the metal rods/tubes.

The support ring 246 may also be constructed of any suitable material rigid enough to maintain its shape when a filter bag 250 is mounted on the service frame 240. In one or more embodiments, the support ring 246 may be constructed of a metal sheet material forming a ring shape capable of holding the filter bag opening 254 open and in a shape configured to be received on or in a receiver of an air filter system as described herein.

As described herein, the body 252 of the filter bag 250 is constructed of filter sheet material configured to filter air or any other gas passing through the filter sheet material forming the body 252 with particulate matter entrained in the air or other gas being captured within or on the filter sheet material forming the body 252. In general, the filter sheet material is flexible enough such that the filter sheet material is capable of being flexed during pulse cleaning as described herein with that flexing or movement of the filter sheet material preferably resulting in removal of at least a portion of the particulate matter captured within or on the filter sheet material forming the filter body 252. The construction of such filter sheet material is well known to those skilled in the art and may, for example, include woven materials, nonwoven materials, paper, etc. selected in view of the particulate matter to be collected, airflow requirements, strength requirements, etc. Suitable filter bags may be constructed of filter sheet material that includes one or more of polyester, polypropylene, aramid, polyester/polytetrafluoroethylene material in both woven and/or nonwoven constructions, etc.

In one or more embodiments, the filter bags described herein may be distinguished from filter cartridges based on their response to compression forces directed between the filter bag opening the closed end of the filter bag, i.e., the end of the bag located opposite the bag opening. In the absence of any extraneous support (such as, for example, the service frames described herein as part of the filter bag assemblies), filter bags described herein would, in one or more embodiments, deform under a compressive force of 5 Newtons (approx. 1.1 pound-force) directed along a line extending through the bag opening to the closed end of the filter bag (for example, along the bag axis 211 depicted in FIG. 4). In addition to deforming, one or more embodiments of the filter bags used in the filter bag assemblies described herein, transmit essentially none of such a compressive force. A filter cartridge would, in contrast, not significantly deform and would transmit most, if not all, of such a compressive force. The flexibility of the filter sheet material that is the source of the inability of the filter bags used in the filter bag assemblies and filter systems described herein to transmit compressive forces is, however, the source of the filter bags' ability to rapidly accelerate (sometimes referred to as "snap") outward to remove particulate matter collected by the filter sheet material in response to a cleaning pulse.

The illustrative embodiment of the yoke assembly 270 depicted in FIG. 4 includes a lower yoke member 272, an upper yoke member 274 and a distal end yoke member 278. Yoke assembly 270 also includes, in the depicted illustrative embodiment, a pulse collector 277, with the lower yoke member 272 and upper yoke member 274 attached to the pulse collector 277. Together, the lower yoke member 272, upper yoke member 274, distal end yoke member 278, and pulse collector 277 define a generally rectangular shape.

The yoke assembly 270 also includes an intermediate support structure 275 extending between the lower yoke member 272 and upper yoke member 274. The intermediate support structure 275 includes members extending both between the lower and upper yoke members 272, 274 as well as between the distal end yoke member 278 and the pulse collector 277. The intermediate support structure 275 is configured to prevent unwanted collapse of filter bag 250 during filtering of particulate matter from dirty air delivered into a dirty air chamber in which the filter bag assembly 240/250 is positioned over the yoke assembly 270. The depicted illustrative embodiment of yoke assembly 270 also includes an intermediate yoke member 273 extending from the pulse collector 277 to the distal end yoke member 278 may provide additional structural integrity to the yoke assembly 270 as well as support for the intermediate support structure 275.

The depicted illustrative embodiment of yoke assembly 270 is stationary and fixed within the dirty air chamber of an air filter system, with the filter bag assembly 240/250 being configured to fit over the yoke assembly 270 such that the yoke assembly 270 is essentially positioned within the interior volume of the filter bag 250 mounted on service frame 240. As a result, removal of the filter bag assembly 240/250 to replace the filter bag 250 requires removal of only the service frame 240 and filter bag 250, leaving the yoke assembly 270 in place within the dirty air chamber of the air filter system. That arrangement results in a filter bag assembly 240/250 having a significantly reduced weight as compared to filter bag assemblies of air filter systems in which yoke assemblies or at least the intermediate support structures are removed from dirty air chambers with the filter bag assemblies during replacement of the filter bags.

FIG. 5 is an enlarged cross-sectional view of the filter bag assembly 240/250 and yoke assembly 270 of FIG. 4 assembled with a receiver 230 mounted on a tubesheet 220 in one illustrative embodiment of an air filter system as described herein (the view being taken along line 5-5 in FIG. 3). The receiver 230 includes a wall 232 surrounding an aperture 221 in tubesheet 220. Wall 232 of receiver 230 includes an interior sealing surface 233. Also mounted within aperture 221 in tubesheet 220 is the yoke assembly 270 including pulse collector 277 along with lower yoke member 272 and intermediate support structure 275 of the yoke assembly 270.

Pulse collector 277 includes an opening 279 through which air enters into the interior volume of the filter bag 250 and exits the interior volume of the filter bag 250. It should be understood that pulse collector 277 is optional and may or may not be provided in one or more embodiments of the air filter systems and filter bag assemblies used therein. For example, in one or more embodiments, the receiver 230 may function as a pulse collector.

FIG. 5 depicts the interaction between the filter bag assembly 240/250 and the receiver 230 as well as the yoke assembly 270. The depicted illustrative embodiment of filter bag assembly 240/250 includes, as discussed herein, filter bag 250 mounted on a service frame 240 as seen in, e.g., FIGS. 3-4. In the cross-sectional view of FIG. 5, only the support ring 246 of the service frame 240 is visible, with the support ring 246 having an exterior surface 245 facing the interior sealing surface 233 of the receiver 230 when the filter bag assembly 240/250 is in its operating position with respect to the receiver 230 and the yoke assembly 270.

The pocket gasket 260 on the filter bag 250 is also seen in the cross-sectional view of FIG. 5. The depicted embodiment of pocket gasket 260 includes an inner member 262 and an outer member 264 attached to an exterior surface of the inner member 262 at a location between the edges of the inner member 262 of the pocket gasket 260. The pocket gasket 260 includes a pocket 263 formed between the inner member 262 and the outer member 264 with the leading edge of the 247 of the support ring 246 positioned in the pocket 263. Although not depicted in FIG. 5, the extension struts 242 and 244 of the service frame 240 of the filter bag assembly 240/250 extend away from the tubesheet 220 towards an access panel of the air filter system in which the components depicted in FIG. 5 are located.

The pocket gasket 260 is attached to the filter sheet material of the filter bag 250 at a seam 250/260 that is, in the depicted embodiment, located forward of the pocket 263 of pocket gasket 260 and leading edge 247 of support ring 246. For proper operation of the air filter system, the seam 250/260 at which the pocket gasket 260 is attached to the filter bag 250 prevents the passage of air into or out of the interior volume of the filter bag 250 through the junction between the pocket gasket 260 and the filter bag 250 at the bag opening. Suitable attachment techniques used at the junction between the filter bag 250 and the pocket gasket 260 may include, but are not limited to, one or more of sewing, adhesives, tapes, thermal welding, chemical welding, etc.

In the depicted illustrative embodiment, the outer member 264 of the pocket gasket 260 defines an interior surface 265 mounted on the support ring 246 such that the interior surface 265 forms a seal with the exterior surface 245 of the support ring 246. As a result, air is prevented from passing between the interface between the outer member 264 of the pocket gasket 260 and the support ring 246 when the pocket gasket 260 is properly mounted on the support ring 246.

In addition to forming a seal with the support ring 246, the pocket gasket also forms a seal with the interior sealing surface 233 of the receiver 230. In the depicted illustrative embodiment, the pocket gasket 260 includes one or more fins 266 extending outwardly from the outer member 264 of the pocket gasket 260. The fins 266 interact with the interior sealing surface 233 of the receiver 232 form a radial seal between the sealing surface 233 of the receiver 230 and the pocket gasket 260 such that air passing through the aperture 221 in the tubesheet 220 must pass through the filter bag 250 when entering or leaving the dirty air chamber through the aperture 221. In one or more embodiments, the fins 266 may preferably extend continuously around the perimeter of the outer portion 264 of the pocket gasket 260.

In one or more embodiments of the pocket gaskets used in filter bag assemblies as described herein, the pocket gasket may be described as being compressed between the support ring and the sealing surface of the receiver. In terms of the components depicted in FIG. 5, the pocket gasket 260 includes fins 266 that are compressed between the support ring 246 and the sealing surface 233 of the receiver 230 where, in the depicted embodiment, the compression is in the form of deflection or deformation of the fins 266 as the pocket gasket 260 is advanced into the receiver 230 along the filter bag axis 211. Many other compressible and/or deflectable structures may be substituted for fins when forming a radial compression seal as described herein and, as a result, fins are only one example of a structure that can be used to form a compression seal between a support ring 246 and a receiver 230 as described herein.

In one or more embodiments, the position of the radial seal formed between the sealing surface 233 on the receiver 230 and the support ring 246 may be described as being located between the leading edge 247 of the support ring 246 and a trailing edge 249 of the support ring 246, where the trailing edge 249 of the support ring 246 can be seen in FIG. 5.

Another illustrative embodiment of a filter bag assembly including a filter bag 350 and service frame assembled with a receiver 330 mounted on a tubesheet 320 of an air filter system as described herein is depicted in an enlarged cross-sectional view in FIG. 6 (the view being taken along a line similar to line 5-5 in FIG. 3). The same components are depicted in an alternative cross-sectional view in FIG. 7 which is taken along line 7-7 in FIG. 6 near one end of the aperture 321 in the tubesheet 320.

In this depicted illustrative embodiment, the receiver 330 also includes a wall 332 surrounding an aperture 321 in tubesheet 320. Wall 332 of receiver 330 includes an interior sealing surface 333. Also mounted within aperture 321 in tubesheet 320 is a yoke assembly including pulse collector 377 along with lower yoke member 372 in FIG. 6 and an upper yoke member 374 in FIG. 6, along with, in both FIGS. 6 and 7, a portion of an intermediate support structure 375 of the yoke assembly.

Pulse collector 377 includes an opening 379 through which air enters into the interior volume of the filter bag 350 and exits the interior volume of the filter bag 350. It should be understood that pulse collector 377 is optional and may or may not be provided in one or more embodiments of the air filter systems and filter bag assemblies used therein.

Figure 7:
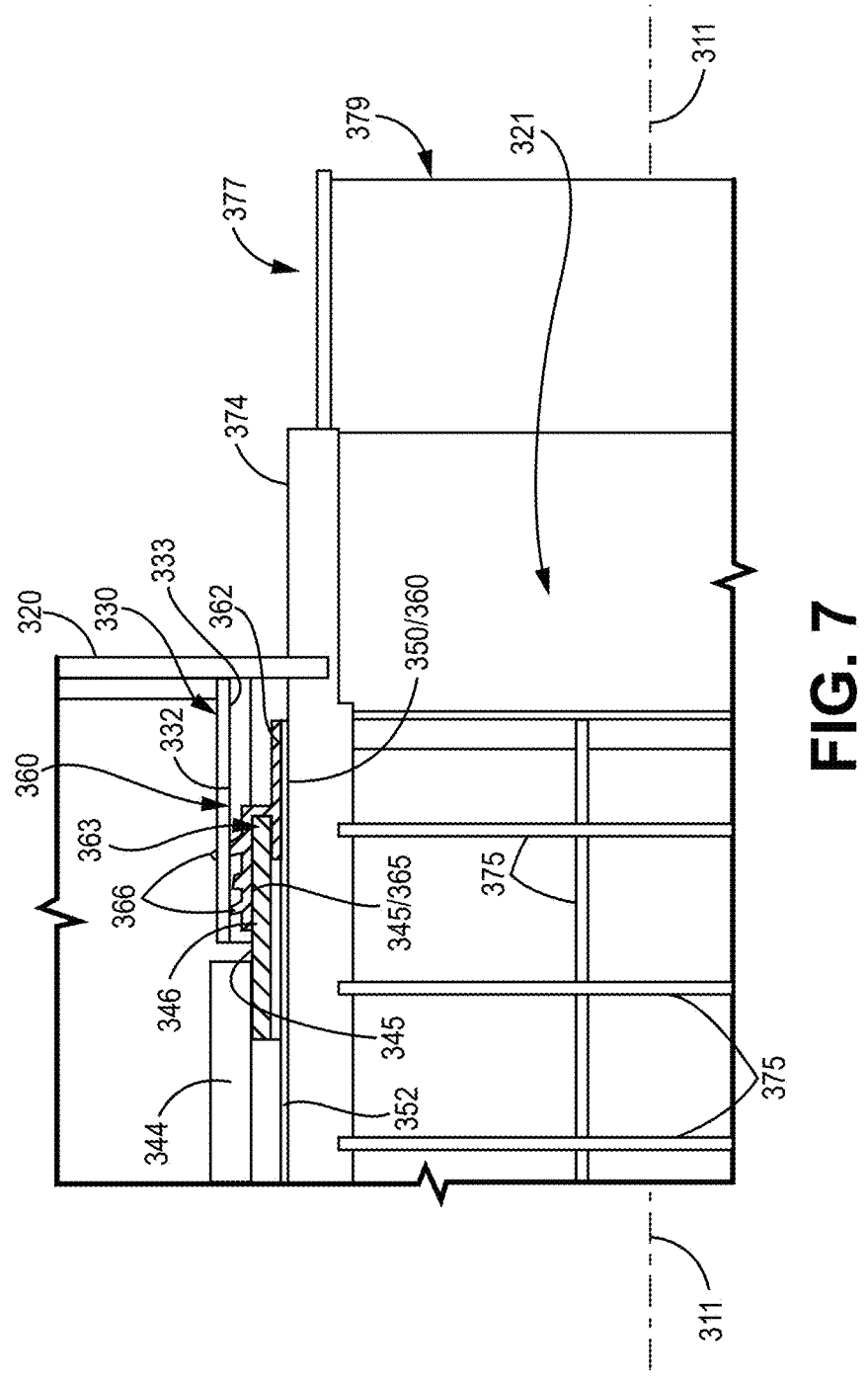
FIG. 7 is an enlarged cross-sectional view of the filter bag assembly, receiver, and tubesheet as depicted in FIG. 6 taken along line 7-7 in FIG. 6.

One difference between the receiver 330 of FIGS. 6-7 and receiver 230 of FIG. 5 is that the receiver 230 of FIG. 5 is located in the clean air chamber of an air filter system as described herein in which tubesheet 220 separates the clean air chamber from a dirty air chamber in which the filter bag 250 is located. The receiver 330 of FIGS. 6-7 is, however, located in the dirty air chamber of an air filter system as described herein in which tubesheet 320 separates the clean air chamber from the dirty air chamber in which the filter bag 350 is located.

FIGS. 6-7 depict the interaction between the support ring 346 of the service frame and the filter bag 350 with the receiver 330 and also with the yoke assembly. In the cross-sectional view of FIG. 6, only the support ring 346 of the service frame is visible while both the support ring 346 and an extension strut 344 are depicted in FIG. 7. The support ring 346 has an exterior surface 345 facing the interior sealing surface 333 of the receiver 330 when the support ring 346 and extension strut 344 of the service frame and the filter bag 350 including pocket gasket 360 are in their operating positions with respect to the receiver 330 and the yoke assembly (as represented by upper and lower yoke members 372 and 374, intermediate yoke member 373, intermediate support structure 375, and pulse collector 377).

In one or more embodiments of service frames including extension struts and support rings such as extension strut 344 and support ring 346 depicted in FIG. 7, the extension struts may be attached to the support rings by any suitable technique or combination of techniques including, but not limited to, welding, mechanical fasteners, adhesives, etc.

The depicted embodiment of pocket gasket 360 on the filter bag 350 includes an inner member 362 and an outer member 364 attached to an exterior surface of the inner member 362 at a location between the edges of the inner member 362 of the pocket gasket 360. The pocket gasket 360 includes a pocket 363 formed between the inner member 362 and the outer member 364 with the leading edge of the 347 of the support ring 346 positioned in the pocket 363. The extension struts of the service frame (with only a portion of one extension strut 344 being depicted in FIG. 7) extend away from the tubesheet 320 towards an access panel of the air filter system in which the components depicted in FIGS. 6 and 7 are located.

The pocket gasket 360 is attached to the filter sheet material of the filter bag 350 at a seam 350/360 that is, in the depicted embodiment, located forward of the pocket 363 of pocket gasket 360 and leading edge 347 of support ring 346. For proper operation of the air filter system, the seam 350/360 at which the pocket gasket 360 is attached to the filter bag 350 prevents the passage of air into or out of the interior volume of the filter bag 350 through the junction between the pocket gasket 360 and the filter bag 350 at the bag opening. Suitable attachment techniques used at the junction between the filter bag 350 and the pocket gasket 360 may include, but are not limited to, one or more of sewing, adhesives, tapes, thermal welding, chemical welding, etc.

In the depicted illustrative embodiment, the outer member 364 of the pocket gasket 360 defines an interior surface 365 mounted on the support ring 346 such that the interior surface 365 forms a seal with the exterior surface 345 of the support ring 346 (with the surfaces being represented by reference number 345/365 in FIGS. 6 and 7). As a result, air is prevented from passing between the interface between the outer member 364 of the pocket gasket 360 and the support ring 346 when the pocket gasket 360 is properly mounted on the support ring 346.

In addition to forming a seal with the support ring 346, the pocket gasket 360 also forms a seal with the interior sealing surface 333 of the receiver 330. In the depicted illustrative embodiment, the pocket gasket 360 includes one or more fins 366 extending outwardly from the outer member 364 of the pocket gasket 360. The fins 366 interact with the interior sealing surface 333 of the receiver 332 form a radial seal between the sealing surface 333 of the receiver 330 and the pocket gasket 360 such that air passing through the aperture 321 in the tubesheet 320 must pass through the filter bag 350 when entering or leaving the dirty air chamber through the aperture 321. In one or more embodiments, the fins 366 may preferably extend continuously around the perimeter of the outer portion 364 of the pocket gasket 360.

As discussed in connection with the illustrative embodiment depicted in FIG. 5, one or more embodiments of the pocket gaskets described used in filter bag assemblies as described herein, the pocket gasket may be described as being compressed between the support ring and the sealing surface of the receiver. In terms of the components depicted in FIGS. 6-7, the pocket gasket 360 includes fins 366 that are compressed between the support ring 346 and the sealing surface 333 of the receiver 330 where, in the depicted embodiment, the compression is in the form of deflection or deformation of the fins 366 as the pocket gasket 360 is advanced into the receiver 330 along the filter bag axis 311. As also discussed above, many other structures may be substituted for fins when forming a radial compression seal as described herein and, as a result, fins are only one example of a structure that can be used to form a compression seal between a support ring and a receiver using a pocket gasket as described herein.

In the depicted illustrative embodiment, the position of the radial seal formed by the pocket gasket 360 between the sealing surface 333 on the receiver 330 and the support ring 346 may be described as being located between the leading edge 347 of the support ring 346 and a trailing edge 349 of the support ring 346.

Figure 8:
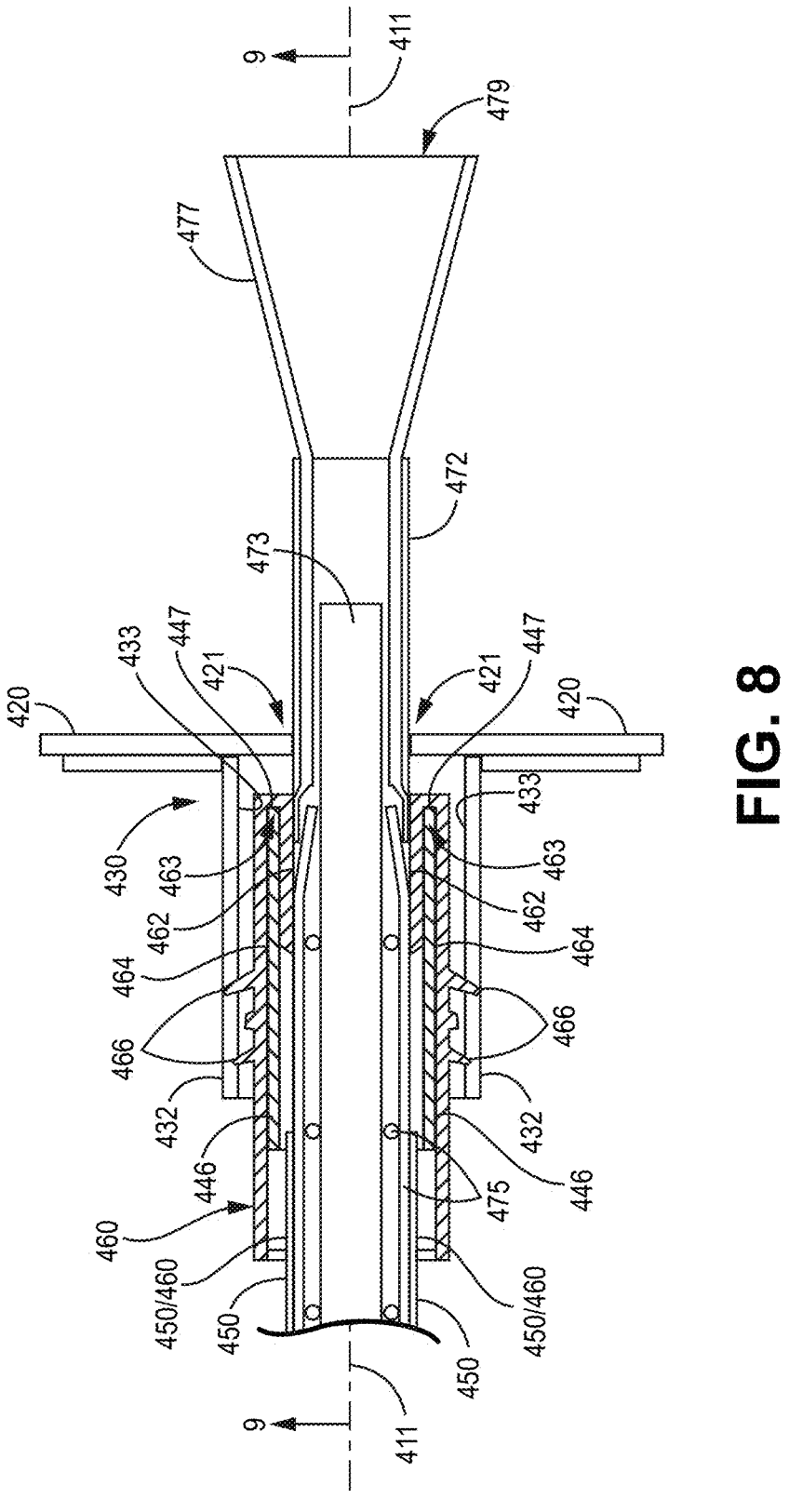
FIG. 8 is an enlarged cross-sectional view of another illustrative embodiment of a filter bag assembly engaged within a receiver on a tubesheet of another illustrative embodiment of an air filter system as described herein.

Yet another illustrative embodiment of a filter bag assembly including a filter bag 450 and service frame assembled with a receiver 430 mounted on a tubesheet 420 of an air filter system as described herein is depicted in an enlarged cross-sectional view in FIG. 8 (the view being taken along a line similar to line 5-5 in FIG. 3). The same components are depicted in an alternative cross-sectional view in FIG. 9 which is taken along line 9-9 in FIG. 8 near one end of the aperture 421 in the tubesheet 320.

In this depicted illustrative embodiment, the receiver 430 also includes a wall 432 surrounding an aperture 421 in tubesheet 420. Wall 432 of receiver 430 includes an interior sealing surface 433. Also mounted within aperture 421 in tubesheet 420 is a yoke assembly including pulse collector 477 along with lower yoke member 472 and intermediate yoke member 473 in FIG. 8 and an upper yoke member 474 in FIG. 9, along with, in both FIGS. 8 and 9, a portion of an intermediate support structure 475 of the yoke assembly.

Pulse collector 477 includes an opening 479 through which air enters into and exits from the interior volume of the filter bag 450. It should be understood that pulse collector 477 is optional and may or may not be provided in one or more embodiments of the air filter systems and filter bag assemblies used therein.

Figure 9:
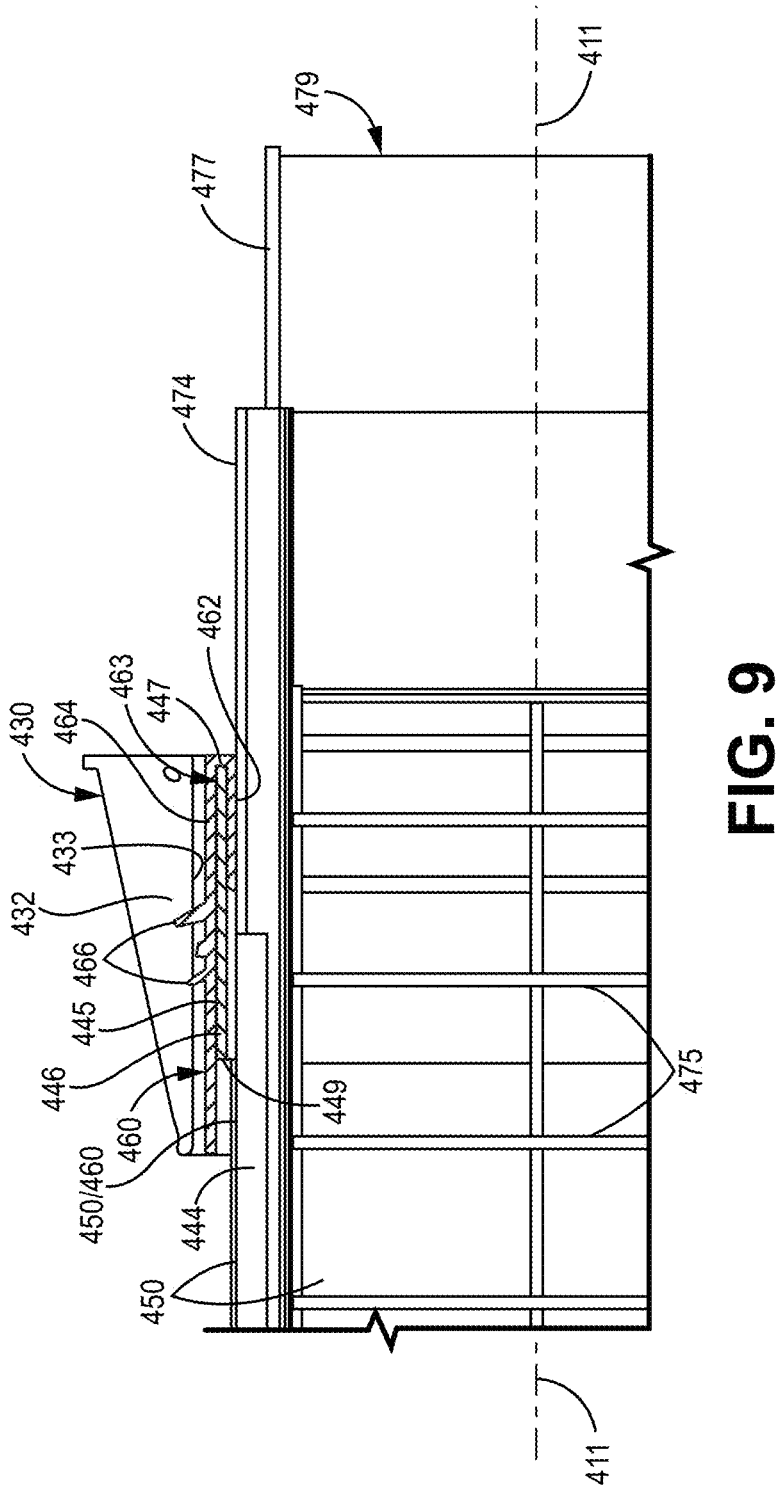
FIG. 9 is an enlarged cross-sectional view of the filter bag assembly, receiver, and tubesheet as depicted in FIG. 8 taken along line 9-9 in FIG. 8.

FIGS. 8 and 9 depict the interaction between the support ring 446 of the service frame and the filter bag 450 with the receiver 430 and also with the yoke assembly. The support ring 446 has an exterior surface 445 facing the interior sealing surface 433 of the receiver 430 when the support ring 446 and extension strut 444 of the service frame and the filter bag 450 including pocket gasket 460 are in their operating positions with respect to the receiver 430 and the yoke assembly (as represented by upper and lower yoke members 472 and 474, intermediate yoke member 473, intermediate support structure 475, and pulse collector 477). As depicted in FIG. 9, the extension strut 444 is located within a channel formed by the upper yoke member 474 such that the extension strut 444 of the service frame is located within the internal volume of the filter bag 450 (with the other components of the service frame also being located in the internal volume of the filter bag 450).

The depicted embodiment of pocket gasket 460 on the filter bag 450 has a different construction than the pocket gaskets 260 and 360 described above. The depicted embodiment of pocket gasket 460 does include an inner member 462 and an outer member 464 attached to the inner member 462. The inner member 462 is, however, located between the outer member 464 and the support ring 446. In one manner of characterizing the arrangement of the inner member 462 and outer member 464, the inner member 462 can be described as being folded under the outer member 464. Regardless, the inner member 462 and the outer member 464 do form a pocket 463 with the leading edge of the 447 of the support ring 446 positioned in the pocket 463.

The pocket gasket 460 is attached to the filter sheet material of the filter bag 450 at a seam 450/460 that is, in the depicted embodiment, located rearward from the pocket 463 of pocket gasket 460 and leading edge 447 of support ring 446. For proper operation of the air filter system, the seam 450/460 at which the pocket gasket 460 is attached to the filter bag 450 prevents the passage of air into or out of the interior volume of the filter bag 450 through the junction between the pocket gasket 460 and the filter bag 450. Suitable attachment techniques used at the junction between the filter bag 450 and the pocket gasket 460 may include, but are not limited to, one or more of sewing, adhesives, tapes, thermal welding, chemical welding, etc.

In addition to forming a seal with the support ring 446, the pocket gasket 460 also forms a seal with the interior sealing surface 433 of the receiver 430. In the depicted illustrative embodiment, the pocket gasket 460 includes one or more fins 466 extending outwardly from the outer member 464 of the pocket gasket 460. The fins 466 interact with the interior sealing surface 433 of the receiver 430 to form a radial seal between the sealing surface 433 of the receiver 430 and the pocket gasket 460 such that air passing through the aperture 421 in the tubesheet 420 must pass through the filter bag 450 when entering or leaving the dirty air chamber through the aperture 421. In one or more embodiments, the fins 466 may preferably extend continuously around the perimeter of the outer portion 464 of the pocket gasket 460.

As discussed in connection with the illustrative embodiments depicted in FIGS. 5-7, in one or more embodiments of the pocket gaskets described used in filter bag assemblies as described herein, the pocket gasket may be described as being compressed between the support ring and the sealing surface of the receiver. In terms of the components depicted in FIGS. 8-9, the pocket gasket 460 includes fins 466 that are compressed between the support ring 446 and the sealing surface 433 of the receiver 430 where, in the depicted embodiment, the compression is in the form of deflection or deformation of the fins 466 as the pocket gasket 460 is advanced into the receiver 430 along the filter bag axis 411. As also discussed above, many other structures may be substituted for fins when forming a radial compression seal as described herein and, as a result, fins are only one example of a structure that can be used to form a compression seal between a support ring and a receiver using a pocket gasket as described herein.

In the depicted illustrative embodiment, the position of the radial seal formed by the pocket gasket 460 between the sealing surface 433 on the receiver 430 and the support ring 446 may be described as being located between the leading edge 447 of the support ring 446 and a trailing edge 449 of the support ring 446.

The illustrative embodiments of pocket gaskets provided at the bag openings of the filter bags described above in connection with FIGS. 5-9 all involve compression of the pocket gasket between a support ring and the sealing surface of a receiver in which the support ring and the pocket of the pocket gasket are located within the receiver such that the radial seals are formed within the receivers and an exterior surface of the support rings.

Figure 10:
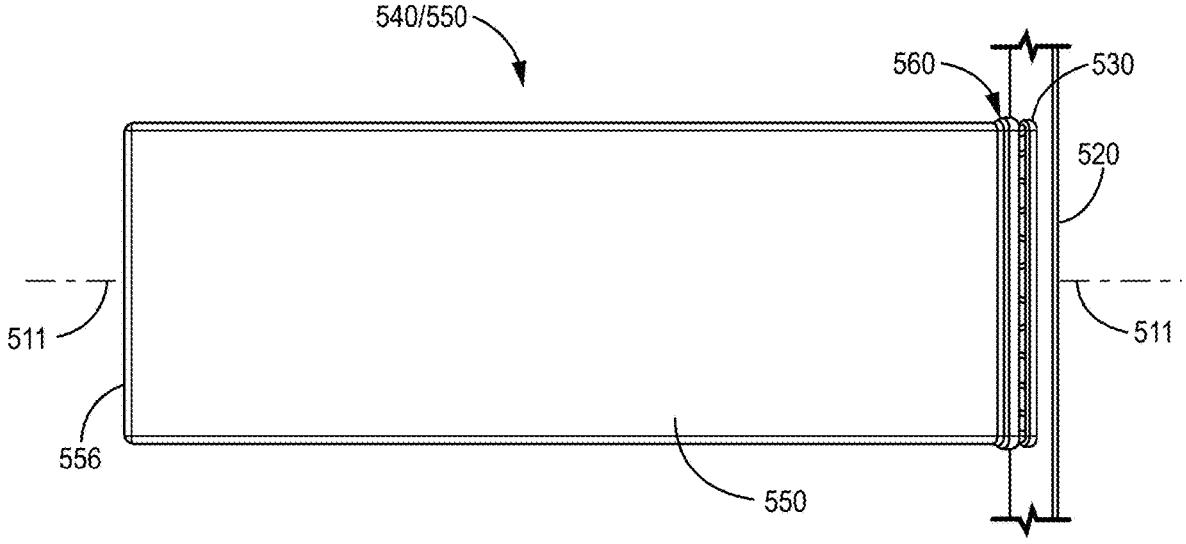
FIG. 10 is a perspective view of another illustrative embodiment of a filter bag assembly partially mounted on a yoke assembly of another illustrative embodiment of an air filter system including a tubesheet and a receiver as described herein.

Another illustrative embodiment of a filter bag assembly 540/550 is depicted in FIG. 10 in which the pocket gasket 560 attached to the filter bag 550 at the bag opening forms a radial seal with a receiver or 530 attached to a tubesheet 520. In contrast to the pocket gaskets depicted in connection with FIGS. 5-9 in which the pocket gasket is compressed between a support ring and the sealing surface of a receiver with both the support ring and the pocket of the pocket gasket being located within the receiver, the receiver 530 is located within the pocket gasket 560 on an external surface of the receiver 530.

The filter bag 550 of the filter bag assembly 540/550 depicted in FIG. 10 includes a closed end 556 located distal from the bag opening located within the pocket gasket 560. As a result, filter bag 550 also defines a filter bag axis 511 extending between the filter bag opening (represented by pocket gasket 560) and the closed end 556 of the filter bag 550.

Figure 11:
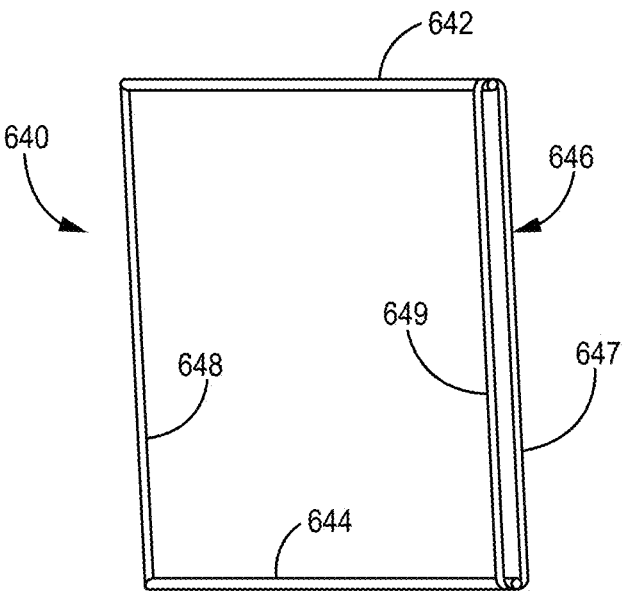
FIG. 11 is a perspective view of one illustrative embodiment of a service frame that may be used in one or more embodiments of an air filter system as described herein.
Figure 12:
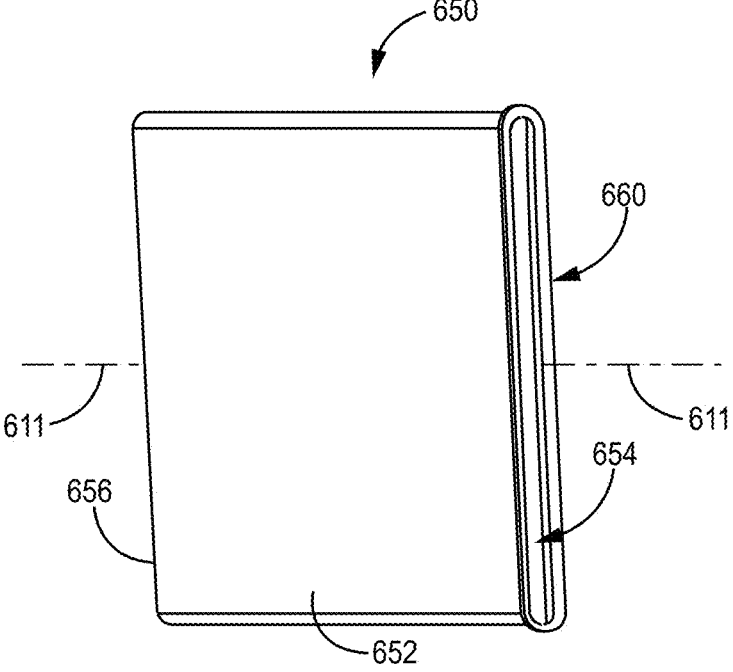
FIG. 12 is a perspective view of one illustrative embodiment of a filter bag that may be mounted on the service frame depicted in FIG. 11.

FIGS. 11-12 depicts another illustrative embodiment of the components of a filter bag assembly as described herein with FIG. 11 depicting a service frame 640 and FIG. 12 depicting a filter bag 650. Service frame 640 as depicted in FIG. 11 includes a support ring 646 and a pair of extension struts 642 and 644 attached to the support ring 646 along with a distal end strut 648 attached to the extension struts 642 and 644. Support ring 646 includes a leading edge 647 facing away or distal from the distal end strut 648 and a trailing edge 649 facing towards or proximal to the distal end strut 648 such that the trailing edge 649 of the support ring 646 is located between the leading edge 647 and the distal end strut 648.

One difference between service frame 640 depicted in FIG. 11 and the service frame partially depicted in FIG. 7 is that the extension strut 344 of FIG. 7 is attached to an exterior surface 345 of the support ring 346, while in the depicted embodiment of service frame 640 in FIG. 11 the extension struts 642 and 644 are attached to an interior surface of the support ring 646.

As depicted in FIG. 12, the filter bag 650 includes a body 652 having a filter bag opening 654 and a closed end 656 located distal from the filter bag opening 654, with a filter bag axis 611 extending between the filter bag opening 654 and the closed end 656. A pocket gasket 660 is attached to the filter bag 650 at the bag opening 654.

When assembled to form a filter bag assembly the service frame 640 is located within the interior volume defined by the body 652 of the filter bag 650 with the pocket gasket 660 being engaged with the support ring 646 of the service frame 640.

FIGS. 13-17 depict a forward portion of the filter bag assembly 540/550 positioned on a yoke assembly 570 that extends away from the tubesheet 520 on which receiver 530 is mounted. The filter bag assembly 540/550 is not yet engaged with the receiver 530, in other words, the pocket gasket 560 on filter bag 550 is not engaged with the receiver 530 to form a radial seal between the pocket gasket 560 and the receiver 530 as described herein.

In the depicted embodiment, the yoke assembly 570 includes an upper yoke member 572 and lower yoke member 574, with an intermediate support structure 575 extending between the upper yoke member 572 and the lower yoke member 574. As described herein, intermediate structures provided on yoke assemblies can be useful in preventing collapse of the filter bag 550 during filtering of particulate matter from dirty air.

With reference to FIG. 14, the forward portion of the service frame 540 including extension strut 542 and support ring 546 are depicted in combination with the yoke assembly 570. The yoke assembly 570 includes upper yoke member 572 along with intermediate support structure 575. Upper yoke member 572 includes a strut channel 579 with the extension strut 542 of the service frame 540 at least partially received in the strut channel 579. This arrangement may assist in movement of the service frame 540 on the yoke assembly 570. In particular, proper alignment of a pocket gasket on a filter bag carried by the service frame 540 during advancement of the service frame 540 on the yoke assembly 570 towards the receiver 530 and tubesheet 520 may be enhanced when at least one extension strut (for example, extension strut 542) is located within a strut channel on one of the yoke members of the yoke assembly 570.

The enlarged view of the service frame 540 and yoke assembly 570 as depicted in FIG. 14 also provides a better view of the arrangement of the extension strut 542 on the interior of the support ring 546, with the support ring 546 including a leading edge 547 and a trailing edge 549 as described herein.

With reference to FIG. 15, the filter bag assembly 540/550 is assembled and partially advanced onto the yoke assembly 570 as described herein. Features depicted in FIG. 15 that are not visible in FIGS. 13 and 14 include the aperture 521 in tubesheet 520, with the receiver 530 being positioned around the aperture 521 (noting that only a portion of the receiver 530 is visible through aperture 521 in tubesheet 520 in FIG. 15). Advancement of the filter bag assembly 540/550 including pocket gasket 560 attached to the bag opening of filter bag 550 is, as discussed above, assisted by the strut channel 579 in upper yoke member 572 which receives the extension strut 542 attached to support ring 546 as depicted in, for example, FIG. 14.

FIG. 16 is a cross-sectional view of the perspective view of the filter bag assembly 540/550, yoke assembly 570, tubesheet 520, and receiver 530 as depicted in FIG. 13, while FIG. 17 depicts the filter bag assembly 540/550 after advancement of the pocket seal 560 onto the receiver 530 attached to tubesheet 520 around aperture 521 in tubesheet 520. Among the features depicted in FIGS. 16-17 are the sealing surface 533 on the exterior of the receiver 530 attached to tubesheet 520 around aperture 521 in tubesheet 520. Also depicted in FIGS. 16-17 is a forward edge 567 of the pocket gasket 560, with the forward edge 567 located distal from a closed end (not shown) of the filter bag 550 along the filter bag axis 511. A rear edge 569 of the pocket gasket 560 is also depicted in FIGS. 16-17, with the rear edge 569 located between the forward edge 567 of the pocket gasket 560 and the closed end (not shown) of the filter bag 550.

With reference to FIG. 17, pocket gasket 560 includes a pocket 563, with the leading edge 547 of the support ring 546 positioned in the pocket 563 proximate the tubesheet 520. The pocket gasket 560 is attached to the filter sheet material of the filter bag 550 at a seam 550/560 that is, in the depicted embodiment, located between the pocket 563 and the rear edge 569 of the pocket gasket 560. For proper operation of the air filter system, the seam 550/560 at which the pocket gasket 560 is attached to the filter bag 550 prevents the passage of air into or out of the interior volume of the filter bag 550 through the junction between the pocket gasket 560 and the filter bag 550 at the seam 550/560. Suitable attachment techniques used at the junction between the filter bag 550 and the pocket gasket 560 may include, but are not limited to one or more of sewing, adhesives, tapes, thermal welding, chemical welding, etc.

In addition to forming a seal with the support ring 546, the pocket gasket 560 also forms a seal with the sealing surface 533 on the exterior of the receiver 530. In the depicted illustrative embodiment, the pocket gasket 560 includes one or more fins 566 extending inwardly from the pocket gasket 560. The fins 566 interact with the exterior sealing surface 533 of the receiver 530 to form a radial seal between the sealing surface 533 of the receiver 530 and the pocket gasket 560 such that air passing through the aperture 521 in the tubesheet 520 must pass through the filter bag 550 when entering or leaving the dirty air chamber through the aperture 521. In one or more embodiments, the fins 566 may preferably extend continuously around the interior surface of the pocket gasket 560.

In the depicted illustrative embodiment, the position of the radial seal formed by the pocket gasket 560 between the sealing surface 533 on the receiver 530 may be described as being located between the leading edge 547 of the support ring 546 (and/or the pocket 563) and the forward edge 567 of the pocket gasket 560.

In one or more embodiments, the fins 566 on the pocket gasket 560 may be described as being compressed where the compression results in deflection or deformation of the fins 566 as the pocket gasket 560 is advanced onto the receiver 530 along the filter bag axis 511. As discussed herein, many other structures may be substituted for fins one forming a radial seal as described herein and, as a result, fins are only one example of a structure that can be used to form a radial seal between a pocket gasket and receiver located within the pocket gasket.

Still another illustrative embodiment of a filter bag assembly is depicted in FIGS. 18-20B. The filter bag is not depicted in the FIGS. 18-20B to expose the components that would be located within the filter bag and therefore typically obscured by the filter bag. The filter bag would, however, be attached to the pocket gasket 760 in area 761 of the pocket gasket 760 through, as described herein, any suitable technique or combination of techniques including, but not limited to, sewing, adhesives, tapes, thermal welding, chemical welding, etc.

With reference to FIGS. 19-20B, a receiver 730 is located within the pocket gasket 760 proximate the tubesheet 720 (similar to the arrangement of the receiver 530 located within the pocket gasket 560 as depicted in the embodiment of FIGS. 10, 13, and 17).

With reference to FIG. 18, the filter bag assembly includes a service frame 740 with a pair of extension struts 742 and 744 attached to a support ring 746 (located in pocket gasket 760 as depicted in FIGS. 20A-20B). The extension struts 742 and 744 extend from the support ring 746 to a distal end strut 748 that would typically be located proximate or at the closed end of a filter bag attached to the pocket gasket 760.

With reference to FIG. 20B, support ring 746 includes a leading edge 747 facing away or distal from the distal end strut 748 and a trailing edge 749 facing towards or proximal to the distal end strut 748 such that the trailing edge 749 of the support ring 746 is located between the leading edge 747 of support ring 746 and the distal end strut 748. In the embodiment depicted in FIGS. 18-20B, the extension struts 742 and 744 are attached to the support ring 746 proximate the trailing edge 749 of the support ring 746.

With reference to FIG. 19, the pocket gasket 760 is depicted as mounted on the receiver 730 attached to the tubesheet 720. As depicted in FIGS. 20A and 20B, the receiver 730 is located within an aperture 721 in the tubesheet 720, with the aperture 721 allowing for, as described herein in connection with other embodiments, the passage of clean air out of the interior volume of the filter bag and the passage of cleaning pulses into the interior volume of the filter bag to clean the filter bag.

FIG. 20A depicts the upper forward portion of the pocket gasket 760 and the service frame 740 positioned on a yoke assembly including upper yoke member 772 and lower yoke member 774, the yoke members 772/774 of the yoke assembly extending away from the tubesheet 720 on which receiver 730 is mounted. The pocket gasket 760 is engaged with the receiver 730 to form a radial seal between the pocket gasket 760 and the receiver 730 as described herein. In the depicted embodiment, the yoke assembly includes an intermediate support structure 575 extending between the upper yoke member 772 and the lower yoke member 774. As described herein, intermediate structures provided on yoke assemblies can be useful in preventing collapse of the filter bag during filtering of particulate matter from dirty air.

In addition, the yoke members 772/774 of the yoke assembly depicted in FIGS. 18-20B each preferably include a strut channel, with the extension struts 742 and 744 being at least partially received in the strut channels when the service frame including extension struts 742 and 744 is mounted on the yoke assembly with pocket gasket 760 engaging receiver 730 on tubesheet 720. Providing strut channels to receive the extension struts of service frames as described herein can help stabilize and align the filter bag assembly as a whole and also support the weight of the filter bag assembly as it moves towards or away from the tubesheet 720 during bag replacement.

With reference to FIGS. 20A and 20B, positioning of the extension strut 742 in the strut channel 779 of the upper yoke member 772 is depicted. A similar arrangement may be provided for the extension strut 744 and the lower yoke member 774, although in one or more embodiments, providing only one yoke member with a strut channel may provide the advantages described herein.

FIG. 20A is an enlarged cross-sectional view of the upper portion of the assembly of FIG. 18 taken along line 20-20 in FIG. 18, while FIG. 20B is further enlarged to depict additional features of the assembly when the pocket gasket 760 is engaged with the receiver 730 attached to tubesheet 720 around aperture 721 in tubesheet 720. Among the features depicted in FIGS. 20A-20B are the sealing surface 733 on the exterior of the receiver 730.

Pocket gasket 760 includes a pocket 763, with the leading edge 747 of the support ring 746 positioned in the pocket 763 proximate the tubesheet 720. The pocket gasket 760 is attached to the filter sheet material of a filter bag at a seam located along the trailing edge 761 of the pocket gasket 760. For proper operation of the air filter system, the attachment between the pocket gasket 760 and the filter bag prevents the passage of air into or out of the interior volume of the filter bag through the junction between the pocket gasket 760 and the filter bag at the seam area 761.

In addition to forming a seal with the support ring 746, the pocket gasket 760 also forms a seal with the sealing surface 733 on the exterior of the receiver 730. In the depicted illustrative embodiment, the pocket gasket 760 includes one or more fins 766 extending inwardly from the pocket gasket 760. The fins 766 interact with the exterior sealing surface 733 of the receiver 730 to form a radial seal between the sealing surface 733 of the receiver 730 and the pocket gasket 760 such that air passing through the aperture 721 in the tubesheet 720 must pass through the filter bag attached to the pocket gasket 760 when entering or leaving the dirty air chamber through the aperture 721. In one or more embodiments, the fins 766 may preferably extend continuously around the interior surface of the pocket gasket 760 and the exterior surface 733 of the receiver 730.

In the depicted illustrative embodiment, the position of the radial seal formed by the pocket gasket 760 between the sealing surface 733 on the receiver 730 may be described as being located between the leading edge 747 of the support ring 746 (and/or the pocket 763) and the trailing edge 749 of the support ring 746.

In one or more embodiments, the fins 766 on the pocket gasket 760 may be described as being compressed where the compression results in deflection or deformation of the fins 766 as the pocket gasket 760 is advanced onto the receiver 730 along the filter bag axis 711. As discussed herein, many other structures may be substituted for fins one forming a radial seal as described herein and, as a result, fins are only one example of a structure that can be used to form a radial seal between a pocket gasket and receiver located within the pocket gasket.

Also depicted in FIGS. 20A-20B is a forward edge 767 of the pocket gasket 760. As depicted in FIGS. 19-20B, with the forward edge 767 spaced apart from the tubesheet 720. Such spacing of the forward edge 767 of the pocket gasket 760 may, in one or more embodiments, be acceptable because the seal between the receiver 730 and the pocket gasket is formed between the support ring 746 and the sealing surface 733 of the receiver 730. This is in contrast with systems that form an axial seal in which the forward edge 767 of the pocket gasket 760 would be forced against the tubesheet along the filter bag axis 711 to form a seal at that junction.

FIGS. 21A-21F depict another optional feature that may be provided in connection with one or more embodiments of filter bag assemblies as described herein. That optional feature is in the form of retention tabs extending from the leading edges of the support rings and corresponding tab apertures provided in the gasket that are configured to receive the retention tabs.

The retention tabs are provided, in one or more embodiments, to control rotation or twisting of the gasket as the gasket is inserted into or over a receiver as described herein. That tendency of the gaskets to roll during installation into or over a receiver may be resisted by the interlocking relationship/mechanical interference provided by the retention tabs and tab apertures. Without adversely affecting the ability of the gaskets and receivers to form seals required for proper operation as described herein. In one or more embodiments, the tab apertures extend through the gasket from the pocket receiving the support ring through a forward edge of the pocket gasket such that the retention tabs are exposed at the forward edge of the pocket gasket. In one or more embodiments, the tab apertures may be described as extending through the gasket from a forward end of the pocket through the forward edge of the gasket.

With reference to FIG. 21A, the support ring 2546 is attached to extension strut 2542 of the service frame, with extension strut 2542 located in a channel in the yoke member 2572 as described herein in connection with other illustrative embodiments of the filter bag assemblies and filter systems described herein. The support ring 2546 includes a leading edge 2547 on which retention tabs 2549 are located. The retention tabs 2549 protrude from the leading edge 2547 of the support ring 2546 in a direction away from the distal end of the service frame/closed end of a bag mounted on the service frame along a bag axis 2511 extending through the support ring and service frame.

With reference to FIGS. 21B, a gasket 2560 and filter bag 2550 have bee installed on the service frame of FIG. 21A, the with support ring 2546 being located in a pocket formed in the gasket 2560 as discussed herein in connection with similar illustrative embodiments of filter bag assemblies. The gasket 2560 includes tab apertures 2569 that receive retention tabs 2549. In one or more embodiments, the retention tabs 2549 may preferably extend through the tab apertures such that the retention tabs extend past the leading edge 2568 of the gasket 2560. Rolling of the gasket 2560 over the leading edge 2547 of the support ring 2546 during installation of the gasket 2560 and support ring into or over a receiver as described herein is resisted by the interlocking arrangement of the retention tabs 2549 and the tab apertures 2569.

FIG. 21C depicts the gasket 2560 and support ring 2546 assembly in a receiver 2530, with the view of FIG. 21C being taken from the tubesheet side of the receiver 2530 with the tubesheet removed to expose the gasket 2560 within the receiver 2530. The depicted illustrative embodiment of the receiver 2530 includes optional relief apertures 2532 sized and positioned to receive the retention tabs 2549 to permit advancement of the gasket 2560 (and support ring 2546) into the receiver 2530 without interference from the retention tabs 2549.

Although FIGS. 21A-21C depict a pair of retention tabs and corresponding tab apertures, it should be understood that any suitable number of retention tabs and corresponding apertures may be provided as needed to enhance retention of gaskets of filter bags on support rings as described herein.

FIG. 21D is an enlarged view of the retention tab 2549 interface with the tab aperture 2569 in the gasket 2560 (with a filter bag axis 2511 provide for reference). In one or more embodiments, the retention tabs 2549 extend through the tab apertures such that the retention tabs 2549 extend past the forward edge 2568 of the gasket 2560. Although not required, extending the tab past the forward edge 2568 of the gasket 2560 may enhance retention of the gasket on the support ring 2546.

FIG. 21E depicts one alternative illustrative embodiment of a retention tab 2549-1 on a support ring 2546-1 in which the retention tab 2549-1 includes an expanded head that is larger than the tab aperture 2569-1 provided in gasket 2560-1. Stretching of the gasket 2560-1 during insertion of the retention tab 2549-1 through tab aperture 2569-1 may enhance retention of the gasket 2560-1 on the support ring 2546-1.

FIG. 21F depicts another alternative illustrative embodiment of a retention tab 2549-2 on a support ring 2546-2 in which the retention tab 2549-2 is an inverted wedge shape that is larger than the tab aperture 2569-2 provided in gasket 2560-2. Stretching of the gasket 2560-2 during insertion of the retention tab 2549-2 through tab aperture 2569-2 may enhance retention of the gasket 2560-2 on the support ring 2546-2.

Yet another illustrative embodiment of a filter bag assembly is depicted in FIGS. 22-27. The filter bag assembly is inserted into a receiver 830 attached to tubesheet 820 with an aperture 821 formed through the tubesheet 820, with an optional pulse collector 877 located within the aperture 821. The pulse collector 877 provides a pathway for, as described herein in connection with other embodiments, the passage of clean air out of the interior volume of the filter bag 850 and the passage of cleaning pulses into the interior volume of the filter bag to clean a filter bag as also described herein.

The filter bag assembly includes a filter bag having a tubular body 850 extending from a bag opening to a closed end 856. In the depicted embodiment, the bag opening is located within a gasket 860 positioned opposite the closed end 856 of the filter bag 850 along filter bag axis 811. As described in connection with other embodiments of filter bag assemblies, the gasket 860 extends around and is attached to the perimeter of the bag opening.

The depicted filter bag assembly also includes a service frame including a pair of extension struts 842 and 844 extending from a support ring 846 to a distal end strut 848 that would typically be located proximate or at the closed end 856 of the filter bag 850 attached to the gasket 860.

The depicted embodiment of gasket 860 includes a seal member 866 extending around an outer perimeter of the gasket 860, with the seal member 866 forming a seal with a sealing surface 833 located within receiver 830. The seal member 866 may be constructed of any suitable compressible material such as, e.g., foamed elastomer, loose felt, pile/fuzzy gasket material, solid elastomer, etc.

With reference to, e.g., FIGS. 26-27, the depicted embodiment of gasket 860 includes a gasket frame 867 on which the seal member 866 is mounted. Gasket frame 867 also defines a pocket 863 in which support ring 846 of the service frame is received. In the depicted illustrative embodiment, the gasket frame 867 also forms a connection with the bag opening of filter bag 850. With reference to FIG. 27 in particular, a portion 851 of filter bag 850 proximate the filter bag opening may be molded into or otherwise attached to the gasket frame 867 of gasket 860. Other techniques used to attach the filter bag 852 the frame 867 of gasket 860 may include, for example, one or more of adhesives, sewing, clamps, etc.

The gasket frame 867 may, in one or more embodiments, be constructed of materials that are more rigid than, for example, the materials used for the sealing members such as, e.g., rigid composites, engineering plastics, rigid plastics, metals (e.g., cast metals, etc.), etc.

Also with reference to FIG. 27, the gasket 860 may be described as having an external surface 861 facing away from the filter bag axis (see, e.g., filter bag axis 811 in FIG. 23), with the external surface 861 extending around a perimeter of the gasket 860. The gasket 860 may further be described as having an internal surface 862 facing the filter bag axis, with the internal surface 862 also extending around the perimeter of the gasket 860. Although not specifically denoted in the various figures, the gaskets provided on the other illustrative embodiments of filter bags described herein also include internal and external surfaces similar to those described in connection with gasket 860.

Gasket 860 may also be described as having a forward edge 864 that is, with reference to, e.g., FIG. 23, located distal from the closed end 856 of the tubular body of the filter bag 850. Gasket 860 may further be described as having a trailing edge 865, with the trailing edge 865 being located between the forward edge 864 and the closed end 856 of the tubular body of the filter bag 850.

The depicted illustrative embodiment of gasket 860 also includes a pocket 863 formed in the gasket 860. The pocket 863 is located between the external surface 861 and the internal surface 862. The pocket 863 includes a pocket opening 869 through which a support ring (e.g., support ring 846) may be inserted into the pocket 863. Pocket 863 also includes a forward end 868, with the forward end 868 located between the pocket opening 869 and the forward edge 864 of the gasket 860. The pocket 863 is as described herein, configured to receive a support ring such as support ring 846 that extends around the perimeter of the bag opening of filter bag 850.

In one or more embodiments, the pocket opening 869 may be described as opening into the interior volume defined by the filter bag 850.

In one or more embodiments, the pocket opening 869 may be described as facing the closed end 856 of the tubular body 850.

In one or more embodiments, the pocket opening may be located closer to the forward edge of the gasket and the trailing edge of the gasket. One example of such an arrangement is found in the gasket 460 as depicted in, e.g., FIG. 8.

Another illustrative embodiment of a filter bag assembly is depicted in FIGS. 28-31. The filter bag assembly depicted in these figures includes a gasket 960 positioned over a receiver 930 attached to tubesheet 920 with an aperture 921 formed through the tubesheet 920, with an optional pulse collector 977 located within the aperture 921. The pulse collector 977 provides a pathway for, as described herein in connection with other embodiments, the passage of clean air out of the interior volume of the filter bag 950 and the passage of cleaning pulses into the interior volume of the filter bag to clean a filter bag as also described herein.

The filter bag assembly includes a filter bag having a tubular body 950 extending from a bag opening to a closed end (not shown). In the depicted embodiment, the bag opening is located within a gasket 960 positioned opposite the closed end of the filter bag 950 along filter bag axis 911. As described in connection with other embodiments of filter bag assemblies, the gasket 960 extends around and is attached to the perimeter of the bag opening.

The depicted filter bag assembly also includes a service frame including a pair of extension struts 942 and 944 extending from a support ring 946 to a distal end strut (not shown) that would typically be located proximate or at the closed end of the filter bag 950 attached to the gasket 960.

With reference to, e.g., FIGS. 30-31, the depicted embodiment of gasket 960 includes a gasket frame 967 on which the seal member 966 is mounted. Gasket frame 967 also defines a pocket 963 in which support ring 946 of the service frame is received. In the depicted illustrative embodiment, the bag opening of filter bag 950 is attached to the gasket frame 967 by any suitable technique or combination of techniques including, but not limited to, molding, adhesives, sewing, clamps, etc.

In the depicted embodiment of gasket 960, the seal member 966 is mounted on the inner surface of the gasket 960 and extends around an inner perimeter of the gasket 960, with the seal member 966 forming a seal with a sealing surface 933 located on the external surface of receiver 930 as seen in, e.g., FIGS. 30-31. The seal member 966 may be constructed of any suitable compressible material such as, e.g., foamed elastomer, loose felt, pile/fuzzy gasket material, solid elastomer, etc.

FIGS. 32-1 to 32-4 depict components of another illustrative embodiment of a filter bag and filter bag assembly as described herein. The filter bag assembly includes a filter bag 950-1 depicted in broken lines to expose the components located in the filter bag. The filter bag 950-1 is in the form of a tubular body (e.g., envelope shaped) extending from a bag opening 954-1 to a closed end 958-1. As with the other filter bags described herein, the tubular body of the filter bag 950-1 is defined by flexible filter sheet material defining an interior volume of the filter bag 950-1 between the bag opening 954-1 and the closed end 958-1. The tubular body of the filter bag 950-1 defines a filter bag axis 911-1 extending through the bag opening 954-1 and the closed end 958-1.

A gasket assembly is attached to the bag opening 954-1 of the tubular body of the filter bag 950-1, the gasket assembly extending around and attached to a perimeter of the bag opening 954-1. The illustrative embodiment of the gasket assembly includes a support ring 946-1 and gasket 960-1. The support ring 946-1 extends around the perimeter of the bag opening 954-1 and includes a leading edge facing away from the closed end 958-1 of the tubular body of the filter bag 950-1.

The depicted gasket assembly includes a gasket 960-1 attached to the support ring 946-1. The gasket 960-1 extends around a perimeter of the bag opening 954-1 and is configured to form a radial seal when compressed against the support ring 946-1 when the filter bag is mounted in a dust collector.

The gasket 960-1 of the illustrative gasket assembly depicted in FIGS. 32-1 to 32-4 is located on an exterior surface of the support ring 946-1 such that the gasket 960-1 faces away from the filter bag axis 911-1.

In the embodiment depicted in FIGS. 32-1 to 32-3, the flexible filter sheet material defining the interior volume of the filter bag 950-1 is attached to the gasket 960-1 of the gasket assembly. In particular, the sheet material defining the bag opening 954-1 is attached to a flange 961-1 of the gasket 960-1 using any suitable technique or combination of techniques, e.g., sewing, adhesives, thermal welding, chemical welding, etc.

With reference to FIGS. 32-1 to 32-4, the depicted illustrative embodiment of the filter bag assembly includes a service frame including a pair of extension struts 942-1 and 944-1 that extend away from the gasket assembly and the bag opening 954-1 towards the closed end 958-1 of the filter bag 950-1 where the extension struts 942-1 and 944-1 are connected to each other by a distal end strut 948-1 that, in the depicted embodiment, runs along the inside of the closed end 958-1 of the filter bag 950-1. As with other embodiments described herein, the service frame supports the filter bag 950-1.

The support ring 946-1 includes a pair of pockets 947-1 on opposite ends of the support ring 946-1, with each pocket 947-1 configured to receive the end of an extension strut 942-1 or 944-1 of the service frame.

With reference to FIG. 32-5, another illustrative embodiment of a gasket assembly including a support ring 946-2 and gasket 960-2 is depicted, with the gasket assembly positioned in a receiver 930-2. When so positioned, the gasket 960-2 is compressed between the exterior surface of the support ring 946-2 and the interior surface of the receiver 930-2 to form a radial seal as described herein. When the receiver 930-2 is positioned over an aperture in a tubesheet as described herein, the radial seal formed between the gasket 960-2 and the receiver 930-2 preferably prevents the passage of air and particulate matter from passing between the gasket 960-2 and the receiver 930-2.

With reference to FIG. 32-6, another illustrative embodiment of a gasket assembly including a support ring 946-3 and gasket 960-3 is depicted, with the gasket assembly positioned over a receiver 930-3. When so positioned, the gasket 960-3 is compressed between the interior surface of the support ring 946-3 and the exterior surface of the receiver 930-3 to form a radial seal as described herein. When the receiver 930-3 is positioned over an aperture in a tubesheet as described herein, the radial seal formed between the gasket 960-3 and the receiver 930-3 preferably prevents the passage of air and particulate matter from passing between the gasket 960-3 and the receiver 930-3.

Although not depicted in the embodiments of FIGS. 32-1 to 32-6, the leading edges of the gasket assemblies, e.g., the support rings, can be shaped to ensure conformance to a complementary shaped receiver as described below in connection with, e.g., FIGS. 33-35.

Potential advantages of the filter bags with gasket assemblies and service frames configured to attach to the support rings of the gasket assemblies include simplified constructions that may result in a lighter weight filter bag assembly to facilitate insertion and removal of the filter bag assemblies in the dirty air chamber of a filter system. In addition, it may be easier to adapt the service frames to filter bags having different lengths.

FIG. 33 depicts additional optional features that may be found in one or more embodiments of an air filter system using a filter bag assembly including a filter bag as described herein. The depicted system includes a tubesheet 1022 which a receiver 1030 is attached. A pulse collector 1077 is also attached to the tubesheet 1020 and/or the receiver 1030 such that clean air exiting an interior of the filter bag 1050 can pass into a clean air chamber side of the tubesheet 1020 and pulses of air or other gases delivered into the pulse collector 1077 can be delivered into the interior of the filter bag 1050 as described herein.

In the depicted embodiment, the filter bag 1050 includes a gasket 1060 at its forward end with gasket 1060 including a forward edge 1064 and a trailing edge 1065. The forward edge 1064 may be described as being located distal from a closed end (not shown) of the filter bag 1050 while the trailing edge 1065 of the gasket and 60 may be described as being located between the forward edge 1064 and the closed end (not shown) of the filter bag 1050.

In the depicted embodiment, the trailing edge 1065 of the gasket 1060 may be described as being located along a plane 1061 that is, in the depicted embodiment, transverse to the filter bag axis 1011 extending from the filter bag opening at the gasket 1060 to the closed end of the filter bag 1050 as described in connection with other illustrative embodiments herein.

The gasket 1060 can be described as having a gasket depth measured along the bag axis 1011 between the forward edge 1064 and a reference plane 1061 oriented transverse to the bag axis 1011. In the depicted illustrative embodiment, the gasket depth varies when moving around the perimeter of the gasket 1060 due to the generally sinusoidal shape of the forward edge 1064 of the gasket 1060. Although the depicted illustrative embodiment includes a generally sinusoidal shaped forward edge 1064 many other alternative shapes may be used for the forward edge of the gaskets used in one or more embodiments of the gaskets found on filter bags as described herein. Some nonlimiting examples of possible alternatives include sawtooth shapes, square wave shapes, etc. Gaskets having a variable gasket depth as described herein are typically more easily advanced over a receiver such as receiver 1030 because they do not present a flat edge transverse to the direction along which the gasket 1060 must be advanced when moving the gasket 1060 on to receiver 1030.

Another optional feature depicted in FIG. 33 is that the receiver 1030 may include a receiving surface 1039 having a shape that is complementary to the shape of the forward edge 1064 of the gasket 1060. The complementarily shaped forward edge 1064 and receiving surface 1039 may assist in properly sealing of the gasket 1060 on the receiver 1030 by providing an axial sealing component to the radial seals that are also preferably provided between the gaskets and receivers of systems as described herein. In addition to, or in place of providing an axial sealing component, the complementarily shaped forward edge 1064 and receiving surface 1039 may, in one or more embodiments, limit proper installation of the gasket 1060 and associated filter bag 1050 on the receiver 1030 in only one desired orientation.

FIGS. 34-35 depict additional optional features that may be found in one or more embodiments of filter bags and filter bag assemblies as described herein. In general, FIGS. 34-35 depict a gasket 1160 having a variable pocket depth and a support ring 1146 of a service frame having a complementary shape to accommodate the variable pocket depth found in gasket 1160.

The filter bag 1150 depicted in FIGS. 34-35 includes a tubular body attached to a gasket 1160 at the bag opening and of the filter bag 1150 as described herein in connection with other illustrative embodiments of filter bags. The filter bag 1150 defines a bag axis 1111 that extends through the bag opening and a closed end (not shown) of the filter bag 1150 also as described herein in connection with other illustrative embodiments of filter bags.

The gasket 1160 includes a sealing member 1166 extending around the perimeter of the gasket 1160 as described herein in connection with other illustrative embodiments of filter bags. Although the depicted embodiment includes a gasket 1160 on an exterior surface of the gasket 1160, the sealing member 1166 could also be located on the interior surface of the gasket 1160 as described in connection with some illustrative embodiments of filter bags as described herein.

The service frame includes a support ring 1146 to which extension struts 1142 and 1144 are attached as described herein in connection with other illustrative embodiments of service frames used in filter bags as described herein. The support ring 1146 includes a leading edge 1147 that faces away from the closed end (not shown) of the filter bag 1150 when the service frame is located within the filter bag 1150.

Support ring 1146 also includes a trailing edge 1149 that faces the closed end (not shown) of the filter bag 1150 when the service frame is located within the filter bag 1150.

The depicted illustrative embodiment of support ring 1146 includes a leading edge 1147 that is not straight and, in particular, forms a support ring 1146 having a variable with as measured along the bag axis 1111 between the leading edge 1147 and a reference plane 1141 that, in the depicted embodiment, is transverse to the bag axis 1111. In the depicted embodiment, the reference plane 1141 is coincident with the trailing edge 1149 of the support ring 1146 but that arrangement is not required.

With reference to the cross-sectional view of FIG. 35 (taken along line 35-35 in FIG. 34), the depicted gasket 1160 includes a pocket 1163. In the depicted embodiment, the pocket 1163 has a pocket depth measured along the bag axis 1111 between a forward end 1168 and a reference plane 1161 transverse to the bag axis 1111.

Although the pocket depth in a number of the illustrative embodiments of gaskets as described herein may be uniform, in the embodiment depicted in FIGS. 34-35 the pocket depth varies when moving around the perimeter of the gasket 1160. The variable depth of the pocket 1163 is depicted in FIG. 35 where the forward end 1168 of the pocket 1163 changes its location relative to reference plane 1161 between the location of the cross-sectional view of FIG. 35 and the bottom of the gasket 1160 where the forward end 1168' of the pocket 1163 is located further from the reference plane 1161.

Advantages of a variable pocket depth include, for example, reducing the force required to insert the support ring 1146 into the pocket 1163 as compared to, e.g., pockets and corresponding support rings having uniform depths/widths when moving around the perimeter of the gasket 1160. Another potential advantage may be found in improvements in seal engagement between the receiver and the gasket. Yet another potential advantage may be found in decreasing the risk of gasket shear between the gasket and the receiver during placement and/or removal of filter bags.

FIGS. 36-37 depict illustrative embodiments of access panel covers that may be used in one or more embodiments of the air filter systems described herein. FIG. 36 depicts a portion of an access panel 1214 along with a pair of access port covers 1282 configured to close access ports 1280 formed in the access panel 1214. The access ports 1280 are used to remove filter bags 1250 located within the dirty air chamber defined, in part, by access panel 1214. As described herein, the filter bag 1250 are removed by pulling the filter bag 1250 through the access port 1280 along filter bag axes 1211. The depicted access port covers 1282 are rotatably attached to the access panel 1214 and include a latch mechanism 1286 configured to capture a latch post 1287 on the access panel 1214 to retain the access port covers 1282 in the closed position over the access port 1280 (as seen in connection with the right-side access port cover 1282 in FIG. 36).

In one or more embodiments of air filter systems as described herein, the access port covers may include filter control features configured to restrict movement of the closed end and/or a distal end strut in a service frame located proximate the closed end of the filter bags of filter bag assemblies as described herein. In particular, the filter control features may be configured to restrict movement of the closed end and/or a distal end strut in directions transverse to the filter bag axes when an access port is closed by an access port cover as described herein. Restricting movement of the closed ends of filter bags and/or distal end struts of filter bag assemblies as described herein from movement in directions transverse to the filter bag axes may be useful in controlling movement of the filter bag assemblies during pulse cleaning events in use.

One illustrative embodiment of filter control features configured to restrict movement of the closed ends 1256 of the filter bag 1250 is depicted in connection with FIG. 36. In particular, access port cover 1282 includes filter control features 1284 in the form of cavities configured to receive the closed ends 1256 (and a distal end strut located therein) when the access port cover 1282 closes the access port 1280. The cavities of the filter control features 1284 act to restrict movement of the closed ends 1256 and any distal end struts located therein through interference with the sides of the cavities 1284.

While the illustrative embodiment of access port covers 1282 include cavities as filter control features 1284 that are essentially embossed into an interior surface of the access port covers 1282, FIG. 37 depicts one alternative embodiment in which a flat access port cover 1382 includes a filter control feature 1385 attached thereto, with the filter control feature 1385 defining a cavity 1384 configured to receive the closed end of a filter bag and/or a distal end strut of a filter bag assembly as described herein such that the closed end of the filter bag and/or the distal end strut of a filter bag assembly is restricted from moving in directions transverse to a filter bag axis as discussed above in connection with FIG. 36.

FIGS. 38A-38B (with FIG. 38A being a front plan view and FIG. 38B being a side view of the access port cover 1482) depict another alternative embodiment in which access port cover 1482 includes a handle 1488 and filter control features 1484 attached thereto, with the filter control features 1484 including a series of slots 1486 configured to receive the closed ends of filter bags and/or distal end struts of a filter bag assembly as described herein such that the closed ends of the filter bags and/or the distal end struts of a filter bag assembly are restricted from moving in directions transverse to a filter bag axes as discussed herein.

FIGS. 39A-39C (with FIG. 39A being a front plan view, FIG. 39B being a top view, and FIG. 39C being a side view of the access port cover 1582) depict another alternative embodiment in which access port cover 1582 includes a handle 1588 and filter control features 1584 attached thereto, with the filter control features 1584 being in the form of elongated V-shaped channels configured to receive the closed ends of filter bags and/or distal end struts of a filter bag assembly as described herein such that the closed ends of the filter bags and/or the distal end struts of a filter bag assembly are restricted from moving in directions transverse to a filter bag axes as discussed herein.

FIGS. 40A-40C (with FIG. 40A being a front plan view, FIG. 40B being a side view, and FIG. 40C being a cross-sectional view taken along line 40C-40C in FIG. 40A of the access port cover 1682) depict another alternative embodiment in which access port cover 1682 includes a handle 1688 and filter control features 1684 and 1685 attached thereto, with the filter control features 1684 being in the form of elongated U-shaped channels and upper and lower filter control features 1685 configured to receive the closed ends of filter bags and/or distal end struts of a filter bag assembly as described herein such that the closed ends of the filter bags and/or the distal end struts of a filter bag assembly are restricted from moving in directions transverse to a filter bag axes as discussed herein.

FIG. 41 depicts yet another illustrative embodiment of an access port cover 1782 with control features 1785 in the form of resiliently compressible members configured to bear against the closed ends of filter bags and/or distal end struts of a filter bag assembly as described herein such that the closed ends of the filter bags and/or the distal end struts of a filter bag assembly are restricted from moving in directions transverse to a filter bag axes as discussed herein. One potential advantage of using compressible members to restrict movement of the closed ends of the filter bags and/or the distal end struts of a filter bag assembly is that no particular alignment is required, i.e., the access port cover 1782 can be place with concern for mechanical interference between the closed ends of the filter bags and/or the distal end struts of a filter bag assembly that could prevent closure of the access port cover 1782 over an access port.

Many structures other than the illustrative embodiments of filter control features depicted in FIGS. 36-41 that are configured to restrict movement of the closed ends of filter bags and/or distal end struts of filter bag assemblies could be used in the air filter systems as described herein.

FIGS. 42-45 depict illustrative embodiments of another feature that may be found in various embodiments of the filter bag assemblies and filter systems described herein. As discussed herein, removal and replacement of the filter bag assemblies is typically accomplished from the closed end of the filter bags, i.e., the filter bags and the service frames on which the filter bags are mounted are pulled from the dirty air chamber of a filter system by grasping the closed ends of the filter bags and the service frames. To facilitate manual grasping of the filter bags and service frames, a handle gap may be provided between the service frame and the yoke proximate the closed end of the tubular body of the filter bag.

FIGS. 42-43 depict one embodiment of a handle gap between the service frame and the yoke. As depicted in FIGS. 42-43, a yoke 1870 includes a lower yoke member 1872 and upper yoke member 1874. The extension struts 1842 and 1844 and the distal end strut 1848 of the service frame are seen proximate the distal end yoke member 1878 furthest from the gasket assembly 1860 and the tube sheet 1820.

Unlike other embodiments depicted herein that include yokes and service frames, a pair of gaps are provided between the service frame and the yoke proximate the distal ends of the service frame and the yoke. In particular, the yoke 1870 includes an angled lower member 1872-1 that extends from the lower yoke member 1872 to the distal end yoke member 1878 and an angled upper member 1874-1 that extends from the upper yoke member 1874 to the distal end yoke member 1878. Angled member 1872-1 defines a handle gap between the extension strut 1842 and distal end strut 1848 while angled member 1874-1 defines a handle gap between the extension strut 1844 and distal end strut 1848. Those handle gaps allow a user to grasp the service frame and the filter bag located thereon to pull the service frame and filter bag away from the tubesheet.

FIG. 44 depicts one alternative illustrative embodiment of a pair of handle gaps in which the yoke includes a pair of curved sections 1972-1 and 1974-1 connecting, respectively, the lower yoke member 1972 and upper yoke member 1974 to the distal yoke member 1978 to provide handle gaps between the lower extension strut 1942, upper extension strut 1944 and distal end strut 1948.

Although the embodiments depicted in FIGS. 42-44 include a pair of handle gaps, it may, in one or more embodiments, be sufficient to provide only one handle gap.

FIG. 45 depicts another alternative illustrative embodiment of a handle gap between a yoke and service frame. In the embodiment depicted in FIG. 45, the lower extension strut 2042 extends past the lower yoke member 2072 and the upper extension strut 2044 extends past the upper yoke member 2074 such that the distal end strut 2048 is spaced apart from the distal yoke member 2078 to provide a handle gap as described herein.

An alternative approach to providing a handle gap between a service frame and a yoke to facilitate removal of a filter bag assembly from a dirty air chamber of a filter system as described herein may include providing a handle attached to the filter bag proximate the closed end of the tubular body of the filter bag. Some illustrative examples of filter bag handles are depicted in FIGS. 46-49.

Figures 46, 47, 48, 49:
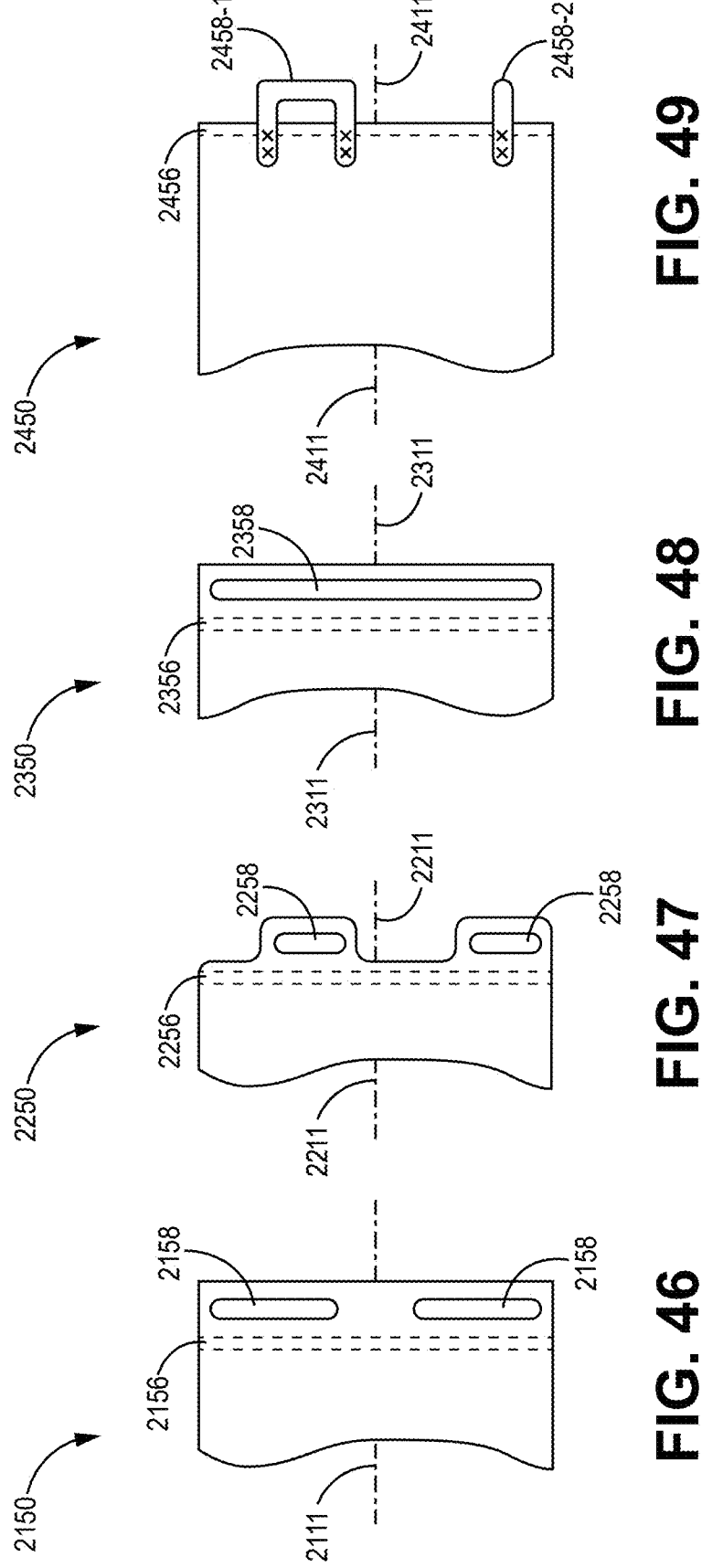

FIG. 46 depicts a pair of handles defined by handle apertures 2158 formed in the sheet material forming the filter bag 2150. The filter bag 2150 defines a filter bag axis 2111 and the closed end of the tubular body of the filter bag 2150 is defined by a seal 2156 formed between opposing layers of the filter sheet material. In one or more embodiments, the seal may be formed by stitching the sheet material together at the closed end of the filter bag 2150.

FIG. 47 depicts a pair of handles defined by handle apertures 2258 formed in the sheet material forming the filter bag 2250. The filter bag 2250 defines a filter bag axis 2211 and the closed end of the tubular body of the filter bag 2250 is defined by a seal 2256 formed between opposing layers of the filter sheet material. In one or more embodiments, the seal may be formed by stitching the sheet material together at the closed end of the filter bag 2250. One advantage of this embodiment may be a potential reduction in waste of filter sheet material due to the offset arrangement of the tabs containing the handle apertures 2258.

FIG. 48 depicts a single handle defined by a handle aperture 2358 formed in the sheet material forming the filter bag 2350. The filter bag 2350 defines a filter bag axis 2311 and the closed end of the tubular body of the filter bag 2350 is defined by a seal 2356 formed between opposing layers of the filter sheet material. In one or more embodiments, the seal may be formed by stitching the sheet material together at the closed end of the filter bag 2350.

Although apertures 2158, 2258, and 2358 are depicted as having an open dimension along their respective bag axes, it should be understood that the apertures may simply be in the form of a slit or cut in the flexible sheet material that enables a user to insert a hand and/or an extraction tool (e.g., a hook, etc.) through the aperture.

FIG. 49 depicts another set of alternative handles that may be provided on filter bags as described herein. In particular, both of handles 2458-1 and 2458-2 may be attached to the filter bag 2450 proximate the closed end of the bag 2450 as defined by the seal 2456 to provide a feature that can be used to pull the filter bag out of a dirty air chamber. Handle 2458-1 may be attached to the bag 2450 at two locations on the same side or opposite sides of the filter bag 2450 while handle 2458-2 may be in the form of a simple loop attached to the opposite sides of the filter bag 2450. Many other variations of handle constructions that could be attached to filter bags as described herein are, of course, possible.

ILLUSTRATIVE EMBODIMENTS

One or more non-limiting alternative illustrative embodiments of filter bags configured to form radial seals and air filter systems including filter bags that form radial seals for the purpose of removing solid particulate matter from a dirty air stream (or other gas stream) are described below.

Illustrative Embodiment 21 is a filter bag comprising: a tubular body extending from a bag opening to a closed end, the tubular body defined by flexible filter sheet material defining an interior volume of the filter bag between the bag opening and the closed end, the tubular body defining a filter bag axis extending through the bag opening and the closed end; and a gasket assembly attached to the tubular body, the gasket assembly extending around and attached to a perimeter of the bag opening, the gasket assembly comprising: a support ring extending around the perimeter of the bag opening, the support ring comprising a leading edge facing away from the closed end of the tubular body, and a gasket attached to the support ring, the gasket extending around a perimeter of the bag opening and configured to form a radial seal when compressed against the support ring when the gasket assembly is mounted in a dust collector.

Illustrative Embodiment 22 is a filter bag according to Embodiment 21, wherein the gasket is located on an exterior surface of the support ring such that the gasket faces away from the filter bag axis.

Illustrative Embodiment 23 is a filter bag according to Embodiment 21, wherein the gasket is located on an interior surface of the support ring such that the gasket faces towards the filter bag axis.

Illustrative Embodiment 24 is a filter bag according to any one of Embodiments 21 to 23, wherein the flexible filter sheet material defining the interior volume of the filter bag is attached to the gasket of the gasket assembly.

Illustrative Embodiment 25 is a filter bag according to Embodiment 24, wherein the gasket comprises a gasket flange extending towards the closed end of the tubular body, wherein the flexible filter sheet material is attached to the gasket flange.

Illustrative Embodiment 26 is a filter bag according to any one of Embodiments 21 to 25, wherein the support ring comprises a pair of pockets on opposite ends of the support ring, wherein each pocket of the pair of pockets is configured to receive an extension strut of a service frame.

Illustrative Embodiment 27 is a system according to any one of Embodiments 21 to 26, wherein the leading edge of the support ring is shaped such that a distance between the leading edge of the support ring and the tubesheet changes when moving around a perimeter of the support ring.

Illustrative Embodiment 28 is a filter bag according to any one of Embodiments 21 to 27, wherein the filter bag comprises a handle attached to the closed end of the tubular body, wherein the closed end is located between the bag opening and the handle when moving along the filter bag axis.

Illustrative Embodiment 29 is a filter bag according to Embodiment 28, wherein the closed end of the tubular body is defined by a seal formed between opposing layers of the flexible filter sheet material, wherein, optionally, the seal comprises stitching.

Illustrative Embodiment 30 is a filter bag according to Embodiment 29, wherein the handle comprises a handle aperture formed in the flexible filter sheet material.

Illustrative Embodiment 31 is an air filter system comprising: a tubesheet separating a housing into a dirty air chamber and a clean air chamber, wherein the tubesheet comprises an aperture placing the dirty air chamber in fluid communication with the clean air chamber, and wherein the housing comprises an access panel located directly across the dirty air chamber from the tubesheet; a filter bag assembly configured for installation in and removal from the dirty air chamber through an access port in the access panel, the filter bag assembly comprising: a tubular body extending from a bag opening to a closed end, the tubular body defined by flexible filter sheet material defining an interior volume of the filter bag between the bag opening and the closed end, the tubular body defining a filter bag axis extending through the bag opening and the closed end, a gasket assembly attached to the tubular body, the gasket assembly extending around and attached to a perimeter of the bag opening, the gasket assembly comprising a support ring extending around the perimeter of the bag opening, the support ring comprising a leading edge facing away from the closed end of the tubular body, and a gasket attached to the support ring, the gasket extending around a perimeter of the bag opening, and a service frame comprising a distal end strut attached to the support ring by an extension strut extending between the distal end strut and the support ring; a receiver surrounding the aperture, wherein the gasket of the filter bag assembly engages the receiver to form a radial seal between a sealing surface on the receiver and the gasket such that air passing through the aperture in the tubesheet must pass through the filter bag when entering or leaving the dirty air chamber through the aperture.

Illustrative Embodiment 32 is a system according to Embodiment 31, wherein the gasket is compressed between the support ring and the sealing surface of the receiver.

Illustrative Embodiment 33 is a system according to any one of Embodiments 31 to 32, wherein the leading edge of the support ring and the gasket are located within the receiver such that the radial seal is formed within the receiver and an exterior surface of the support ring.

Illustrative Embodiment 34 is a system according to Embodiment 33, wherein the gasket comprises a seal member, wherein the seal member is deformed by the receiver when the leading edge of the support ring and the gasket are located within the receiver.

Illustrative Embodiment 35 is a system according to any one of Embodiments 31 to 34, wherein the gasket comprises a forward edge distal from the closed end of the filter bag along the filter bag axis, and wherein the receiver is located within the gasket such that the radial seal is formed within the gasket and outside of the receiver at a location between the forward edge of the gasket and the closed end of the filter bag and, optionally, wherein the receiver is located within the gasket such that the radial seal is formed within the gasket on an external surface of the receiver facing the gasket.

Illustrative Embodiment 36 is a system according to Embodiment 35, wherein the gasket comprises a seal member, and wherein the seal member is deformed by the receiver when the receiver is located within the gasket and the radial seal is formed within the gasket on the external surface of the receiver facing the pocket gasket.

Illustrative Embodiment 37 is a system according to any one of Embodiments 31 to 36, wherein the system comprises a yoke attached to the tubesheet, the yoke extending into the dirty air chamber from a dirty air chamber side of the tubesheet, wherein a junction between the yoke and the tubesheet is located between the aperture and the sealing surface of the receiver, and wherein, when the filter bag assembly is installed in the dirty air chamber, the yoke and the service frame are located in the interior volume of the filter bag.

Illustrative Embodiment 38 is a system according to Embodiment 37, wherein the yoke comprises a strut channel extending away from the tubesheet along an edge of the yoke, and wherein the extension strut of the service frame is at least partially received in the strut channel.

Illustrative Embodiment 39 is a system according to any one of Embodiments 37 to 38, wherein the service frame and the yoke define a handle gap between the service frame and the yoke proximate the closed end of the tubular body, wherein the handle gap is located between the closed end of the tubular body and the yoke, the handle gap configured to facilitate manual grasping of the service frame and the filter bag for removal of the filter bag assembly from the dirty air chamber.

Illustrative Embodiment 40 is a system according to any one of Embodiments 31 to 39, wherein the filter bag comprises a handle attached to the closed end of the tubular body, wherein the closed end is located between the bag opening and the handle when moving along the filter bag axis.

Illustrative Embodiment 41 is a system according to Embodiment 40, wherein the closed end of the tubular body is defined by a seal formed between opposing layers of the flexible filter sheet material, wherein, optionally, the seal comprises stitching.

Illustrative Embodiment 42 is a system according to any one of Embodiments 40 to 41, wherein the handle comprises a handle aperture formed in the flexible filter sheet material.

Illustrative Embodiment 43 is a system according to any one of Embodiments 31 to 42, wherein the service frame comprises a filter bag assembly length measured along the filter bag axis between the leading edge of the support ring and the distal end strut that is great enough to prevent disengagement of the gasket from the sealing surface of the receiver when the access port is closed.

Illustrative Embodiment 44 is a system according to any one of Embodiments 31 to 43, wherein the service frame is located in the interior volume of the filter bag, and, optionally, wherein the extension strut comprises a first extension strut, and wherein the service frame comprises a second extension strut extending between the distal end strut and the support ring, wherein the support ring, the first extension strut, the second extension strut, and the distal end strut define a generally rectangular service frame shape.

Illustrative Embodiment 45 is a system according to any one of Embodiments 31 to 44, wherein the leading edge of the support ring is shaped such that a distance between the leading edge of the support ring and the tubesheet changes when moving around a perimeter of the support ring.

Illustrative Embodiment 46 is a system according to any one of Embodiments 31 to 45, wherein the system comprises an access port cover configured to close the access port when the filter bag assembly is installed in the dirty air chamber and the pocket gasket of the filter bag engages the receiver to form a radial seal between a sealing surface on the receiver and the pocket gasket, and wherein a cross-chamber distance across the dirty air chamber from the access port cover to the receiver is configured to prevent disengagement of the pocket gasket from the sealing surface of the receiver when the access port is closed by the access port cover, and wherein, optionally, the access port cover is configured to restrict movement of the distal end strut in directions transverse to the filter bag axis when the access port is closed by the access port cover.

Illustrative Embodiment 47 is a system according to any one of Embodiments 31 to 46: wherein the aperture in the tubesheet comprises a first aperture of a plurality of apertures with each aperture of the plurality of apertures placing the dirty air chamber in fluid communication with the clean air chamber; wherein the filter bag assembly comprises a first filter bag assembly of a plurality of filter bag assemblies with each filter bag assembly of the plurality of filter bag assemblies configured for installation in and removal from the dirty air chamber through an access port in the access panel; wherein the receiver comprises a first receiver of a plurality of receivers with each receiver extending into the dirty air chamber around one aperture of the plurality of apertures, wherein the gasket of the first filter bag assembly engages the first receiver to form a radial seal between a sealing surface on the first receiver and the gasket such that air passing through the first aperture must pass through the filter bag of the first filter bag assembly when entering or leaving the dirty air chamber through the first aperture; wherein a second aperture of the plurality of apertures is located within a second receiver of the plurality of receivers and a gasket of a second filter bag assembly of the plurality of filter bag assemblies engages the second receiver; wherein the filter bag axis extending through the bag opening and the closed end of the filter bag of the first filter bag assembly is a first filter bag axis that extends through a center of the bag opening and a center of the closed end of the filter bag of the first filter bag assembly; wherein the filter bag of the second filter bag assembly defines a second filter bag axis extending through a center of the bag opening and a center of the closed end of the filter bag of the second filter bag assembly; wherein the filter bag of the first filter bag assembly comprises a width measured along a width direction that is transverse to both the first filter bag axis and the second filter bag axis; wherein the first filter bag assembly and the second filter bag assembly are adjacent each other when moving along the width direction; and wherein a distance between the first filter bag axis and the second filter bag axis along the width direction is 3 or more times the width of the first filter bag; and optionally wherein each filter bag assembly of the plurality of filter bag assemblies extends across the dirty air chamber from the receiver to the access panel.

Illustrative Embodiment 48 is a system according to Embodiment 47, wherein the plurality of filter bag assemblies comprises three or more filter bag assemblies, and wherein an inter-assembly distance between each pair of adjacent filter bag assemblies of the plurality of filter bag assemblies is the same as or greater than the distance between the first filter bag axis and the second filter bag axis.

Illustrative Embodiment 49 is a system according to any one of Embodiments 31 to 48, wherein the filter bag of each filter bag assembly of the plurality of filter bag assemblies comprises an envelope style filter bag.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the air filter systems, filter bag assemblies, filter bags with gaskets, as well as methods of using and assembling the same, are discussed herein and some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. An air filter system comprising:
   a tubesheet separating a housing into a dirty air chamber and a clean air chamber, wherein the tubesheet comprises an aperture placing the dirty air chamber in fluid communication with the clean air chamber, and wherein the housing comprises an access panel located directly across the dirty air chamber from the tubesheet;

a filter bag assembly configured for installation in and removal from the dirty air chamber through an access port in the access panel, the filter bag assembly comprising:

a service frame comprising a support ring and a distal end strut attached to the support ring by an extension strut extending between the distal end strut and the support ring, the support ring comprising a leading edge facing away from the distal end strut, a filter bag comprising a bag opening and a closed end such that the filter bag comprises flexible filter sheet material defining an interior volume of the filter bag, the filter bag defining a filter bag axis extending through the bag opening and the closed end, and a pocket gasket extending around and attached to a perimeter of the bag opening of the filter bag, the pocket gasket comprising:

an external surface facing away from the filter bag axis, the external surface extending around a perimeter of the pocket gasket, an internal surface facing the filter bag axis, the internal surface extending around the perimeter of the pocket gasket, a forward edge located distal from the closed end of the filter bag and a trailing edge located between the forward edge and the closed end of the filter bag, a pocket formed between the external surface and the internal surface, the pocket comprising a pocket opening and a forward end, wherein the forward end is located between the pocket opening and the forward edge of the pocket gasket, a plurality of tab apertures extending through the pocket gasket from the forward end of the pocket through the forward edge of the pocket gasket, wherein the leading edge of the support ring is positioned in the pocket and proximate the tubesheet and wherein the extension strut extends away from the tubesheet towards the access panel when the filter bag assembly is installed in the dirty air chamber;

a receiver surrounding the aperture, wherein the pocket gasket of the filter bag assembly engages the receiver to form a radial seal between a sealing surface on the receiver and the pocket gasket such that air passing through the aperture in the tubesheet must pass through the filter bag when entering or leaving the dirty air chamber through the aperture.

2. A system according to claim 1, wherein the pocket gasket is compressed between the support ring and the sealing surface of the receiver.

3. A system according to claim 1, wherein the leading edge of the support ring and the pocket of the pocket gasket are located within the receiver such that the radial seal is formed within the receiver and an exterior surface of the support ring.

4. A system according to claim 1, wherein the receiver is located within the pocket gasket such that the radial seal is formed within the pocket gasket and outside of the receiver at a location between the forward edge of the pocket gasket and the closed end of the filter bag.

5. A system according to claim 1, wherein the service frame comprises a filter bag assembly length measured along the filter bag axis between the leading edge of the support ring and the distal end strut that is great enough to prevent disengagement of the pocket gasket from the sealing surface of the receiver when the access port is closed.

6. A system according to claim 1, wherein the support ring, the distal end strut, and the extension strut of the service frame are located in the interior volume of the filter bag.

7. A system according to claim 1, wherein the system comprises a yoke attached to the tubesheet, the yoke extending into the dirty air chamber from a dirty air chamber side of the tubesheet, wherein a junction between the yoke and the tubesheet is located between the aperture and the sealing surface of the receiver, and wherein, when the filter bag assembly is installed in the dirty air chamber, the yoke and the service frame are located in the interior volume of the filter bag.

8. A system according to claim 7, wherein the service frame and the yoke define a handle gap between the service frame and the yoke proximate the closed end of the filter bag, wherein the handle gap is located between the closed end of the filter bag and the yoke, the handle gap configured to facilitate manual grasping of the service frame and the filter bag for removal of the filter bag assembly from the dirty air chamber.

9. A system according to claim 1, wherein the leading edge of the support ring is shaped such that a distance between the leading edge of the support ring and the tubesheet changes when moving around a perimeter of the support ring.

10. A system according to claim 1, wherein the leading edge of the support ring comprises a plurality of retention tabs extending away from the closed end of the filter bag, and wherein the plurality of tab apertures are configured to receive the retention tabs.

11. A system according to claim 1, wherein the filter bag comprises a handle attached to the closed end of the filter bag, wherein the closed end is located between the bag opening and the handle when moving along the filter bag axis.

12. A system according to claim 1, wherein the filter bag of each filter bag assembly of a plurality of filter bag assemblies comprises a handle attached to the closed end of the filter bag, wherein the closed end is located between the bag opening and the handle when moving along the filter bag axis.

13. A filter bag comprising:

a tubular body extending from a bag opening to a closed end, the tubular body defined by flexible filter sheet material defining an interior volume of the filter bag between the bag opening and the closed end, the tubular body defining a filter bag axis extending through the bag opening and the closed end; and a gasket attached to the tubular body, the gasket extending around and attached to a perimeter of the bag opening, the gasket comprising:

an external surface facing away from the filter bag axis, the external surface extending around a perimeter of the gasket, an internal surface facing the filter bag axis, the internal surface extending around the perimeter of the gasket, a forward edge located distal from the closed end of the tubular body and a trailing edge located between the forward edge and the closed end of the tubular body, a pocket formed in the gasket between the external surface and the internal surface, the pocket comprising a pocket opening and a forward end, wherein the forward end is located between the pocket opening and the forward edge of the gasket, the pocket configured to receive a support ring extending around the perimeter of the bag opening, and a plurality of tab apertures extending through the gasket from the forward end of the pocket through the forward edge of the gasket.

14. A filter bag according to claim 13, wherein the pocket opening opens into the interior volume of the filter bag.

15. A filter bag according to claim 13, wherein the pocket opening faces the closed end of the tubular body.

16. A filter bag according to claim 13, wherein the pocket comprises a pocket depth measured along the bag axis between the forward end of the pocket and a reference plane oriented transverse to the bag axis, wherein the pocket depth varies when moving around the perimeter of the gasket.

17. A filter bag according to claim 13, wherein the gasket comprises a gasket depth measured along the bag axis between the forward edge and a reference plane oriented transverse to the bag axis, and wherein the gasket depth varies when moving around the perimeter of the gasket.

18. A filter bag according to claim 13, wherein the gasket comprises a gasket-pocket depth measured along the bag axis between the forward end of the pocket and a reference plane, wherein the gasket-pocket depth varies when moving around the perimeter of the gasket.

19. A filter bag according to claim 13, wherein the filter bag comprises a handle attached to the closed end of the tubular body, wherein the closed end is located between the bag opening and the handle when moving along the filter bag axis.

20. A filter bag comprising:

a tubular body extending from a bag opening to a closed end, the tubular body defined by flexible filter sheet material defining an interior volume of the filter bag between the bag opening and the closed end, the tubular body defining a filter bag axis extending through the bag opening and the closed end; and a gasket attached to the tubular body, the gasket extending around and attached to a perimeter of the bag opening, the gasket comprising:

an external surface facing away from the filter bag axis, the external surface extending around a perimeter of the gasket, an internal surface facing the filter bag axis, the internal surface extending around the perimeter of the gasket, a forward edge located distal from the closed end of the tubular body and a trailing edge located between the forward edge and the closed end of the tubular body, a pocket formed in the gasket between the external surface and the internal surface, the pocket comprising a pocket opening and a forward end, wherein the forward end is located between the pocket opening and the forward edge of the gasket, the pocket configured to receive a support ring extending around the perimeter of the bag opening, wherein the pocket opening opens into the interior volume of the filter bag, and wherein the pocket opening faces the closed end of the tubular body, and wherein the gasket comprises a plurality of tab apertures extending through the gasket from the forward end of the pocket through the forward edge of the gasket.

21. A filter bag according to claim 20, wherein the pocket comprises a pocket depth measured along the filter bag axis between the forward end of the pocket and a reference plane oriented transverse to the filter bag axis, wherein the pocket depth varies when moving around the perimeter of the gasket.

22. A filter bag according to claim 20, wherein the gasket comprises a gasket depth measured along the filter bag axis between the forward edge and a reference plane oriented transverse to the filter bag axis, and wherein the gasket depth varies when moving around the perimeter of the gasket.

23. A filter bag according to claim 20, wherein the gasket comprises a gasket-pocket depth measured along the filter bag axis between the forward end of the pocket and a reference plane, wherein the gasket-pocket depth varies when moving around the perimeter of the gasket.

24. A filter bag according to claim 20, further comprising a handle attached to the closed end of the tubular body, wherein the closed end is located between the bag opening and the handle when moving along the filter bag axis.

* * * * *